(12) United States Patent
Duggal et al.

(10) Patent No.: US 12,340,196 B2
(45) Date of Patent: Jun. 24, 2025

(54) SYSTEMS AND METHODS FOR DECLARATIVE DESIGN AND EXECUTION OF INTENT-BASED SERVICES

(71) Applicant: EnterpriseWeb LLC, Glen Falls, NY (US)

(72) Inventors: Dave Duggal, Glens Falls, NY (US); William Malyk, Guelph (CA)

(73) Assignee: ENTERPRISEWEB LLC, Glens Falls, NY (US)

( * ) Notice: Subject to any disclaimer, the term of this patent is extended or adjusted under 35 U.S.C. 154(b) by 439 days.

(21) Appl. No.: 17/736,760

(22) Filed: May 4, 2022

(65) Prior Publication Data

US 2022/0357936 A1 Nov. 10, 2022

Related U.S. Application Data

(60) Provisional application No. 63/184,061, filed on May 4, 2021.

(51) Int. Cl.
| | |
|---|---|
| G06F 9/44 | (2018.01) |
| G06F 8/60 | (2018.01) |
| H04L 9/40 | (2022.01) |
| H04L 67/00 | (2022.01) |

(52) U.S. Cl.
CPC .............. *G06F 8/60* (2013.01); *H04L 63/083* (2013.01); *H04L 67/34* (2013.01)

(58) Field of Classification Search
CPC ........................................................ G06F 8/60
USPC ........................................................ 717/172
See application file for complete search history.

(56) References Cited

U.S. PATENT DOCUMENTS

| | | |
|---|---|---|
| 4,803,348 A | 2/1989 | Lohrey et al. |
| 5,469,533 A | 11/1995 | Dennis |
| 5,524,241 A | 6/1996 | Ghoneimy et al. |
| 6,249,291 B1 | 6/2001 | Popp et al. |

(Continued)

OTHER PUBLICATIONS

Wegner, P., "Interaction as a basis for empirical computer science", ACM Computing Surveys (CSUR) Surveys, vol. 27(1): 45-48, (Mar. 1995).

(Continued)

*Primary Examiner* — Evral E Bodden
(74) *Attorney, Agent, or Firm* — Sterne, Kessler, Goldstein & Fox P.L.L.C.

(57) ABSTRACT

Disclosed herein are system, method, and computer program product embodiments for deploying and configuring telecommunication middleware using a no-code integration and automation platform that implements middleware patterns as a set of event-driven Functions-as-a-Service. The platform offers low-latency, high-performance middleware capabilities co-located with applications, provides for a consistent developer experience, facilitates interoperability across nodes, and enables centralized and automated lifecycle management. Additional technical benefits over legacy systems in this resource-efficient, edge-optimized, greentech platform include: improved performance, composable building blocks, reduced costs, cloud-native deployment, cloud network functions virtualization, rationalized tooling, and unified management. The breadth, depth, and inherent complexity of various use cases showcases the richness of the disclosed abstraction and automation.

37 Claims, 73 Drawing Sheets

(56) References Cited

U.S. PATENT DOCUMENTS

| | | |
|---|---|---|
| 6,268,852 B1 | 7/2001 | Lindhorst et al. |
| 6,442,750 B1 | 8/2002 | Lopes et al. |
| 6,794,586 B1 | 9/2004 | Mason |
| 6,862,732 B1 | 3/2005 | Schultz et al. |
| 7,089,316 B2 | 8/2006 | Andersen et al. |
| 7,095,715 B2 | 8/2006 | Buckman et al. |
| 7,310,684 B2 | 12/2007 | Patrick et al. |
| 7,444,620 B2 | 10/2008 | Marvin |
| 7,506,302 B2 | 3/2009 | Bahrami |
| 7,542,956 B2 | 6/2009 | Strassner et al. |
| 7,546,295 B2 | 6/2009 | Brave et al. |
| 7,565,613 B2 | 7/2009 | Forney |
| 7,574,663 B2 | 8/2009 | Popp et al. |
| 7,580,860 B2 | 8/2009 | Junger |
| 7,580,930 B2 | 8/2009 | Brave et al. |
| 7,613,713 B2 | 11/2009 | Forney |
| 7,633,868 B2 | 12/2009 | Buckman et al. |
| 7,644,007 B2 | 1/2010 | Elazouni |
| 7,652,594 B2 | 1/2010 | Lamont et al. |
| 7,652,680 B2 | 1/2010 | Popp et al. |
| 7,653,008 B2 | 1/2010 | Patrick et al. |
| 7,653,638 B2 | 1/2010 | Forney |
| 7,885,847 B2 | 2/2011 | Wodtke et al. |
| 8,392,877 B1 | 3/2013 | Chiluvuri |
| 8,423,954 B2 | 4/2013 | Ronen et al. |
| 8,694,958 B1 | 4/2014 | Potter et al. |
| 8,708,233 B2 | 4/2014 | Hammond et al. |
| 8,789,748 B2 | 7/2014 | Waugh et al. |
| 9,075,616 B2 | 7/2015 | Duggal et al. |
| 9,323,504 B1 | 4/2016 | Kinast et al. |
| 9,391,949 B1 * | 7/2016 | Richardson ......... H04L 61/3005 |
| 10,185,943 B2 | 1/2019 | Clark et al. |
| 10,547,508 B1 * | 1/2020 | Kanakarajan ........... H04L 67/51 |
| 12,088,463 B1 * | 9/2024 | Wang ..................... H04L 41/16 |
| 2001/0037207 A1 | 11/2001 | Dejaeger |
| 2002/0019783 A1 | 2/2002 | Chol |
| 2002/0055849 A1 | 5/2002 | Georgakopoulos et al. |
| 2002/0138659 A1 | 9/2002 | Travaris et al. |
| 2002/0198765 A1 | 12/2002 | Magrino et al. |
| 2003/0012147 A1 | 1/2003 | Buckman et al. |
| 2003/0018897 A1 | 1/2003 | Bellis et al. |
| 2003/0024340 A1 | 2/2003 | Toennesland et al. |
| 2003/0037181 A1 | 2/2003 | Freed |
| 2003/0061266 A1 | 3/2003 | Ouchi et al. |
| 2003/0154191 A1 | 8/2003 | Fish et al. |
| 2003/0236877 A1 | 12/2003 | Allan |
| 2004/0015821 A1 | 1/2004 | Lu et al. |
| 2004/0054690 A1 | 3/2004 | Hillerbrand et al. |
| 2004/0078777 A1 | 4/2004 | Bahrami |
| 2004/0098311 A1 | 5/2004 | Nair et al. |
| 2004/0172618 A1 | 9/2004 | Marvin |
| 2004/0225995 A1 | 11/2004 | Marvin et al. |
| 2005/0027585 A1 | 2/2005 | Wodtke et al. |
| 2005/0086640 A1 | 4/2005 | Kolehmainen et al. |
| 2005/0240958 A1 | 10/2005 | Nguyen et al. |
| 2005/0264581 A1 | 12/2005 | Patrick et al. |
| 2005/0267892 A1 | 12/2005 | Patrick et al. |
| 2005/0267947 A1 | 12/2005 | Patrick et al. |
| 2005/0270970 A1 | 12/2005 | Patrick et al. |
| 2005/0273497 A1 | 12/2005 | Patrick et al. |
| 2005/0273502 A1 | 12/2005 | Patrick et al. |
| 2005/0273516 A1 | 12/2005 | Patrick et al. |
| 2005/0273517 A1 | 12/2005 | Patrick et al. |
| 2005/0273518 A1 | 12/2005 | Patrick et al. |
| 2005/0273520 A1 | 12/2005 | Patrick et al. |
| 2005/0273521 A1 | 12/2005 | Patrick et al. |
| 2005/0273759 A1 | 12/2005 | Lucassen et al. |
| 2005/0273847 A1 | 12/2005 | Patrick et al. |
| 2005/0278335 A1 | 12/2005 | Patrick et al. |
| 2005/0278374 A1 | 12/2005 | Patrick et al. |
| 2006/0005063 A1 | 1/2006 | Patrick et al. |
| 2006/0007918 A1 | 1/2006 | Patrick et al. |
| 2006/0031353 A1 | 2/2006 | Patrick et al. |
| 2006/0031354 A1 | 2/2006 | Patrick et al. |
| 2006/0031355 A1 | 2/2006 | Patrick et al. |
| 2006/0031431 A1 | 2/2006 | Patrick et al. |
| 2006/0031432 A1 | 2/2006 | Patrick et al. |
| 2006/0031433 A1 | 2/2006 | Patrick et al. |
| 2006/0031481 A1 | 2/2006 | Patrick et al. |
| 2006/0031930 A1 | 2/2006 | Patrick et al. |
| 2006/0034237 A1 | 2/2006 | Patrick et al. |
| 2006/0053272 A1 | 3/2006 | Roth et al. |
| 2006/0069791 A1 | 3/2006 | Patrick et al. |
| 2006/0080419 A1 | 4/2006 | Patrick et al. |
| 2006/0136555 A1 | 6/2006 | Patrick et al. |
| 2006/0212593 A1 | 9/2006 | Patrick et al. |
| 2006/0239273 A1 | 10/2006 | Buckman et al. |
| 2007/0016897 A1 | 1/2007 | Todd |
| 2007/0069855 A1 | 3/2007 | Boland et al. |
| 2007/0069896 A1 | 3/2007 | Boland et al. |
| 2007/0074169 A1 | 3/2007 | Chess et al. |
| 2007/0094672 A1 | 4/2007 | Hayton et al. |
| 2007/0157138 A1 | 7/2007 | Ciolfi et al. |
| 2007/0168907 A1 | 7/2007 | Iborra et al. |
| 2007/0198240 A1 | 8/2007 | Moriat |
| 2007/0250812 A1 | 10/2007 | Sanghvi et al. |
| 2008/0005732 A1 | 1/2008 | Coon |
| 2008/0034367 A1 | 2/2008 | Patrick et al. |
| 2008/0072235 A1 | 3/2008 | Rodgers et al. |
| 2008/0077932 A1 | 3/2008 | Ruppach et al. |
| 2008/0092068 A1 | 4/2008 | Norring et al. |
| 2008/0155104 A1 | 6/2008 | Quinn et al. |
| 2008/0158605 A1 | 7/2008 | Engbrocks et al. |
| 2008/0186852 A1 | 8/2008 | Sami et al. |
| 2008/0212963 A1 | 9/2008 | Fortin et al. |
| 2008/0225706 A1 | 9/2008 | Lange |
| 2008/0239167 A1 | 10/2008 | Goldberg |
| 2008/0244319 A1 | 10/2008 | Nehab et al. |
| 2008/0263206 A1 | 10/2008 | Bivens et al. |
| 2008/0300844 A1 | 12/2008 | Bagchi et al. |
| 2008/0306751 A1 | 12/2008 | Conroy et al. |
| 2008/0319757 A1 | 12/2008 | Da Palma et al. |
| 2009/0024432 A1 | 1/2009 | Bauters et al. |
| 2009/0086752 A1 | 4/2009 | Anderson et al. |
| 2009/0113156 A1 | 4/2009 | Fujita et al. |
| 2009/0113379 A1 | 4/2009 | Sedukhin et al. |
| 2009/0119334 A1 | 5/2009 | Ahern et al. |
| 2009/0164621 A1 | 6/2009 | Kothari et al. |
| 2009/0165021 A1 | 6/2009 | Pinkston et al. |
| 2009/0222921 A1 | 9/2009 | Mukhopadhyay et al. |
| 2009/0241088 A1 | 9/2009 | Dangeville et al. |
| 2009/0300578 A1 | 12/2009 | Neil |
| 2009/0319937 A1 | 12/2009 | Molander et al. |
| 2009/0323550 A1 | 12/2009 | Buckman et al. |
| 2010/0010960 A1 | 1/2010 | Singh |
| 2010/0011013 A1 | 1/2010 | Singh |
| 2010/0179951 A1 | 7/2010 | McPhail |
| 2010/0199260 A1 | 8/2010 | Duggal et al. |
| 2011/0072340 A1 | 3/2011 | Miller et al. |
| 2011/0154374 A1 | 6/2011 | Ku et al. |
| 2011/0178830 A1 | 7/2011 | Knowles |
| 2012/0185821 A1 | 7/2012 | Yaseen et al. |
| 2012/0198417 A1 | 8/2012 | Haviv et al. |
| 2012/0246336 A1 | 9/2012 | Sathish |
| 2012/0284009 A1 | 11/2012 | De Florio et al. |
| 2012/0311533 A1 | 12/2012 | Fanning et al. |
| 2013/0001295 A1 | 1/2013 | Goncalves |
| 2013/0080371 A1 | 3/2013 | Harber et al. |
| 2013/0223673 A1 | 8/2013 | Davis et al. |
| 2013/0232245 A1 | 9/2013 | Antosz et al. |
| 2013/0248593 A1 | 9/2013 | Bonner et al. |
| 2014/0039998 A1 | 2/2014 | Hancock et al. |
| 2014/0282448 A1 | 9/2014 | Duffy et al. |
| 2014/0317315 A1 | 10/2014 | Duchesneau |
| 2015/0254309 A1 | 9/2015 | Sekiguchi et al. |
| 2016/0043968 A1 * | 2/2016 | Jacob ................... H04L 47/827 709/226 |
| 2016/0179482 A1 | 6/2016 | Kramer |
| 2016/0210738 A1 | 7/2016 | Curlander et al. |
| 2016/0291945 A1 | 10/2016 | Joshi et al. |
| 2016/0299790 A1 | 10/2016 | Wagner et al. |
| 2019/0012211 A1 * | 1/2019 | Selvaraj ................ G06F 9/5072 |
| 2019/0392053 A1 * | 12/2019 | Chalakov .............. G06F 16/185 |
| 2020/0162463 A1 * | 5/2020 | Dykstra ................... H04L 63/10 |

(56) References Cited

U.S. PATENT DOCUMENTS

| | | | | |
|---|---|---|---|---|
| 2020/0322332 | A1* | 10/2020 | Haque | H04L 9/3268 |
| 2021/0028983 | A1* | 1/2021 | Balakrishnan | G06F 11/3055 |
| 2022/0171649 | A1* | 6/2022 | Green | G06F 9/5072 |

OTHER PUBLICATIONS

Starovic, G., et al., "An Event Based Object Model for Distributed Programming", Proceedings of the 1995 International Conference on Object Oriented Information Systems, pp. 72-86 (Dec. 1995).
3M™ Intelligent Return: Owner's Manual, Built to Exceed Expectations, 3M (2011).
International Search Report and Written Opinion from Related PCT application PCT/US2017/016020, dated May 1, 2017, 7 pages.
Amelunxen et al, "Metamodel-based tool integration with moflon", published on 2008, source ACM/IEEE.
France et al, "Model-driven development of complex software: A research roadmap", published on 2007.
Adams et al., YAWL, Chapter 7 "The Architecture," Sep. 21, 2009, pp. 1-16.
Battle, R. et al., "Bridging the semantic Web and Web 2.0 with Representational State Transfer (REST)," Journal of Web Semantics, Nov. 17, 2007, vol. 6, No. 1, pp. 61-69.
Blair et al., "The Design of a Resource-Aware Reflective Middleware Architecture", P. Cointe (Ed.): Reflection '99, LNCS 1616, pp. 115-134, 1999, Copyright Springer-Verlag Berlin Heidelberg 1999.
Blair, G.S. et al., "An Architecture for Next Generation Middleware", Distributed Multimedia Research Group, Computing Department, Lancaster University, Bailrigg, Lancaster, UK, 1998, 16 pages.
BPM—Business Process Management, ActiveBPEL, ActiveVOS Comparison, "ActiveBPEL Engine / ActiveVOS Enterprise Edition Comparison" http://www.activevos.com/compare.php, Date Unknown, Printed Mar. 17, 2010, 3 pages.
BPM Active VOS Business Process Management Suite from Active Endpoints, "Using Active VOS", http://www.activevos.com/products-features.php, Date Unknown, Printed Mar. 17, 2010, 10 pages.
BPM Focus, "Cases Managed the World Over", http://bpmfocus.wordpress.com/2009/06/21/cases-managed-the-world-over/, Jun. 21, 2009, 6 pages.
Dubray, J. "The Seven Fallacies of Business Process Execution", Dec. 4, 2007, pp. 1-10, http://www.infoq.com/articles/seven-fallacies-of-bpm.
Duggal et al., "Putting Work in Context for Enterprise Agility," Dec. 6, 2010, 6 pages, COCOA.
Duran-Limon, H.A. et al., IEEE Distributed Systems Online 1541-4922, Copyright 2004 Published by the IEEE Computer Society, vol. 5, No. 7, Jul. 2004, pp. 1-13.
Epiphany: Replace HATEOS with "Hypermedia Describes Protocols", http://blogs.gartner.com/nick_gall/2009/06/02/epiphany-replace-hateoas-with-hypermedia-describ . . . , Jun. 2, 2009, 2 pages.
Fiannnante, M., The SOA Magazine, "Dynamic SOA and BPM", Sep. 25, 2009, 11 pages, http://www.soamag.com/132/0909-2.asp.
Fielding, R.T., "Rest APis must be hypertext-driven," roy.gbiv.com/untangled/2008/rest-apis-must-be-hypertext-driven, Oct. 20, 2008 (printed Apr. 29, 2013).
Fielding, R.T., "Dissertation", University of California, Irvine, Architectural Styles and the Design of Network-based Software Architectures, 2000, Copyright Roy Thomas Fielding, 2 pages.
Grace et al., "A Reflective Framework for Fine-Grained Adaptation of Aspect-Oriented Compositions", Software Composition 2008, Budapest, Mar. 2008, 22 pages.
Henk De Man, C., "Case Management: OMG RFP released!", http://www.brsilver.com/bprnncase/?p=31, Sep. 24, 2009, 4 pages.
Khare, R. et al., "Extending the Representational State Transfer (REST) Architectural Style for Decentralized Systems," Proceedings of the 26th International Conference on Software Engineering (ICSE '04), May 23, 2004, pp. 428-437.
Papyrus Platform Architecture, "Copying is the most sincere form of flattery!", http://isispapyrus.wordpress.com/2009/10/04/copying-fattery, Oct. 4, 2009, 4 pages.
Peng, Y. et al., "A Reflective Information Model for Reusing Software Architecture", 2008 ISECS International Colloquium on Computing, Communication, Control, and Management, Copyright 2008 IEEE, pp. 270-275.
Rodriguez, A., IBM, XP-002578060, "RESTful Web services: The basics," Nov. 6, 2008, 12 pages.
SOA Consortium, "Business Architecture: The Missing Link between Business Strategy and Enterprise Architecture", Copyright 2010 Object Management Group, pp. 1-14.
Stepney, S. et al., "Reflecting on Open-Ended Evolution," In "Advances in Artificial Life, ECAL 2011," MIT Press, XPO55076886, ISBN: 978-0-26-229714-1, pp. 781-788.
Szepielak, D. "REST-Based Service Oriented Architecture for Dynamically Integrated Information Systems", Deutsches Elektronen-Synchrotron, Notkestrasse 85, 22607 Hamburg, Germany, 2008, pp. 7-12.
Thoughts on Collaborative Planning, "It is All Taylor's Fault", Jan. 8, 2010, http://kswenson.wordpress.com/2010/01/08/it-is-all-taylors-fault/, 11 pages.
Thoughtworks, Dr. Jim Webber, Hateos: The Confusing Bit from REST, May 26, 2009, 45 pages.
Tosic, V. et al., "Improving Business Processes in the Australian Lending Industry", Abstract only of Seminar presented on Aug. 25, 2008, 1 page.
Van Der Aalst, W.M.P. et al., "Flexibility as a Service", Eindhoven University of Technology, Eindhoven, The Netherlands, 2008, 15 pages.
Xu, X. et al., "Resource-Oriented Architecture for Business Processes", 2008, 15th Asia-Pacific Software Engineering Conference, pp. 395-402.
Xu, X. et al., "Resource-Oriented Business Process Modeling of Ultra-Large-Scale Systems", ULSSIS '08, May 10-11, 2008, Leipzig, Germany, Copyright 2008, pp. 65-68.
Yuan, M., "JBoss Seam: A Deep Integration Framework", pp. 1-15, Jul. 1, 2007, http://www.theserverside.com/news/1364119/JBoss-Seam-A-Deep-Integration-Framework.
Zhu, L. et al., "On Creating Industry-Wide Reference Architectures", 12th International IEEE Enterprise Distributed Object Computing Conference, Sep. 15-19, 2008, pp. 24-30.
Zhu, L. et al., "Reference Architecture for Lending Industry in ULS Systems", 29th International Conference on Software Engineering Workshops, (ICSEW '07), Copyright 2007 IEEE, 3 pages.
Das, C., U.S. Appl. No. 14/791,820, Notice of Allowance, dated Aug. 10, 2016, 10 pages.
Das, C., U.S. Appl. No. 14/791,820, Office Action, dated Jun. 10, 2016, 24 pages.
Das, C., U.S. Appl. No. 13/846,630, Notice of Allowance, dated Mar. 5, 2015, 16 pages.
Das, C., U.S. Appl. No. 13/846,630, Non-Final Office Action, dated Nov. 6, 2014, 25 pages.
Mitchell, J., U.S. Appl. No. 12/698,361, Non-Final Office Action Communication, dated Jan. 29, 2013, 31 pages.
Mitchell, J., U.S. Appl. No. 12/698,361, Notice of Allowance, dated Jul. 24, 2013, 24 pages.
International Application No. PCT/US2013032846, International Search Report and the Written Opinion, dated Sep. 19, 2013, 7 pages.
International Application No. PCT/US2010/022849, International Search Report and the Written Opinion, dated May 4, 2010, 9 pages.

* cited by examiner

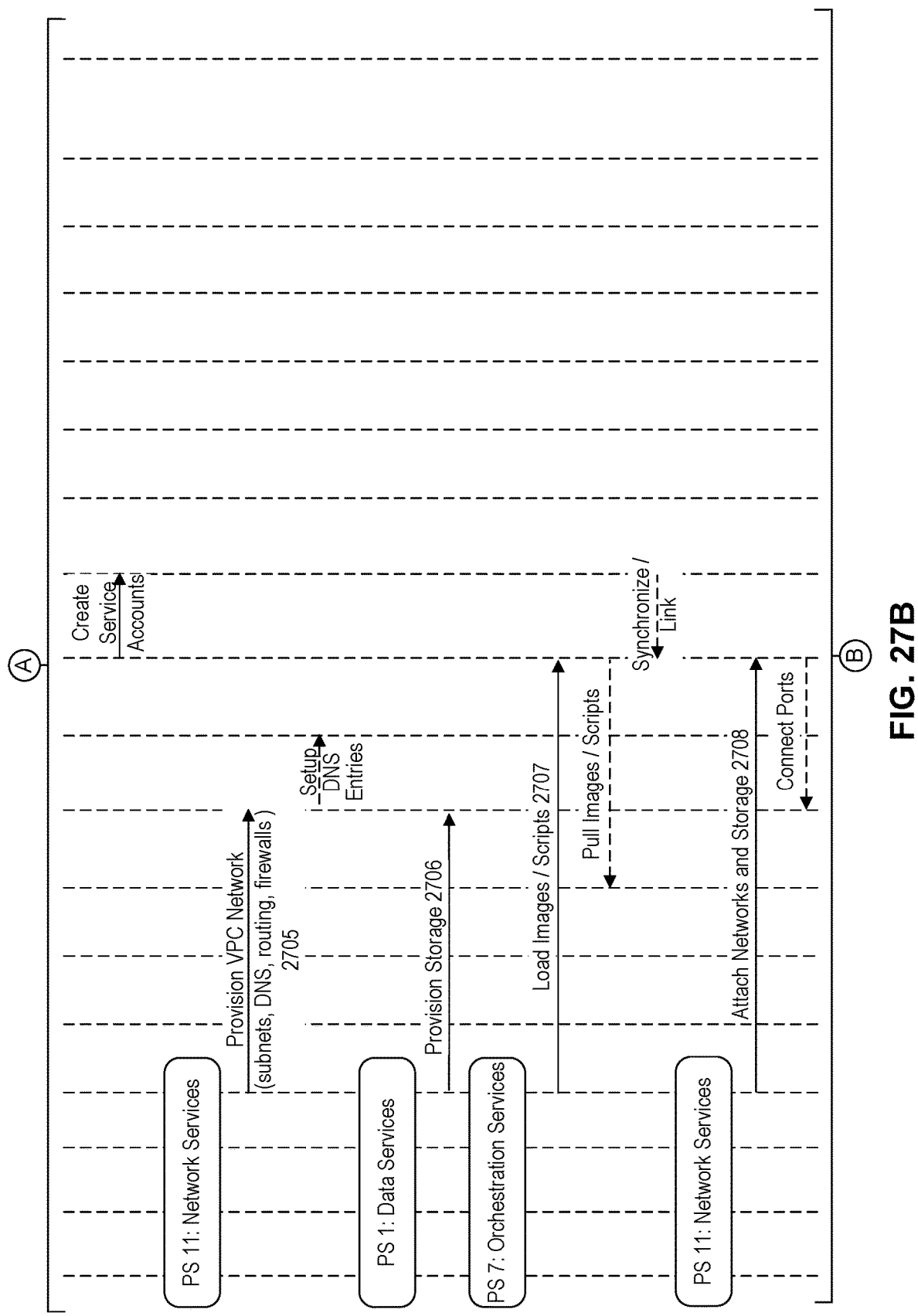

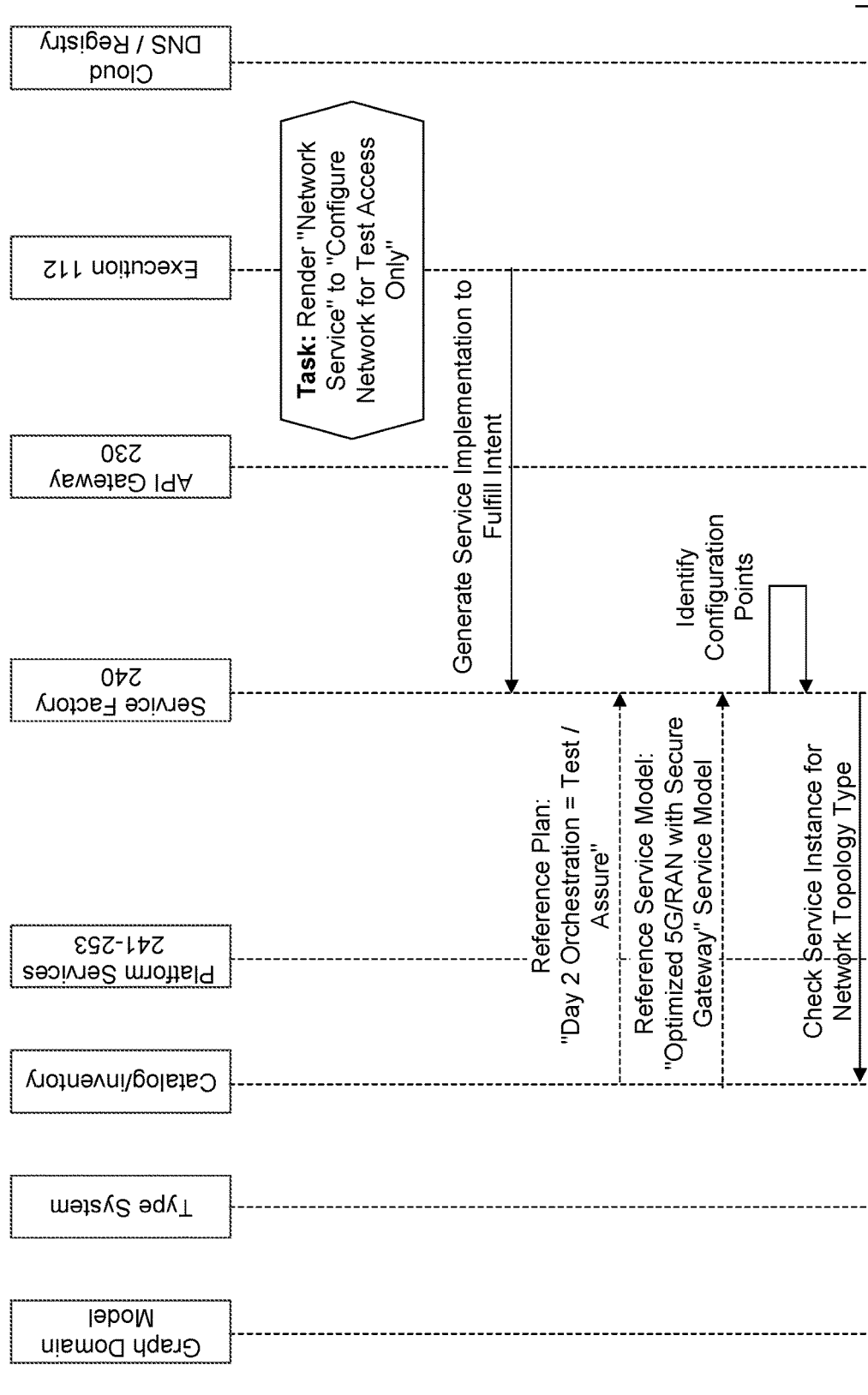

SYSTEMS AND METHODS FOR DECLARATIVE DESIGN AND EXECUTION OF INTENT-BASED SERVICES

BACKGROUND

As organizations have disaggregated from monoliths to services to microservices and now serverless functions, the technical components that these organizations integrate, coordinate, and manage has exploded. This explosion of tools, technologies, and endpoints compounds enterprise-fragmentation headaches.

An increasingly bloated middleware layer complicates the relationship between business logic and business objects, which interferes with delivering business solutions. This is the poster-child for accidental complexity famously referred to as "The Big Ball of Mud." The world is now dynamic, diverse, and distributed, but organizations still need to act in a cohesive manner and coordinate their complex and far-flung operations.

One business sector in particular that experiences these middleware problems acutely is the telecommunications industry, given its scale and the inherent technical complexity of modern communications. Just as organizations around the world are struggling to transform into Digital Businesses, providers of telecommunication services ("Telcos") are in the midst of transformation to become digital service providers, shifting from their physical infrastructure-centric roots to become software defined, virtualized, automated, and agile. Network services that were once physically wired are now being manually integrated in software. However, switching from one form of tight-coupling to another has not delivered the anticipated benefits in agility or reduced operational expenses.

Organizations require a platform to rationalize middleware so developers can focus on delivering business solutions. This middle-tier should be a lightweight, horizontally architected, elastically scalable layer that separates the concerns between business logic and business objects while providing a consistency layer, a common intermediary language for modeling, composing, and managing heterogeneous service elements, and infrastructure resources.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 27A-27D are a sequence diagram illustrating a day-one deployment method performed in the use case for deploying and assuring an optimized, secure 5G radio access network.

FIGS. 32A-32C are a sequence diagram illustrating a method of configuring the network for test access only performed in the use case for deploying and assuring an optimized, secure 5G radio access network.

In the drawings, like reference numbers generally indicate identical or similar elements. Additionally, generally, the left-most digit(s) of a reference number identifies the drawing in which the reference number first appears.

DETAILED DESCRIPTION

Figure 1:
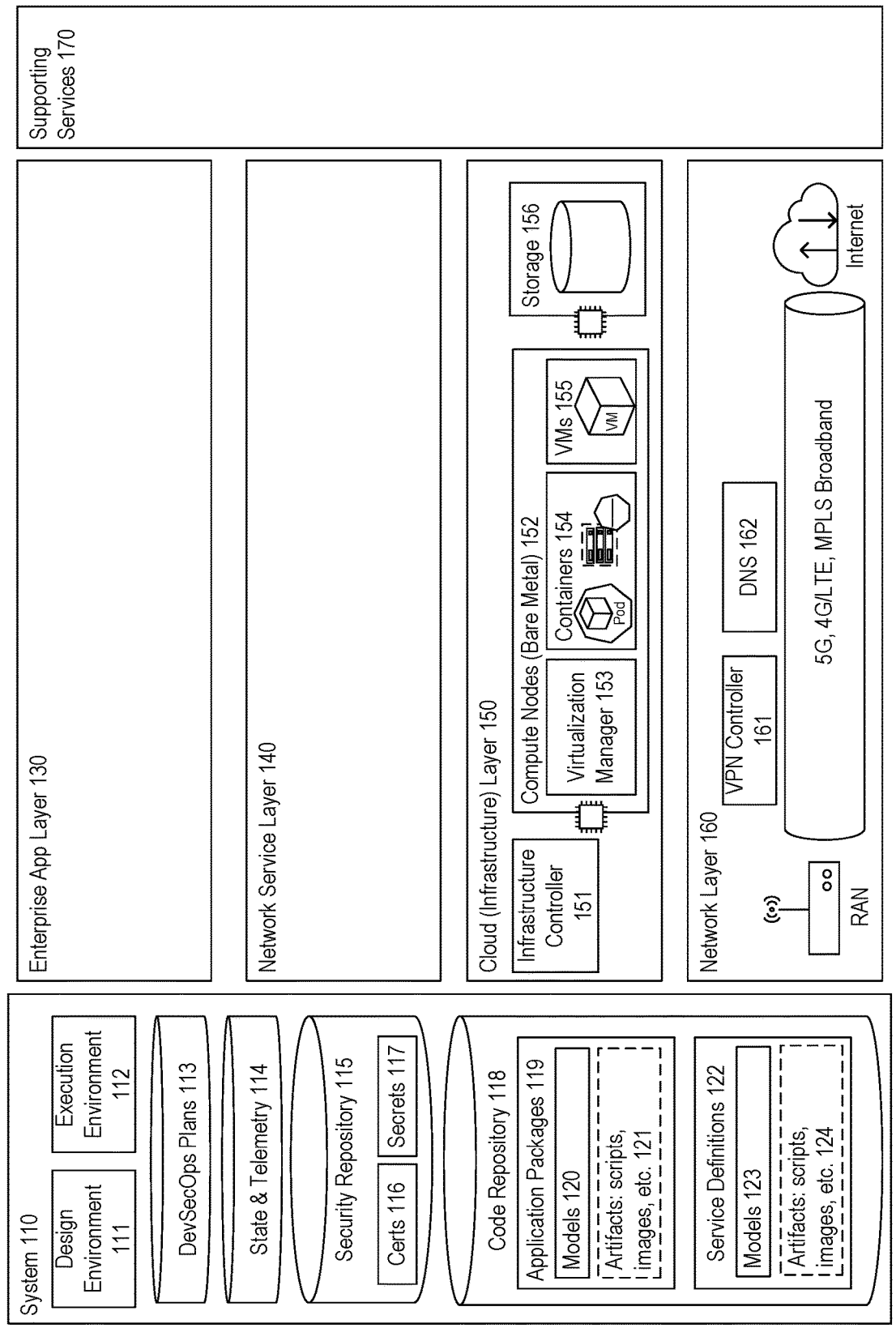
FIG. 1 is a block diagram of an architecture representing telecommunication use-cases in general.

Provided herein are system, apparatus, device, method, and/or computer program product embodiments, and/or combinations and sub-combinations thereof, for deploying and configuring telecommunication network services using a no-code integration and automation platform that implements middleware patterns as a set of event-driven Functions-as-a-Service ("FaaS").

In legacy tools, each middleware environment is a one-off custom integrated stack that requires significant and near-continuous support. This bloated middleware layer requires time and resources to maintain. This distracts developers and engineers from focusing on delivering business solutions.

A technical benefit over these legacy tools may be realized by providing a future-forward platform having its own distribution model to provide a common tooling abstraction across environments. The platform may be cloud-native and modular in its design. The middleware capabilities, or platform services, may be implemented in a serverless style with a unified interface over a set of event-driven functions.

This allows low-latency, high-performance middleware capabilities to be co-located with applications, provides for a consistent developer experience, facilitates interoperability across nodes, and enables centralized and automated lifecycle management. This edge-optimized approach helps businesses scale operationally. One such future-forward platform is EnterpriseWeb.

EnterpriseWeb provides a no-code integration and automation platform that implements middleware patterns as a set of event-driven Functions-as-a-Service ("FaaS"). EnterpriseWeb exposes FaaS that are dynamically configured and coordinated to perform necessary transformations. Instead of deploying, integrating, and maintaining a stack of discrete middleware components, EnterpriseWeb presents a unified interface over a rich set of platform services. EnterpriseWeb offers connection, integration, translation, transformation, orchestration, configuration, and workflow automation capabilities in one single platform.

EnterpriseWeb's platform services are dynamically organized around the requirements of a declaratively modeled intent-based service. The services are dynamically attached by a Type System based on interaction-context. The Type System understands the syntax of each participating element including their protocols and formats. The Type System fetches object information in a catalog and inventory regarding discrete dependencies, constraints, affinities, connection details (certificates/authorizations), etc. More details are provided in U.S. patent application Ser. No. 17/352,975 titled "Unified Operating System For Distributed Computing," which is herein incorporated by reference in its entirety.

The Type System references a Graph Knowledge base for domain semantics (concepts, types, and policies) regarding organizational and standard information model governing the relationships between elements. More details are provided in U.S. patent application Ser. No. 16/243,012 titled "Declarative Software Application Meta-Model and System for Self Modification," which is herein incorporated by reference in its entirety.

In EnterpriseWeb, a service designer specifies a topology identifying relationships between participating service elements along with service chain logic and Service Level Agreement ("SLA") policies. The service designer provides this topology declaratively with no code, providing basic information that defines the business use-case without any implementation details. The declarative model of the intent-based service is decoupled from its implementation. The system then leverages related information from participating objects (formats, protocols, schemas, and state), domain model (concepts, policies, and relationships), and types (behaviors and operations) to generate a detailed machine-readable deployment plan. More details are provided in U.S. patent application Ser. No. 16/213,161 titled "Systems and Methods for Domain-Driven Design and Execution of Meta-models," which is herein incorporated by reference in its entirety.

Once designed, the service may be published to a catalog and ordered. An order for a new service prompts the system to dynamically construct a pipeline—i.e., a single logical event-driven dataflow process coordinated by the platform to realize the intent of the declaratively modeled service. The deployment plan accounts for non-functional concerns, such as reliable messaging, transaction guarantees, and state management, which are critical to safe and resilient services. The system documents its own actions in an execution trace.

EnterpriseWeb is conceptually similar to a "Cloud Integrated Development Environment ("IDE")" with a Domain Specific Language that provides metadata and relationships for declarative development. However, Enterprise Web also features an integrated execution environment so the same metadata and relationships supports event-driven automation and policy-based management. The run-time transparently handles reliable messaging, transaction guarantees, and state management so developers can focus on application logic rather than the low-level "plumbing."

Once deployed, the platform provides zero-touch life-cycle management using closed-loop automation to maintain the declared state of the intent-based services and ensure declared SLA policies. By handling implementation details, automatically attaching and executing middleware tasks as necessary to fulfill the service, the platform greatly simplifies service design, deployment, and management. This productivity solution handles tedious and redundant tasks so developers can focus on the business use-case logic—the "what," not the "how."

EnterpriseWeb provides numerous additional technical benefits over legacy systems including:

Improved Performance: The unified platform eliminates hops, joins, and context switching between components, reducing transaction overhead and liberating cycles for more input/output ("I/O") and compute intensive applications.

Composable Building Blocks: The no-code platform enables application developers to flexibly compose and configure tools for a wide variety of use-cases-cloud, Internet-of-Things ("IoT"), network and system automation, as well as dynamic business processes.

Reduced Costs: The comprehensive platform services allow organizations to consolidate technologies resulting in smaller footprints, reduced infrastructure costs, less system integration work, accelerated time-to-value, and fewer license and maintenance agreements.

Cloud-Native Deployment: EnterpriseWeb deploys with an Operator or a Helm file as a Cluster of Pods (containers) with a key-value/noSQL database as a Backing Store. The lightweight, distributable platform provides low-latency, high-performance middleware services in the cloud, in the data center, and at the edge.

Application Fabric: As an integration and automation platform, EnterpriseWeb can naturally connect its own distributed instances in a mesh network. This "Application Fabric" provides consistent tooling across environments and enables centralized and automated lifecycle management. Just as a service mesh decouples networking services from cloud-native applications, EnterpriseWeb's application fabric decouples event-driven middleware services from applications so they can evolve independently.

Bring-Your-Own-Middleware: Rather than tightly integrate with each cloud provider's application services—which is expensive, leads to silos, creates vendor lock-in, and inhibits multi-cloud initiatives—customers can now bring their own middleware to all of their hybrid/multi-cloud environments. This is a game-changing capability that makes business applications infrastructure independent.

Cloud Network Functions Virtualization ("CloudNFV"): The telecommunications industry has long suffered from the stack problem (i.e., discrete, vertically integrated silos that constrain interoperability and change). EnterpriseWeb's CloudNFV solution applies its capabilities to the telecommunications domain. CloudNFV is next generation open-source software. CloudNFV is horizontally-architected, event-driven, model-based, policy-controlled, and distributable. CloudNFV allows Telcos to move past their bloated stacks and unwieldy tool-chains, which present a fundamental roadblock to transformation.

CloudNFV's platform features a graph-connected, telecommunications-operational model to efficiently hydrate functions (stateful Cloud-native). The result is lightweight, low-latency, high-performance middleware for highly-dynamic and intelligent applications. CloudNFV can deploy like a Service Mesh, providing distributable operational support system ("OSS") services with central lifecycle management.

CloudNFV's platform services provide foundational capabilities that collectively support telecommunication functional roles like End-to-End Orchestration, Service Management and Orchestration ("SMO"), Lifecycle Management ("LCM"), and development, security, and operations ("DevSecOps") automation, all-in-one unified, lightweight distributable OSS that is cloud-native, edge-optimized, and metaverse-ready.

Design-Time Environment: EnterpriseWeb allows engineers to declaratively compose intent-based network services. The platform models service graphs, service chain policies, and SLAs. The platform generates a deployment workflow (editable state chart) with automated exception handling, real-time transaction trace, and zero-touch management (end-to-end service health and SLA enforcement).

Run-Time Environment: An order triggers CloudNFV to execute the deployment workflow. Tasks are contextualized for service design offering parallel and sequential tasks, code-generation, orchestration configuration, messaging, and transaction guarantees. If the deployment succeeds, the workflow updates inventory with the new network service and provides zero-touch management. If the deployment fails, the workflow releases all resources and reports to the ordering system.

Rationalized Tooling, Unified Management, and Composable Solutions: Unwieldly and static tool-chains introduce costs and complexity for solution deployment and management. CloudNFV reduces tool-chain complexity and provides common management across an end-to-end solution. CloudNFV eliminates the need for custom scripts and templates. CloudNFV supports flexible integration and federation.

Composable and Extensible Services: Standard implementations are siloed and difficult to extend or modify. CloudNFV enables composition and management of additional solution elements without manual integration.

Improved Implementation: Inclusion of a CloudNFV cluster provides a high-level application control plane for end-to-end management. Certain control components can be removed, further reducing solution complexity, eliminating direct application access and enhancing security.

Resource-Efficient, Edge-Optimized, Green-Tech. Reduced resource footprint and consumption relative to a conventional OSS/middleware-stack-based approach. In short, EnterpriseWeb does more with less—the heart of elegant software design. EnterpriseWeb has refactored OSS/middleware to be cloud-native, edge-optimized and metaverse-ready.

The breadth, depth and inherent complexity of the various use cases described below showcases the richness of the abstraction and automation both east-to-west (across deployed/connected services) and north-to-south (across layers—app, service, cloud, network).

Generic Telecommunications Use Case

FIGS. 1-6 describe a generic telecommunications use case.

FIG. 1 is a block diagram of a 4-layer architecture 100 representing telecommunication use-cases in general. Architecture 100 may represent the typical components used to implement generic telecommunication use-cases. Architecture 100 may include system 110, design environment 111, execution environment 112, DevSecOps plans 113, state and telemetry 114, security repository 115, certificates 116, secrets 117, code repository 118, application packages 119, models 120, artifacts 121, service definitions 122, models 123, artifacts 124, enterprise application layer 130, network service layer 140, cloud layer 150, infrastructure controllers 151, compute nodes 152, virtualization manager 153, containers 154, virtual machines 155, storage 156, network layer 160, virtual private cloud ("VPC") controller 161, domain name system ("DNS") 162, and supporting services 170.

Design environment 111 may support: 1) onboarding applications packages (deployable software components) by modeling their properties and behaviors and uploading connected artifacts such as scripts and images; and 2) creating service definitions by modeling their network service graphs and uploading connected artifacts such as scripts and images. Collectively, these are referred to as Day 0 Operations. Conventional design environments are typical IDEs providing code editors and basic graphic modeling of business process model and notation ("BPMN") processes.

Execution environment 112 may support the instantiation of the service definitions (Day 1 Operations) and their ongoing management (Day 2 Operations). Conventional execution environments are "tool chains"—large collections of capabilities including multiple runtime engines, workflow/process execution tools, and supporting middleware, typically tightly coupled/integrated to a particular deployment architecture.

DevSecOps plans 113 may be plans (workflows) for executing use-case related operations. DevSecOps plans 113 may conventionally use dedicated continuous integration and continuous deployment ("CI/CD") pipeline/DevOps execution engines.

State and telemetry 114 may be gathered by system 110. State and telemetry 114 may be a set of tightly integrated analytics/monitoring components.

Security repository 115 may store required security credentials including certificates 116 and secrets 117.

Code repository 118 stores application packages 119 having models 120 and artifacts 121 and service definitions 122 having models 123 and artifacts 124. Service definitions 122 are created in design environment 111 and instantiated/managed in execution environment 112.

The 4 layers in the middle of FIG. 1 are the levels of implementation found in most telecommunication solutions.

Enterprise application layer 130 may include any end-user applications running "over the top" of the constructed network service such as consumer apps, IoT apps, etc.

Network service layer 140 may include network-related solution elements involved in the realizing the use-case. Network service layer 140 may include Firewalls, radio access network ("RAN") controllers, etc.

Cloud layer 150 may include compute, storage, and infrastructure management components such as infrastructure controllers 151, compute nodes 152, virtualization manager 153, containers 154, virtual machines ("VMs") 155, and storage 156.

Network layer 160 may include the base connectivity used to connect sites, solution elements, etc., including VPC controller 161 and DNS 162.

Supporting services 170 may represent the set of additional solution elements supporting the use-case. Supporting services 170 include non-functional components such as testing/monitoring and cloud-based services which may be included in the final service such as remote databases, external DNS, etc.

Figure 2:
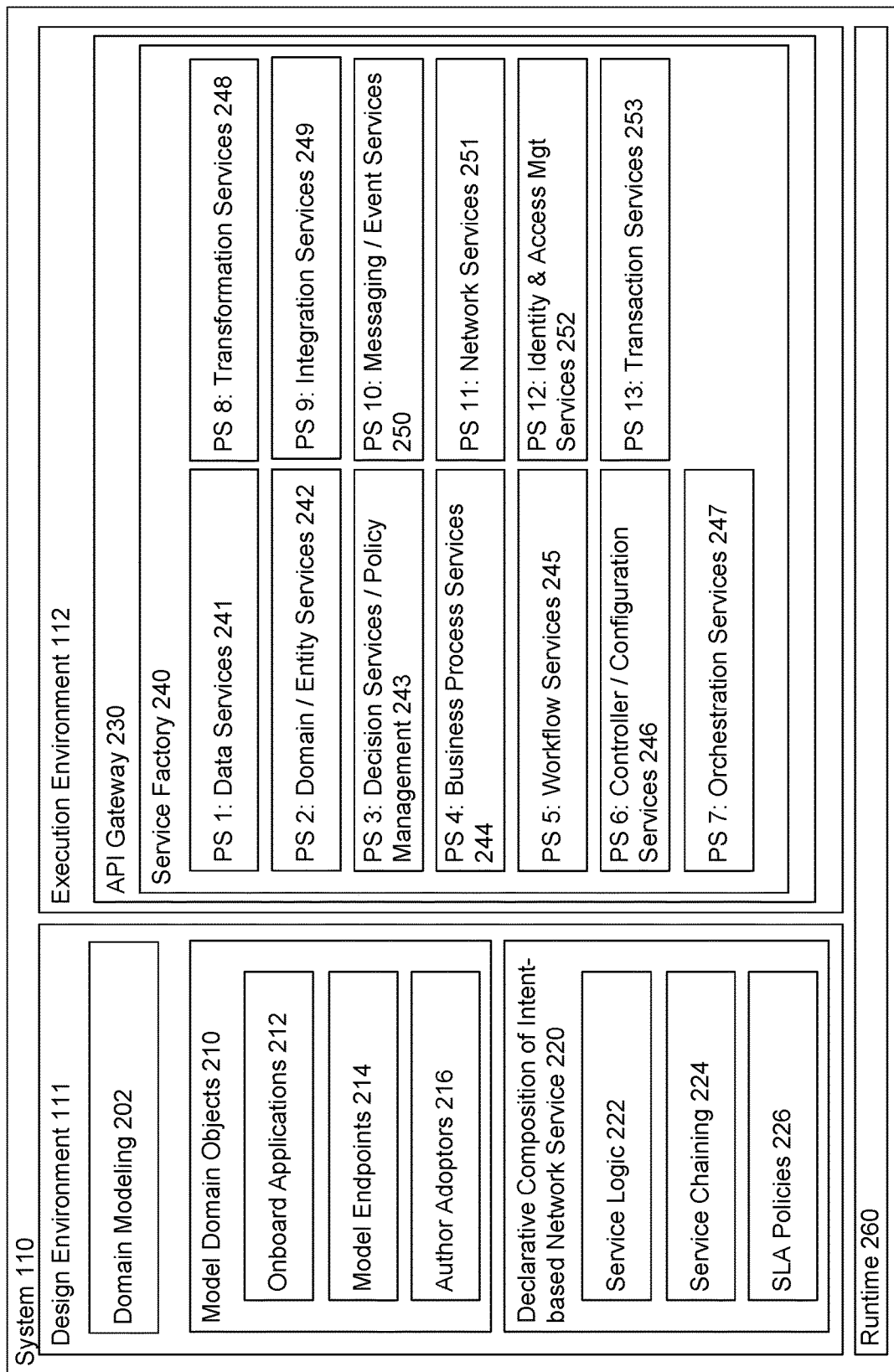
FIG. 2 is a block diagram of system architecture for a no-code integration and automation platform.

FIG. 2 is a block diagram 200 further detailing a no-code integration and automation platform, such as system 110 described in FIG. 1. System 110 may include design environment 111, execution environment 112, and, additionally, runtime 260.

In an embodiment, design environment 111 and execution environment 112 may be conceptual "modes of operation" (not discrete technologies/components). Both design environment 111 and execution environment 112 may use runtime 260 (in design mode, systems/methods may encode objects and in execution mode the same systems/methods may de-code those objects).

Design environment 111 may include domain modeling 202, model domain objects 210, onboard applications 212, model endpoints 214, author adaptors 216, declarative composition 220, service logic 222, service chaining 224, and SLA policies 226. Design environment 111 may be a declarative no-code design environment used for modeling objects, compositions, and processes. Users may be supported during design by a type system which dynamically prompts them for inputs based on the context of the tasks they are engaged in. The type system may support all required tasks for implementing telecommunication use-cases ranging from high level-domain modeling to composing service definitions. Design environment 111 may enable developers to rapidly and declaratively onboard elements, compose services, and chain processes without having to modify the underlying language.

Execution environment 112 may include application programming interface ("API") gateway 230, service factory 240, and platform services 241-253. Execution environment 112 may provide middleware capabilities implemented as stateless, event-driven serverless functions that are dynamically configured and coordinated based on interaction context. Each platform service in platform services 241-253 relates to broad area of message-oriented middleware and other supporting services. Each platform service in platform services 241-253 shares a common design. Each platform service in platform services 241-253 may be composed of a set of algebraic operators that render the contextualized functionality.

Each sequence diagram (e.g., FIGS. 3-6) is organized the same. System 110's components for "Platform Services" (platform services 241-253), "Service Factory" (service factory 240, "and "API Gateway," (API gateway 230), which together are responsible for "Execution," are shown to the left. Each system interaction includes a note indicating which platform service in platform services 241-253 is rendered to deliver the task. The right side shows the resulting interaction with the system's actors.

Figure 3A:
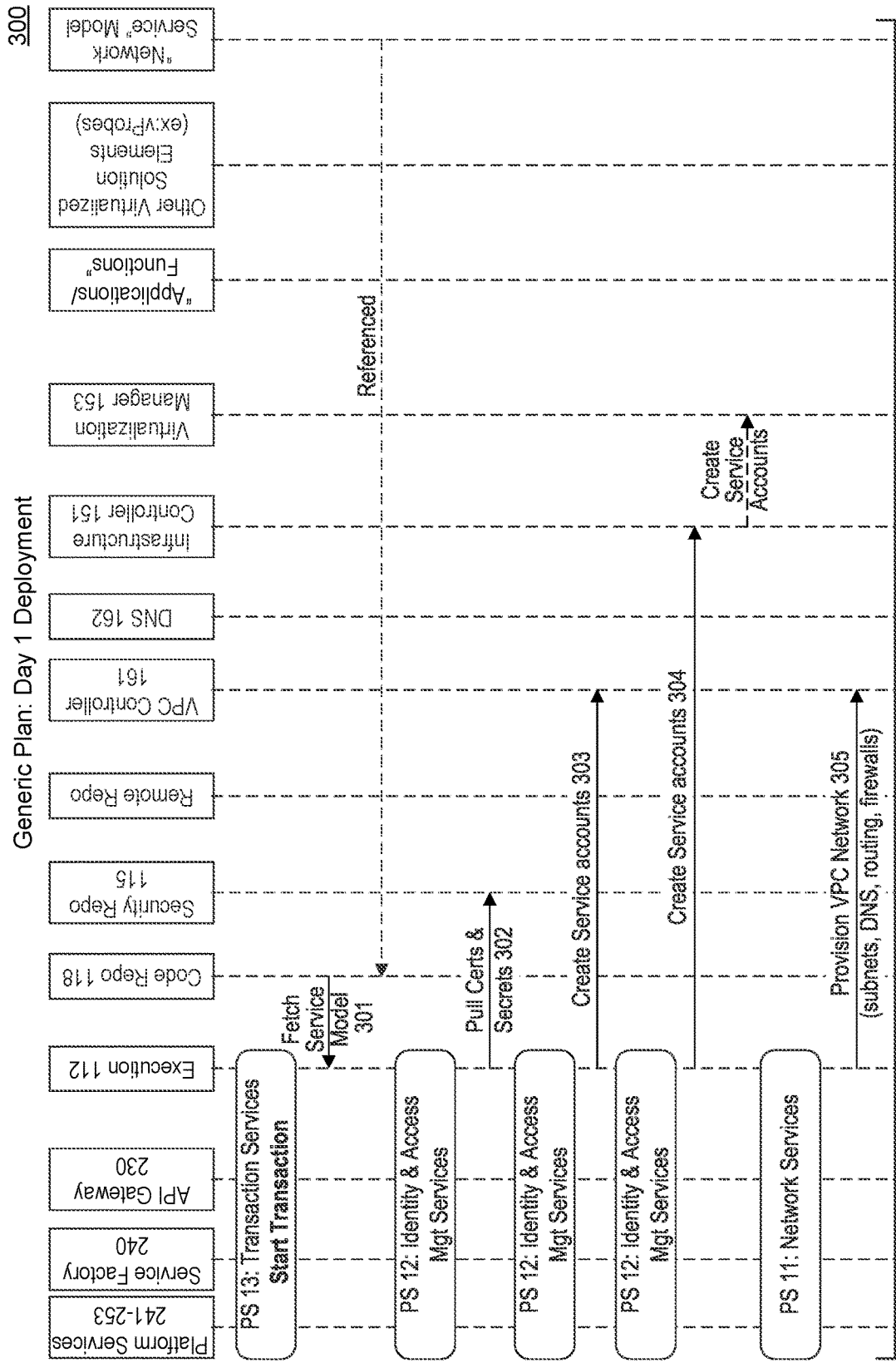
FIGS. 3A-3B are a sequence diagram illustrating a day-one deployment method performed in a generic use case.
Figure 3B:
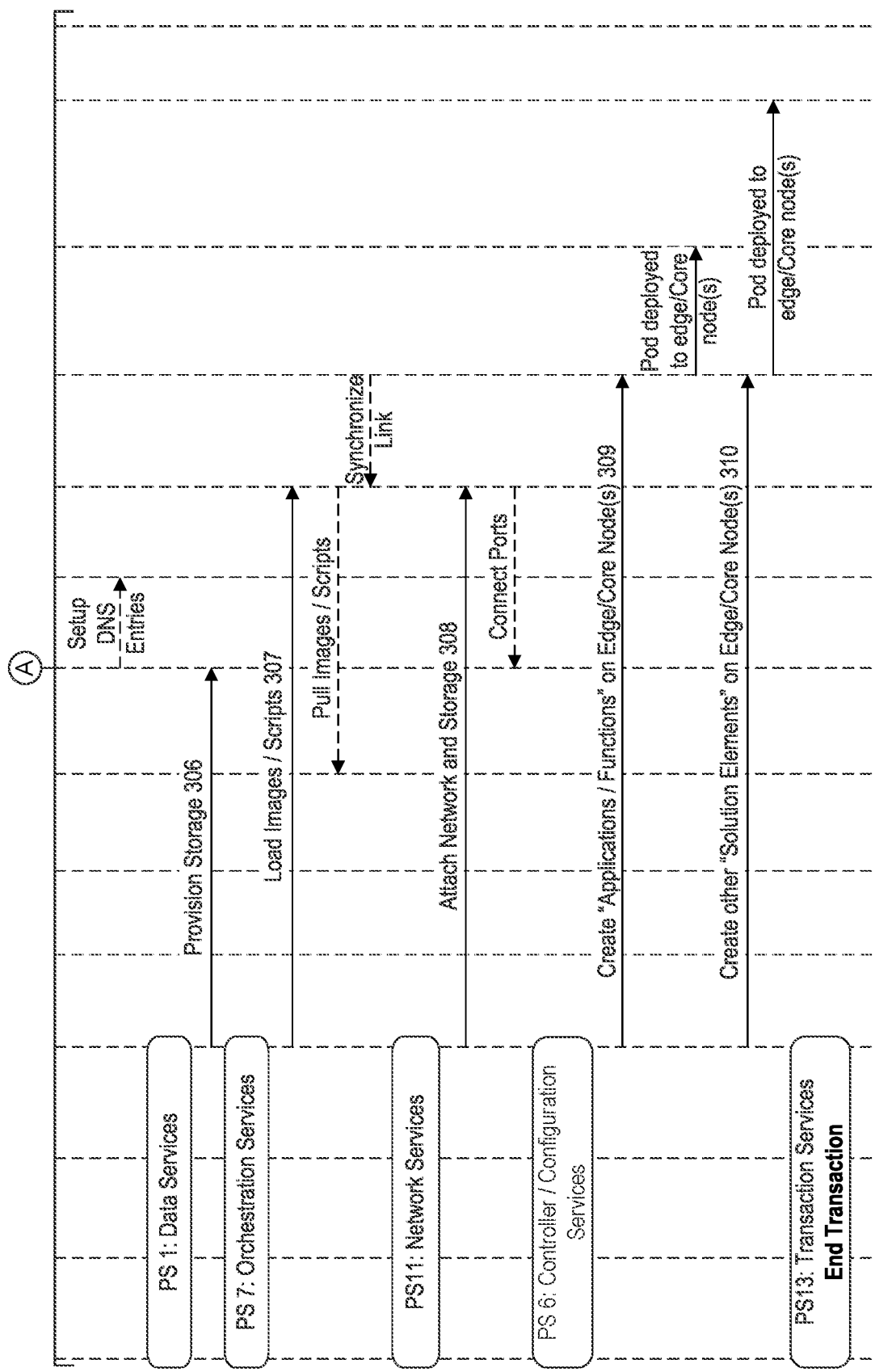

FIGS. 3A-3B are a sequence diagram illustrating a method 300 of performing day-one deployment in a generic use case, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 3A-3B, as will be understood by a person of ordinary skill in the art(s).

Day-one deployment involves provisioning the network, storage and compute resources, and deploying all applications required by a generic use-case.

In 301, deployment starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching models 123 from code repository 118. The system also creates a process token (or links to one if it already exists) to implement the transaction and allow the tasks in the use-case depicted to execute asynchronously.

In 302, system 110 requires a security context to interact with the underlying systems and so renders platform service 252 (PS 12: Identity and Access Management Services) which pulls security credentials from security repository 115.

In 303 and 304, system 110 requires service accounts to work with the infrastructure, so renders platform service 252 (PS 12: Identity and Access Management Services) to create service accounts for use with VPC controller 161 and infrastructure controller 151.

In 305, system 110 needs to setup the base network for the service so renders platform service 251 (PS 11: Network Services) which computes the network topology, protocols, constraints and other properties required and uses VPC controller 161 to create subnets, DNS, routing and firewalls to support the service.

In 306, system 110 needs to setup storage for the various applications involved in the service, so renders platform service 241 (PS 1: Data Services) which computes the storage types, volumes and other properties required, and uses VPC controller 161 to provision storage to support the service.

In 307, system 110 needs to ensure the artifacts connected to Application Packages (scripts, images, etc.) are available for the Virtualization Manager(s) which will provision the application nodes. System 110 renders platform service 247 (PS 7: Orchestration Services) to coordinate the transfer of images from a remote repository to the local image repo found in the infrastructure.

In 308, system 110 needs to attach provisioned resources to compute nodes where the applications will be instantiated. System 110 renders platform service 251 (PS 11: Network Services) which attaches the networks and storage to the nodes via VPC controller 161.

In 309 and 310, system 110 then needs to deploy the network applications, so renders platform service 245 (PS 6: Controller/Configuration Services) for this purpose. Platform service 245 determines the specific compute requirements of each application and either create Pod/Containers or VMs via infrastructure controller 151, resulting in one or more components per application.

Deployment then ends with system 110 closing the transaction using via platform service 253 (PS 13: Transaction Services) and at this point committing any/all objects. After successful completion, the system proceeds to day-one integration, described in further detail below with reference to FIG. 4.

Figure 4A:
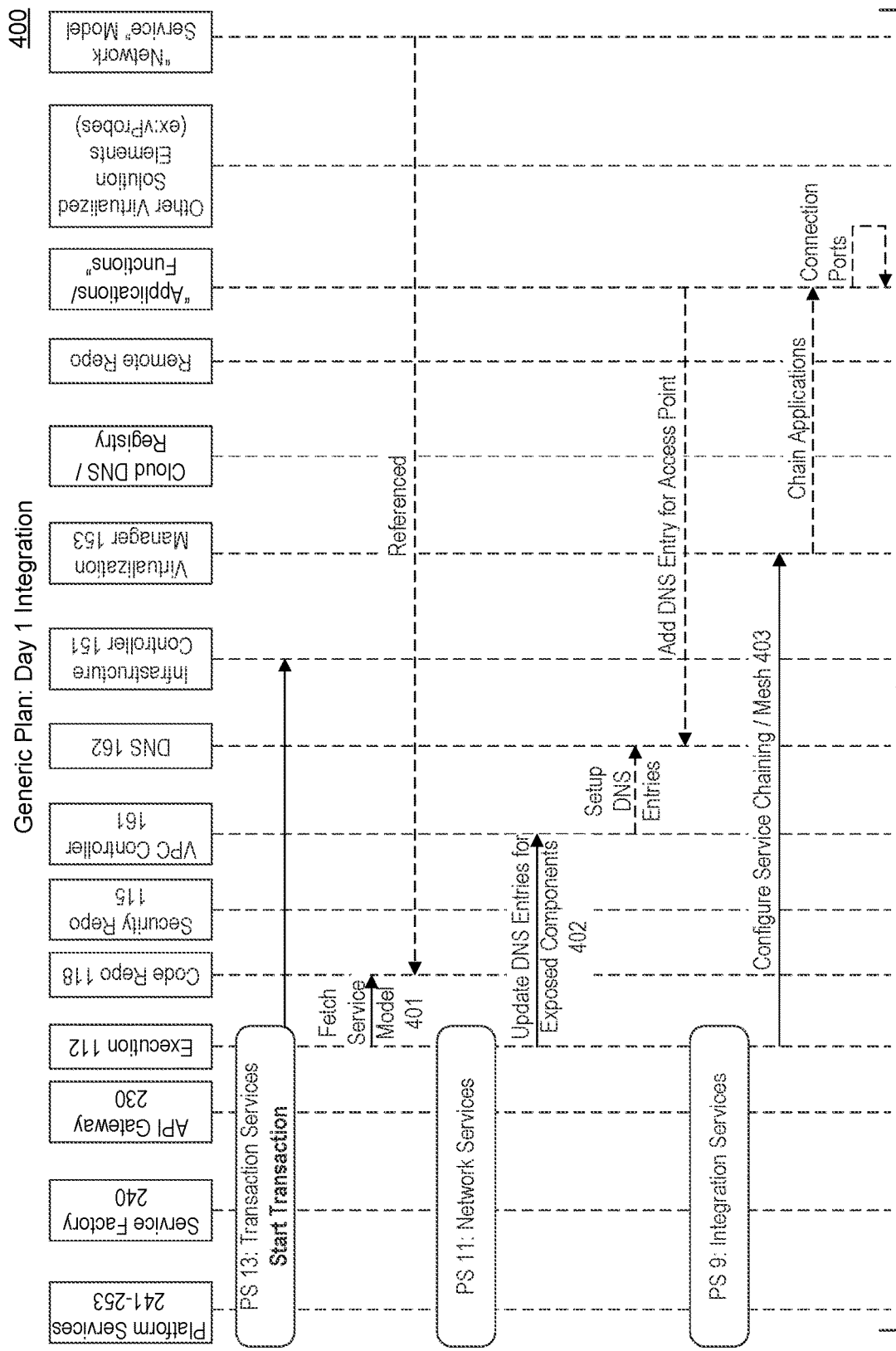
FIGS. 4A-4B are a sequence diagram illustrating a day-one integration method performed in a generic use case.
Figure 4B:
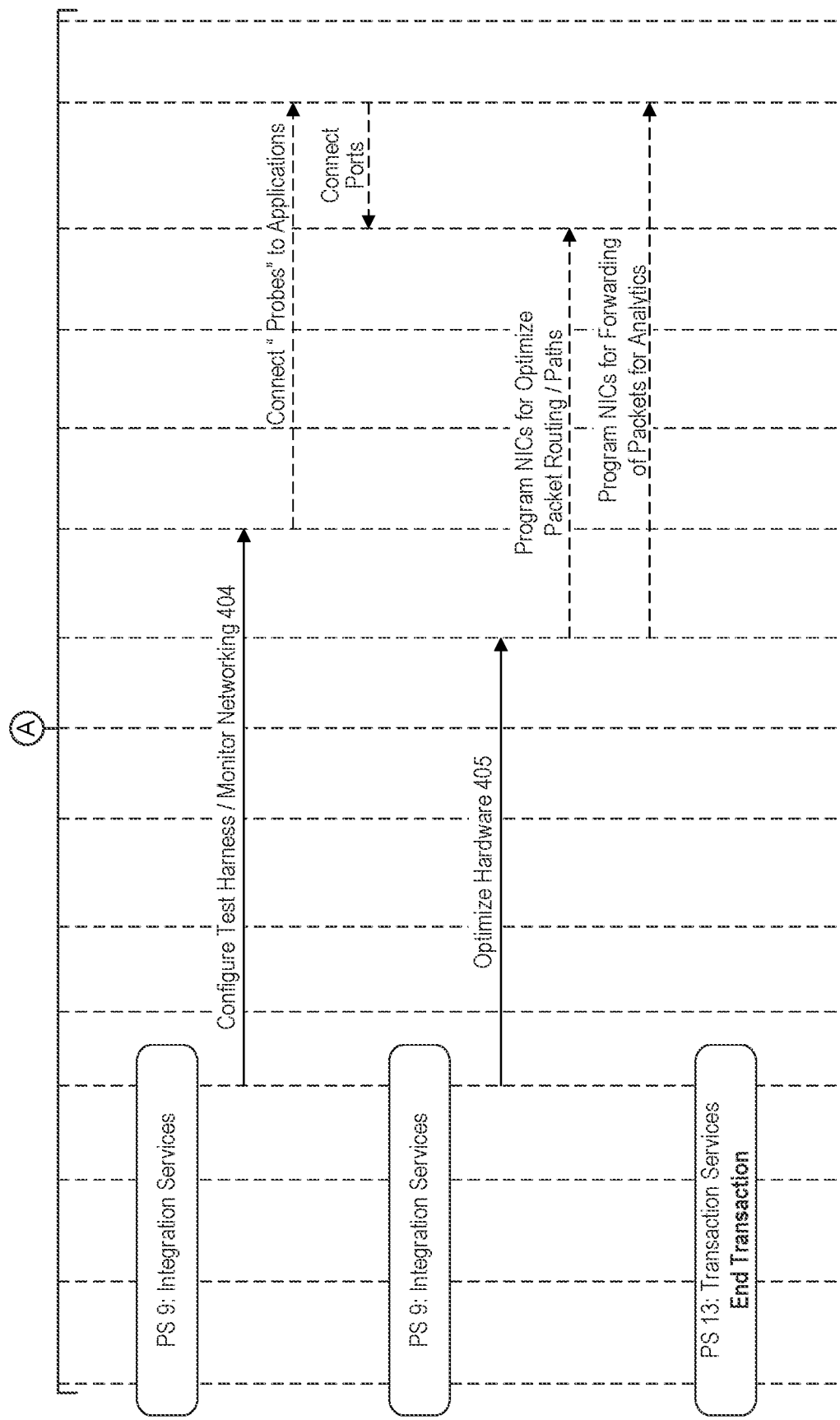

FIGS. 4A-4B are a sequence diagram illustrating a method 400 of performing day-one integration in a generic use case, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 4A-4B, as will be understood by a person of ordinary skill in the art(s).

Day-one integration involves connecting the applications and any supporting services required by the use-case.

In 401, integration starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists) to implement the transaction and allow the tasks in the use-case depicted to execute asynchronously.

In 402, system 110 needs to expose all deployed components (from all applications) to the system at large, so renders platform service 251 (PS 11: Network Services) which resolves Hostname, port, and other requirements for the services and configures DNS 162 via VPC controller 161.

In 403, system 110 needs to chain (link) the deployed components together so they function as a composite service, so renders platform service 249 (PS 9: Integration Services) which resolves the protocols, ports and other networking requirements needed to establish required packet throughput, and sends a command to virtualization manager 153 to connect ports and perform other required tasks on containers 154 and virtual machines 155 involved.

In 404, system 110 configures the test harness and network monitoring via virtualization manager 153. System 110 may identify ports, protocols, and formats which are to be tested. System 110 may establish needed network paths between the probes, monitors, and any other test harness components required to perform the testing.

In 405, the service model includes possible hardware optimizations, which are applicable for the given infrastructure, so system 110 renders platform service 249 (PS 9: Integration Services) which calculates the optimal configuration of packet routing for the specified service, converts this configuration into a set of commands to execute on the hardware (NIC—Network Interface Controller), and uses the commands to program the NIC via infrastructure controller 151.

Integration ends with the system closing the transaction using via platform service 253 (PS 13: Transaction Services), and at this point "committing" any/all objects. After successful completion, the system proceeds to day-one configuration, described in further detail below with reference to FIG. 5.

Figure 5A:
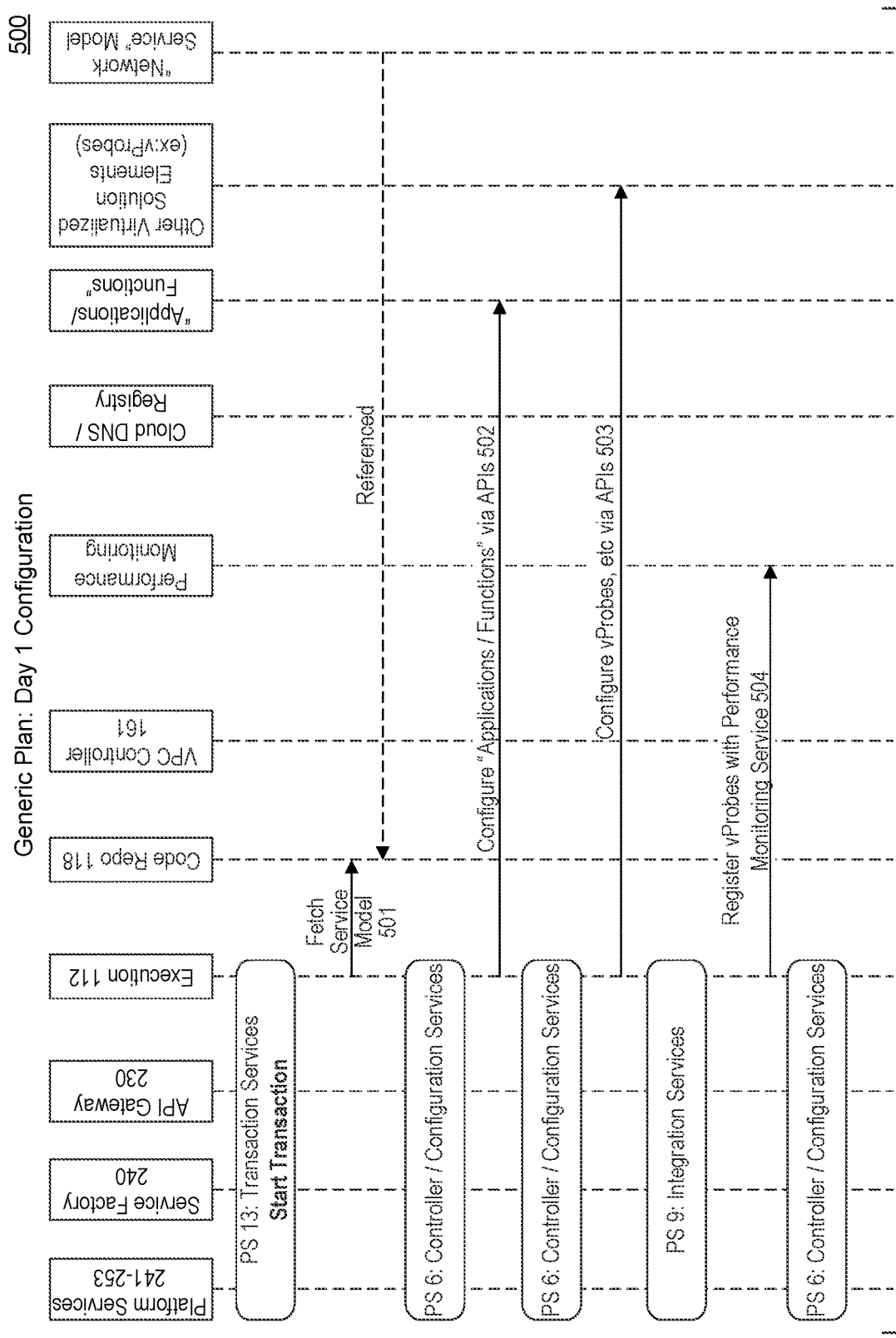
FIGS. 5A-5B are a sequence diagram illustrating a day-one configuration method performed in a generic use case.
Figure 5B:
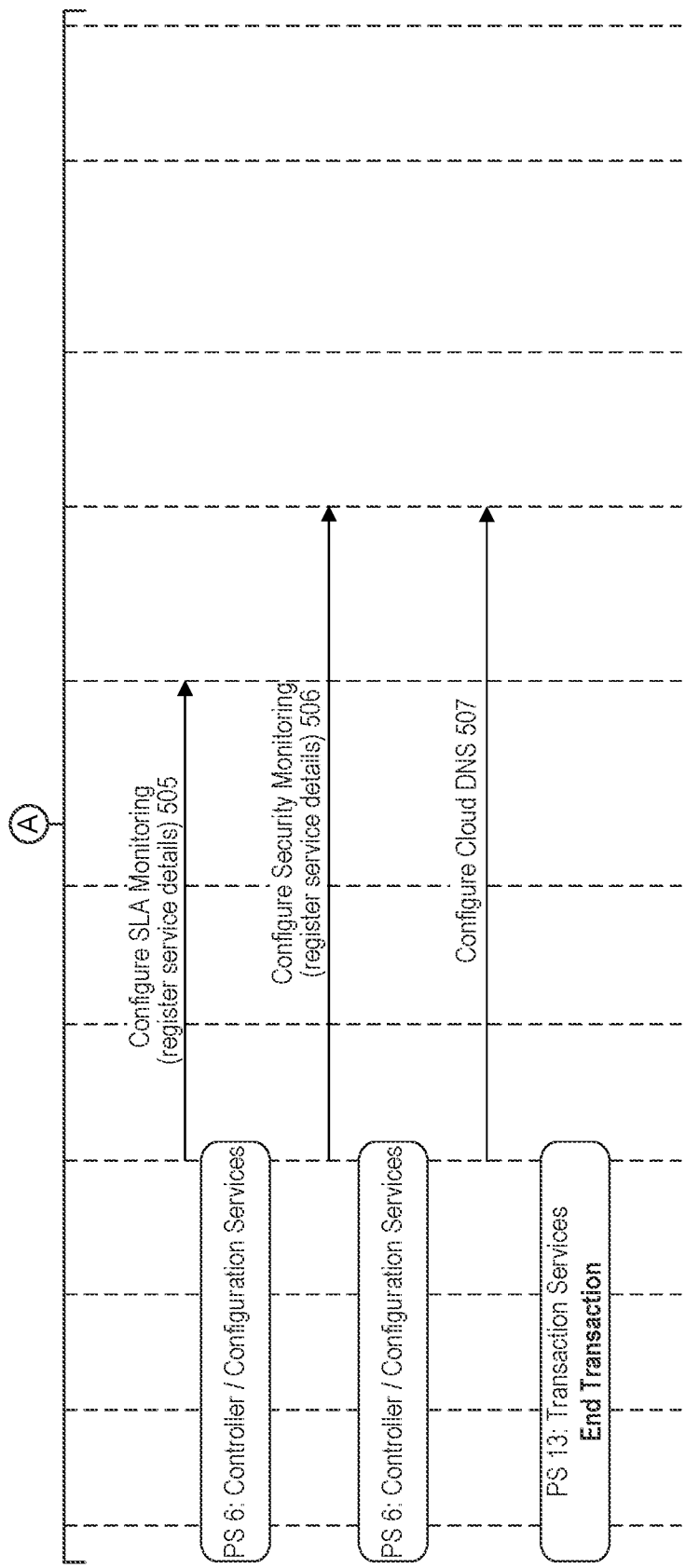

FIGS. 5A-5B are a sequence diagram illustrating a method 500 of performing day-one configuration in a generic use case, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 5A-5B, as will be understood by a person of ordinary skill in the art(s).

Day-one configuration involves configuring all remaining aspects of the solution to realize the end-to-end use-case.

In 501, configuration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists), to implement the transaction and allow the tasks in the use-case depicted to execute asynchronously.

In 502, system 110 needs to configure the service specific applications, so renders platform service 245 (PS 6: Controller/Configuration Services) for this purpose. System 110 determines the specific configuration requirements of each application so that they perform both individually and collectively (as part of the service) and resolves details needed such as types, formats and protocols required to carry out the configurations. System 110 then proceeds to configure the components of each via their available interfaces (Representational State Transfer ("REST"), command line interface ("CLI"), etc.).

In 503, system 110 needs to configure supporting applications, so renders platform service 245 (PS 6: Controller/Configuration Services) for monitoring, determines the specific configuration requirements of the virtual probe which is used by a performance monitoring service, and resolves details needed such as types, formats and protocols required to carry out the configurations, then proceeds to configure the via the available interface (REST).

In 504, system 110 needs to register the probe with the performance monitoring service, so renders platform service 249 (PS 9: Integration Services) for this purpose.

In 505, system 110 needs configure related SLAs within the performance monitoring service, so renders platform service 245 (PS 6: Controller/Configuration Services) for this purpose.

In 506, system 110 needs to configure a security monitoring service, so renders platform service 245 (PS 6: Controller/Configuration Services) for this purpose.

In 507, system 110 needs to expose the service externally so that users can consume it, so renders platform service 251 (PS 11: Network Services) which resolves Hostname, port, and other requirements for the services and configures DNS 162.

Configuration ends with the system closing the transaction using via platform service 253 (PS 13: Transaction Services) and at this point "committing" any/all objects.

After successful completion, the network service is ready to be used, and system 110 may proceed to day-two orchestration, described in further detail below with reference to FIG. 6.

Figure 6A:
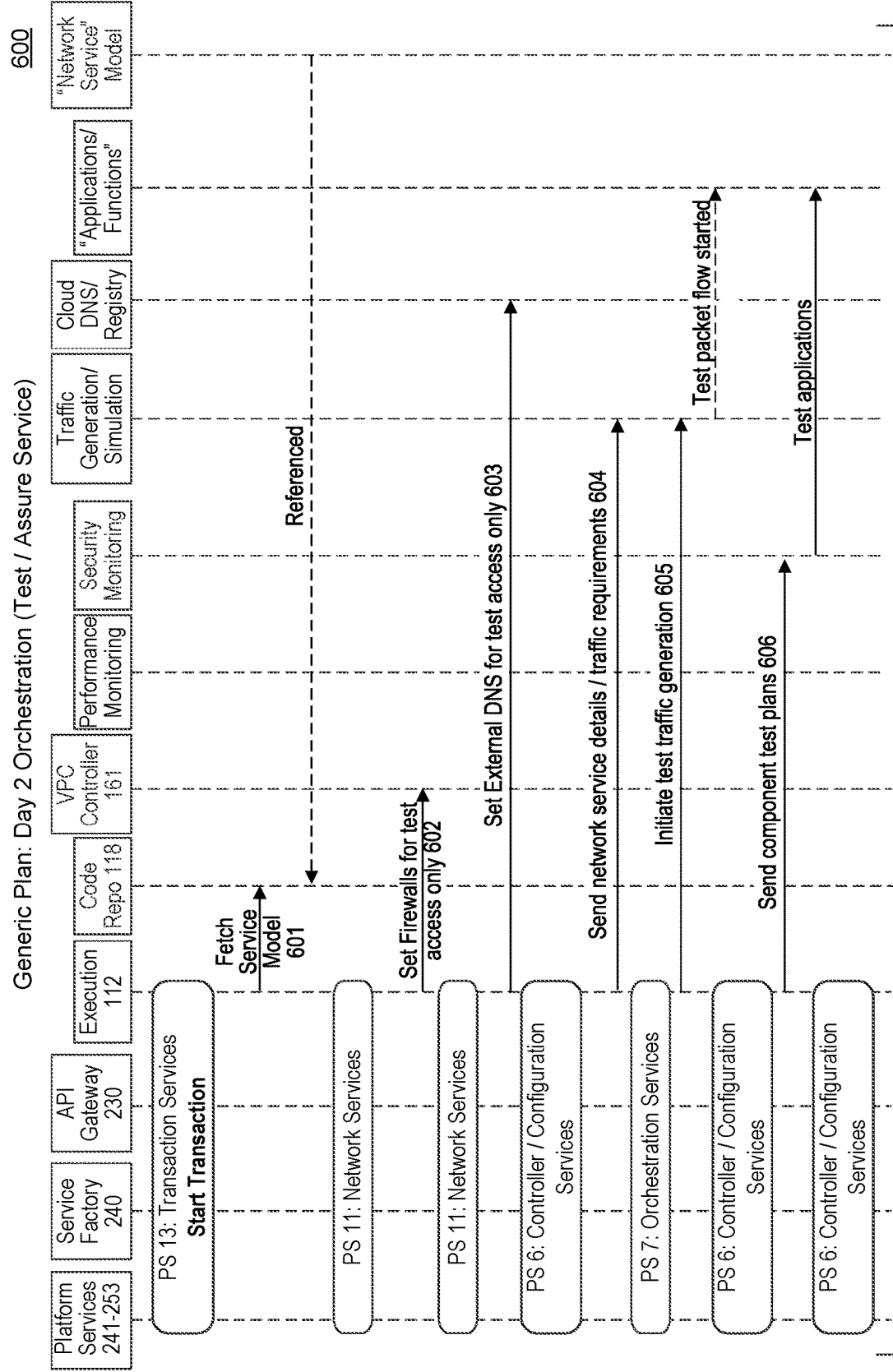
FIGS. 6A-6B are a sequence diagram illustrating a day-two orchestration method performed in a generic use case.
Figure 6B:
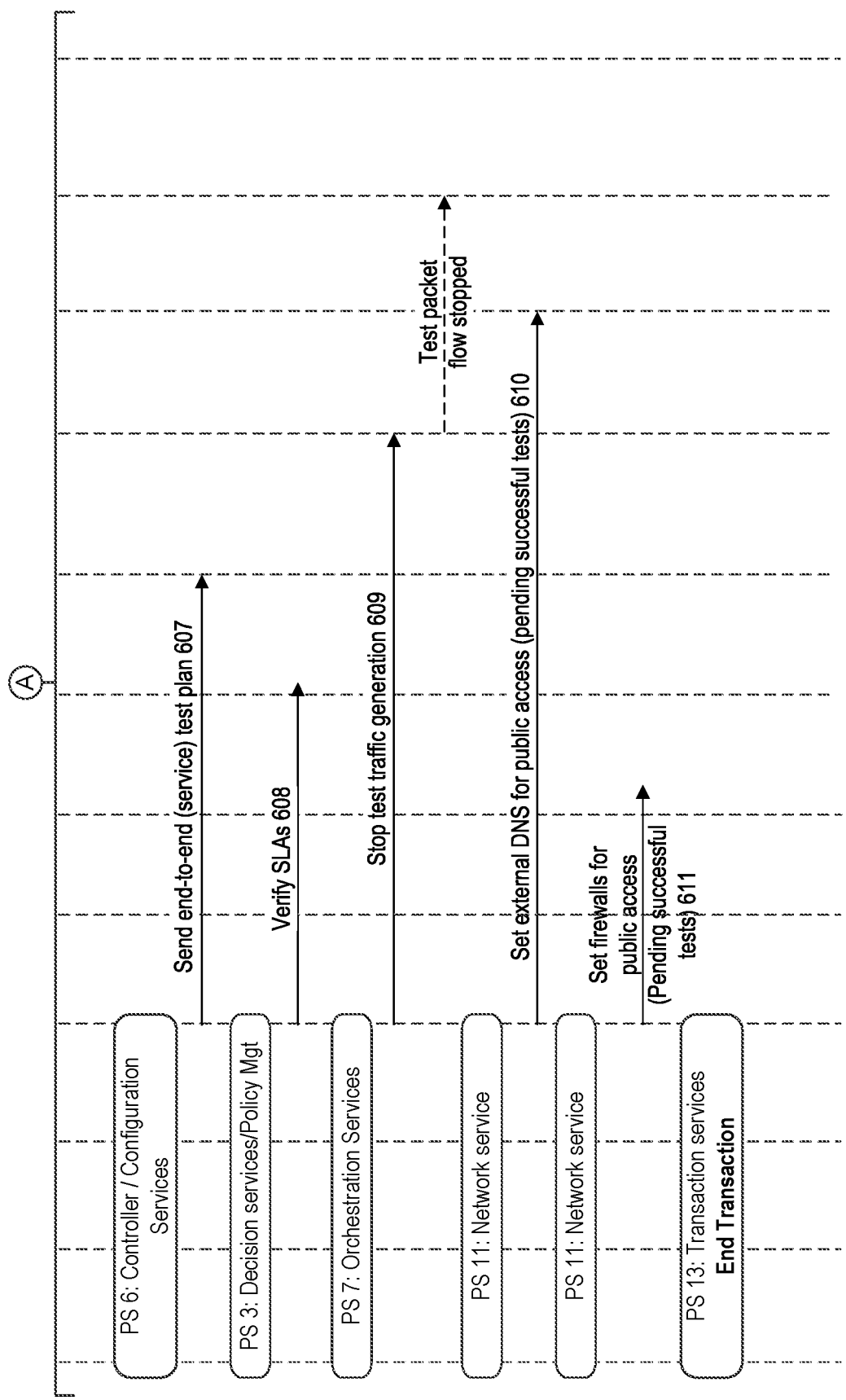

FIGS. 6A-6B are a sequence diagram illustrating a method 600 of performing day-two orchestration in a generic use case, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 6A-6B, as will be understood by a person of ordinary skill in the art(s).

The example shown in FIG. 6 of day-two orchestration is used to test and assure the service by orchestrating a set of test components to measure aspects of the service, both functional and non-functional, against simulated traffic.

In 601, orchestration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction fetches the initial context required to carry out the sequence by fetching the Service Model from code repository 118. System 110 also creates a Process Token (or links to one if it already exists), to implement the transaction and allow the tasks in the use-case depicted to execute asynchronously.

In 602 and 603, for testing, system 110 needs to remove external access to the service, so renders platform service 251 (PS 11: Network Services) which resolves Hostname, port, and other requirements for the services and configures both the local DNS via VPC controller 161 and DNS 162 directly for this purpose.

In 604, for testing, system 110 needs to start a flow to simulate test traffic, so renders platform service 246 (PS 6: Controller/Configuration Services) which determines the formats and protocols required for the test traffic, any other specific characteristics of the traffic, and details such as target IPs/Ports, and configures the Traffic Generation/Simulation component for these purposes via REST.

In 605, once simulated traffic is configured, system 110 needs to start it, so renders platform service 247 (PS 7: Orchestration Services) for this purpose.

In 606, for testing, system 110 needs to verify the success of unit (per application/component) test plans to confirm each component is correctly configured in isolation. System 110 may render platform service 246 (PS 6: Controller/Configuration Services) to compile these plans based on the characteristics of components and the service, and executes them via a security monitoring component.

In 607, for testing, system 110 needs to verify the success of end-to-end test plans, to confirm the components are correctly configured across the overall service. System 110 may render platform service 246 (PS 6: Controller/Configuration Services) to compile these plans based on the characteristics of components and the service, and executes them via the security monitoring component.

In 608, system 110 needs to verify that SLAs are met by the service under load, so renders platform service 243 (PS 3: Decision Services/Policy Management) to carry out this evaluation via the Performance Monitoring component.

In 609, after testing is completed, simulated traffic needs to be stopped, so system 110 renders platform service 247 (PS 7: Orchestration Services) for this purpose.

In 610 and 611, with testing complete, the system needs to restore external access to the service, so renders platform service 253 (PS 11: Network Services) which resolves hostname, port and other requirements for the services and configures both the local DNS via VPC controller 161 and DNS 162 directly for this purpose.

Orchestration ends with the system closing the transaction using via platform service 253 (PS 13: Transaction Services) and at this point "committing" any/all objects. After successful completion, the network service is assured.

Use Case 1: Secure, Multi-Cloud Network for Voice

Use case 1 is the deployment and assurance of a secure, multi-cloud network for voice. The end-to-end network is deployed as part of the use-case, and assured in terms of performance (SLAs). The core service for the use-case is "Secure Multi-Cloud IMS." FIGS. 7-12 describe use case 1. Use case 1 allows a communication service provider to offer a "voice over IP" (VoIP) service to customers (individuals or organizations) with Quality of Service (QoS) guarantees and the ability to secure/limit access to a specific set of IP addresses.

Figure 7:
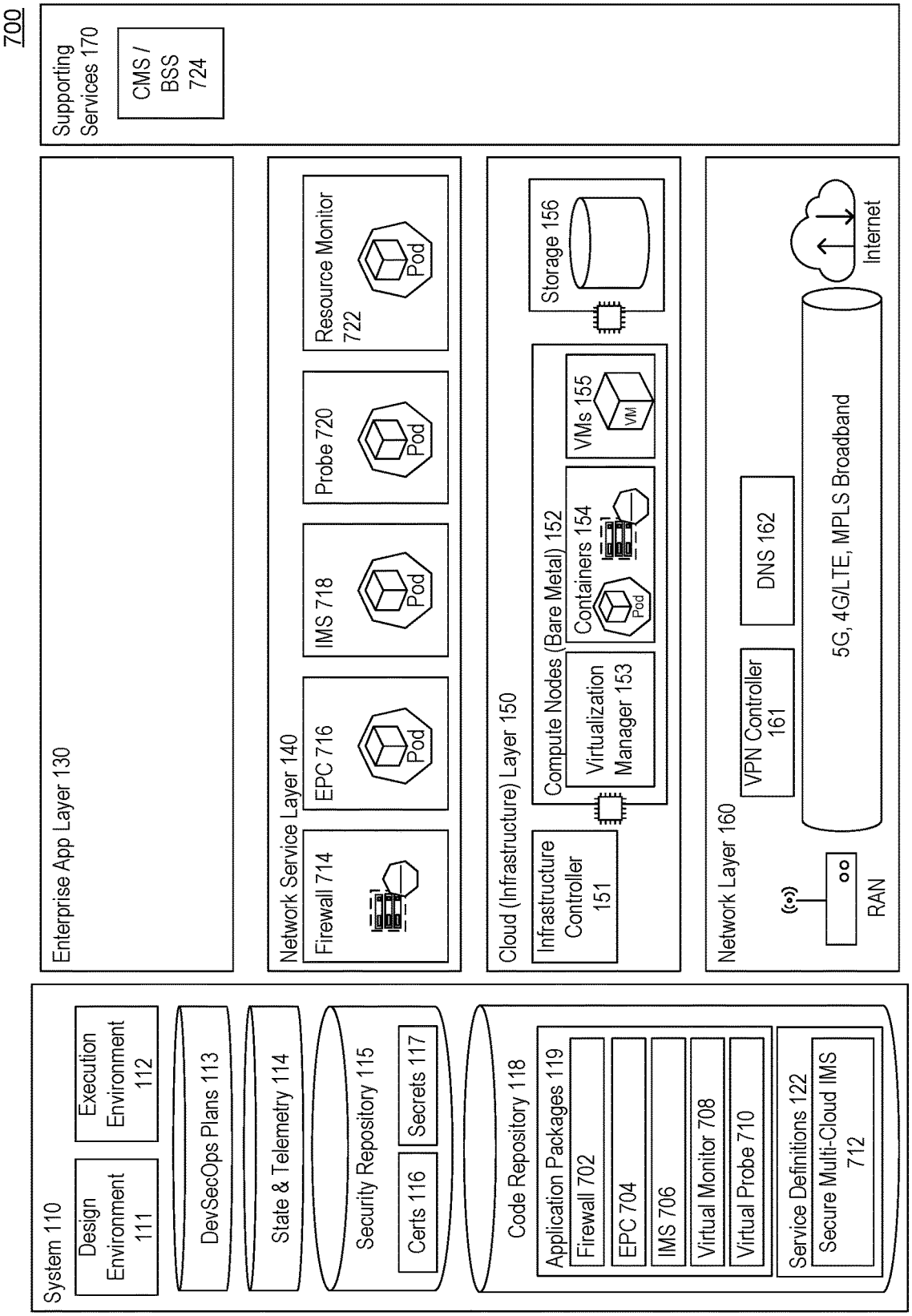
FIG. 7 is a block diagram of an architecture for deploying and assuring a secure, multi-cloud network for voice.

FIG. 7 is a block diagram of architecture 700 for deploying and assuring a secure, multi-cloud network for voice. Architecture 700 may include the components described above with reference to FIG. 1. Additionally, architecture 700 may include firewall package 702, evolved packet core ("EPC") package 704, IMS package 706, virtual monitor package 708, virtual probe package 710, secure multi-cloud IMS 712, firewall 714, EPC 716, IMS 718, probe 720, resource monitor 722, and customer management system/business support system ("CMS/BSS") 724.

Service definitions 122 and application packages 119 are found in code repository 118 in system 110.

In network layer 160, a VPC is implemented via VPC controller 161 with a linked DNS 162.

In cloud layer 150, infrastructure controller 151 provides an interface to compute nodes 152 for each site involved in the use case and to storage 156. Compute nodes 152 have virtualization manager 153 present to support the execution of container-based applications (containers 154) and virtual machine based applications that run on virtual machines 155.

In network service layer 140, the core-network service consists of firewall 714, evolved packet core (EPC) 716, and IP media subsystem (IMS) 718, which together provide the end-to-end voice service. Virtual probe 720 and resource monitor 722 are also deployed for monitoring. Firewall 714 may run as a VM over containers on a "Secure Traffic Domain" Compute Node. EPC 716 may run as containers on a dedicated "EPC Domain" Compute Node, and IMS 718 may run as a container on a dedicated "IMS Domain" Compute Node. Probe 720 may be deployed to the Secure Traffic and IMS domains to measure throughput in the end-to-end service, and resource monitors 722 are placed in all domains. Application packages 119 for each component are found in code repository 118.

No applications are deployed in enterprise application layer 130 for this use-case.

Supporting service 170 for this use-case include centralized CMS/BSS 724 (Customer Management System/Business Support System).

Figure 8:
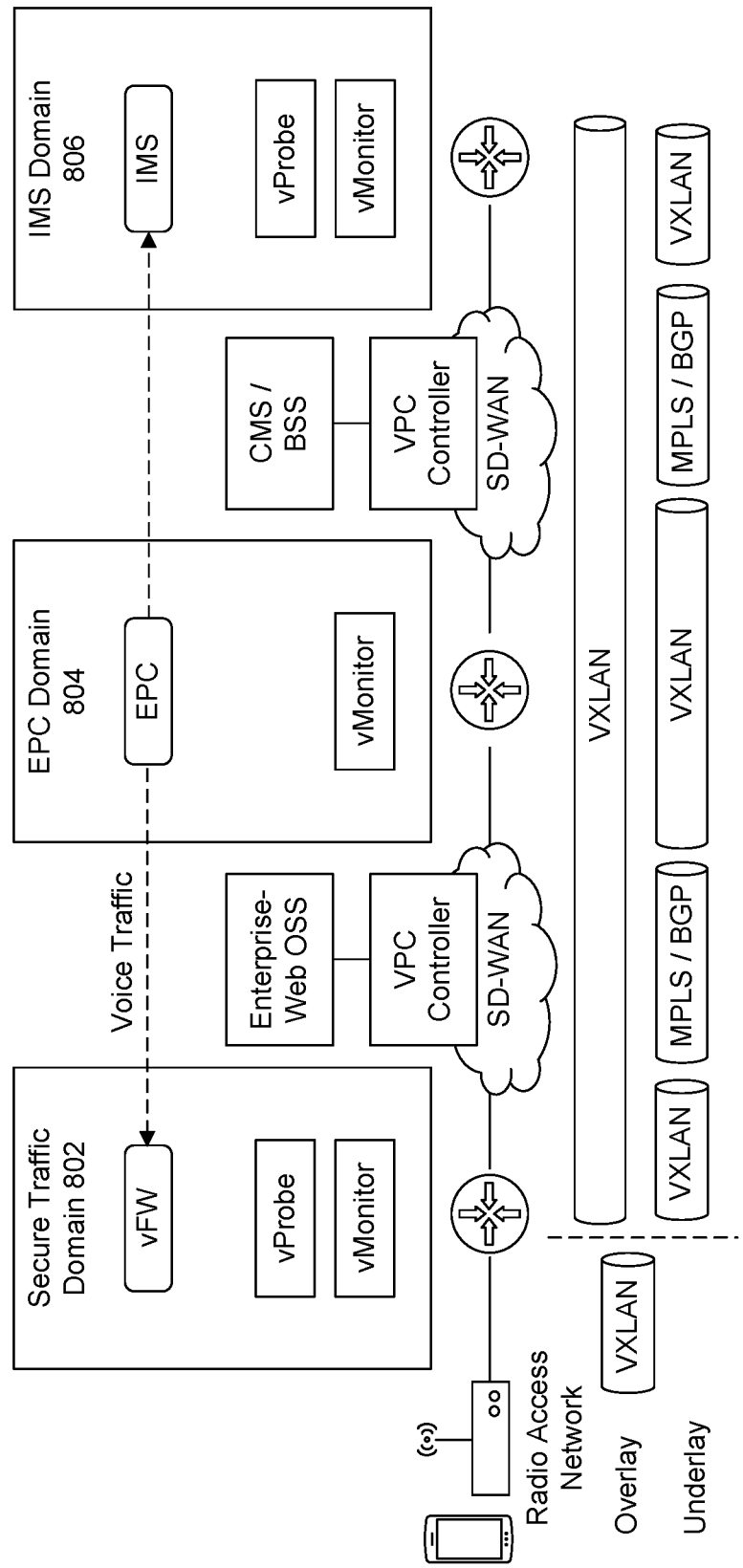
FIG. 8 is a network service diagram for the use case for deploying and assuring a secure, multi-cloud network for voice.
Figure 9A:
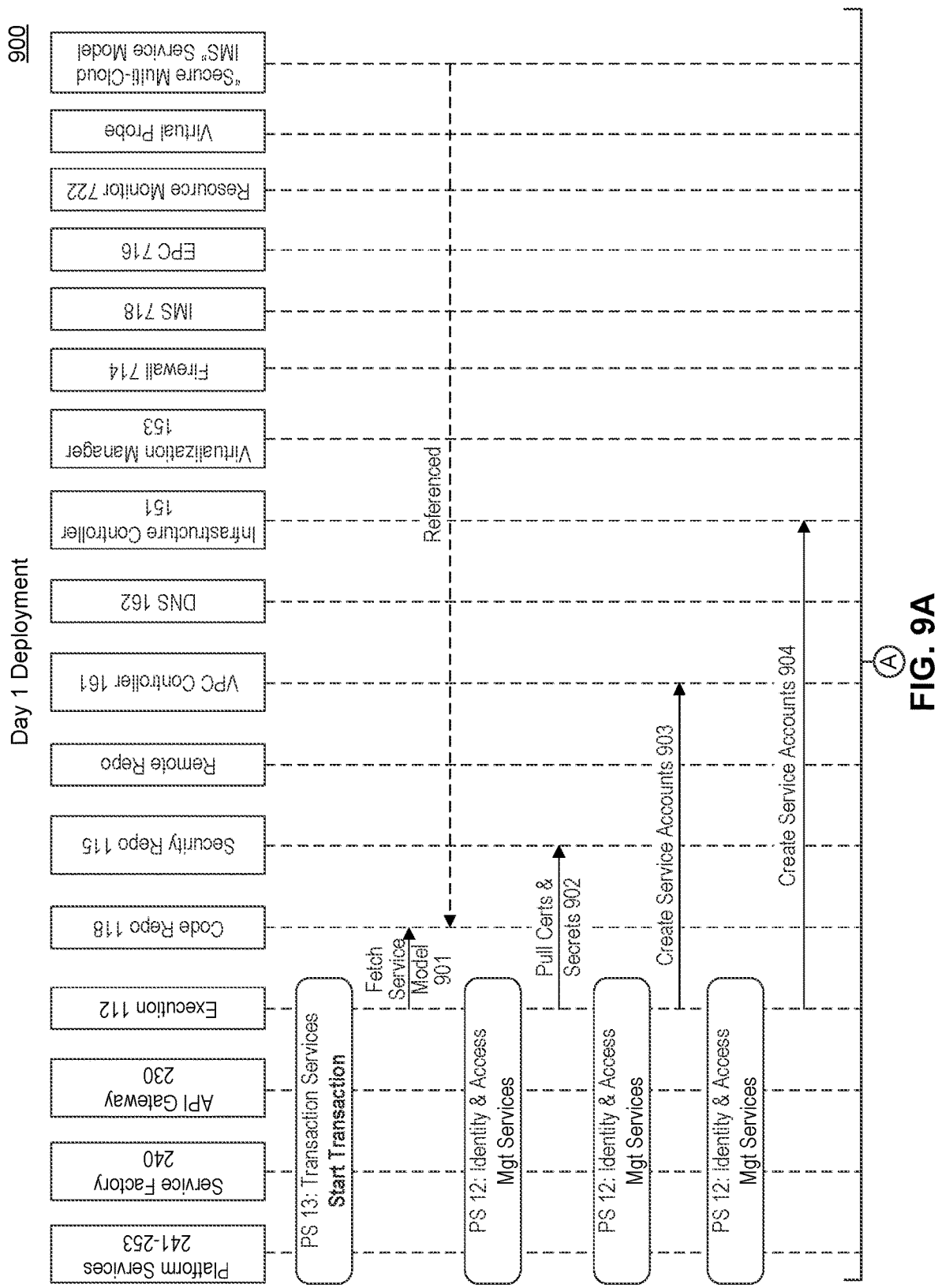
FIGS. 9A-9D are a sequence diagram illustrating a day-one deployment method performed in the use case for deploying and assuring a secure, multi-cloud network for voice.
Figure 9B:
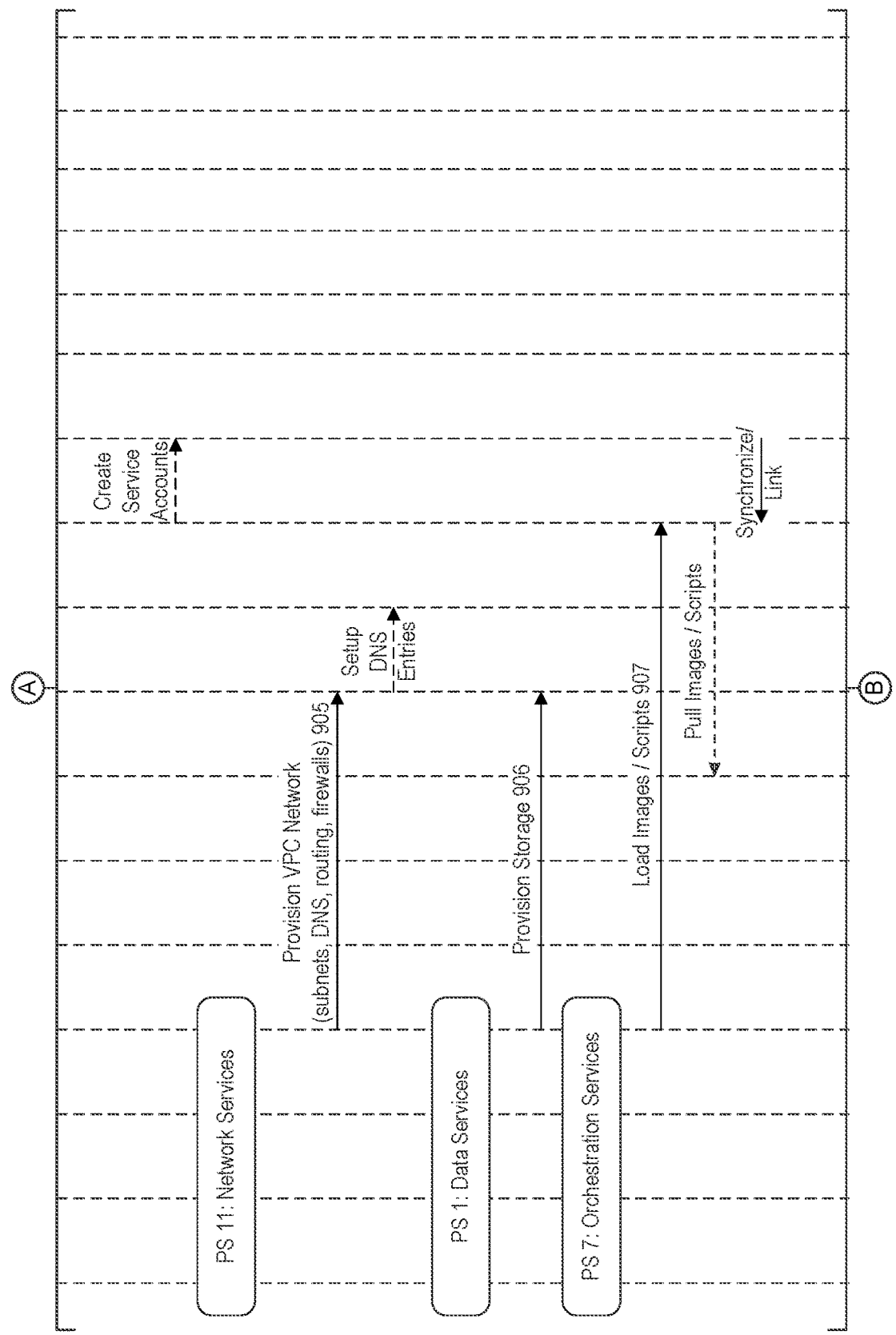
Figure 9C:
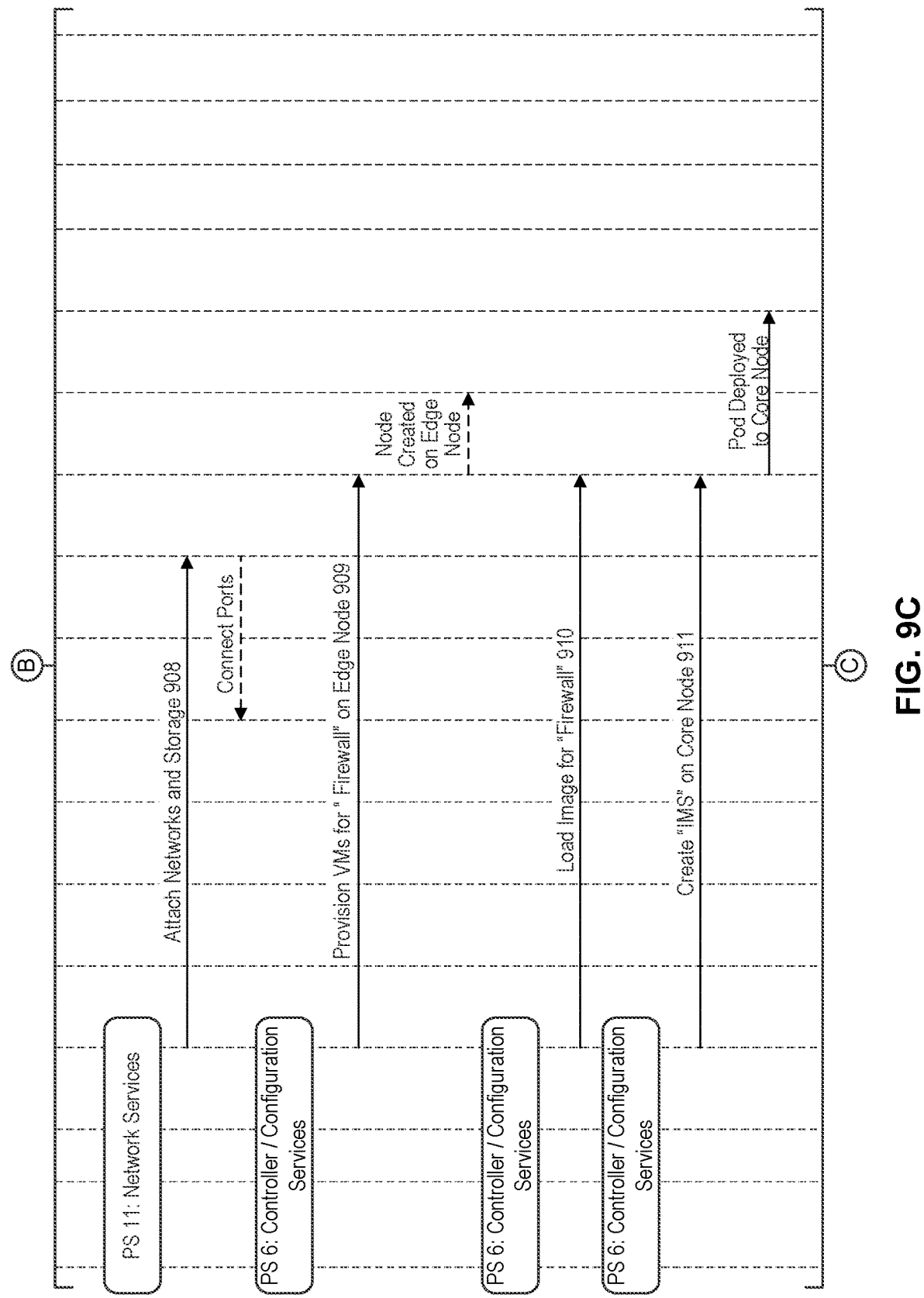
Figure 9D:
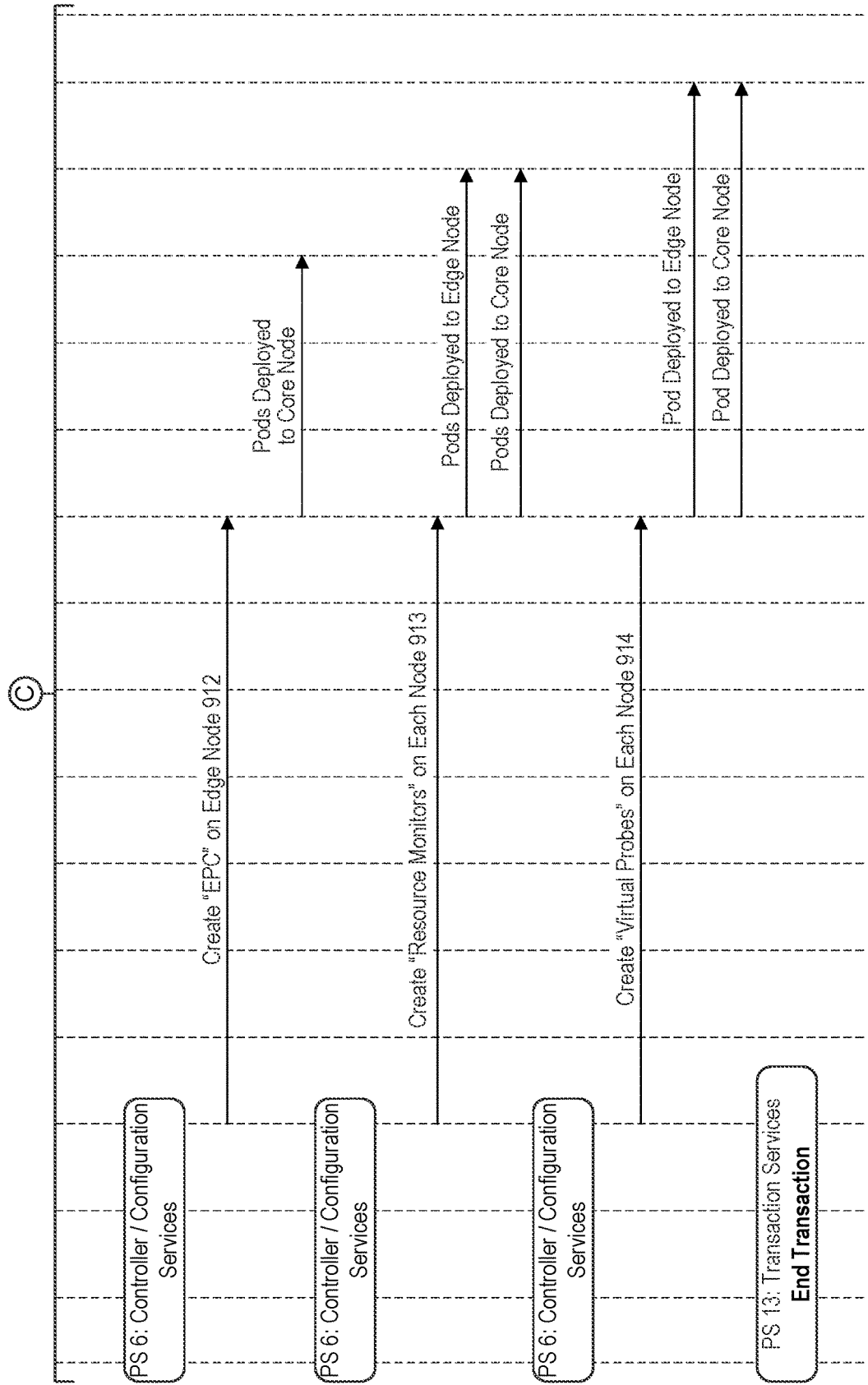

FIG. 8 is a network service diagram of a network service 800 for the use case for deploying and assuring a secure, multi-cloud network for voice. Network service 800 may include secure traffic domain 802, EPC domain 804, and IMS domain 806.

The use-case is implemented across three nodes: secure traffic domain 802, EPC domain 804, and IMS domain 806. Secure traffic domain 802, EPC domain 804, and IMS domain 806 are connected via a VPC network and connected switches. Secure traffic domain 802 is also connected to a radio access network 808. IMS domain 806 is also connected to the Internet. The VPC is implemented by a standard set of overlay and underlay protocols.

Secure traffic domain 802 has VMs over containers for the vFW (virtual Firewall) and containers/pods for probes that act as Performance and Resource Monitors. EPC domain 804 has containers/pods for the EPC and containers/pods for probes that act as a Resource Monitor. IMS domain 806 has containers/pods for the IMS and containers/pods for probes that act as Performance and Resource Monitors.

A centralized deployment of the EnterpriseWeb System acts as an OSS (Operations Support System) to execute the end-to-end use-case and is connected independently via the VPC. CMS/BSS 724 is connected independently via the VPC.

Each sequence diagram (e.g., FIGS. 9-12) is organized the same. System 110's components for "Platform Services" (platform services 241-253), "Service Factory" (service factory 240, "and "API Gateway," (API gateway 230), which together are responsible for "Execution," are shown to the left. Each system interaction includes a note indicating which platform service in platform services 241-253 is rendered to deliver the task. The right side shows the resulting interaction with the system's actors.

FIGS. 9A-9D are a sequence diagram illustrating a method 900 of performing day-one deployment in the use case for deploying and assuring a secure, multi-cloud network for voice, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 9A-9D, as will be understood by a person of ordinary skill in the art(s).

Day-one deployment involves provisioning the network, storage and compute resources, and deploying all applications required by a secure, multi-cloud network for voice.

In 901, deployment starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching models 123 from code repository 118. The system also creates a process token (or links to one if it already exists) to implement the transaction and allow the tasks in the use-case depicted to execute asynchronously.

In 902, system 110 requires a security context to interact with the underlying systems, so renders platform service 252 (PS 12: Identity and Access Management Services) which pulls security credentials from security repository 115.

In 903 and 904, system 110 requires service accounts to work with the infrastructure, so renders platform service 252 (PS 12: Identity and Access Management Services) to create service accounts for use with VPC controller 161 and infrastructure controller 151.

In 905, system 110 needs to setup the base network for the service so renders platform service 251 (PS 11: Network Services) which computes the network topology, protocols, constraints and other properties required. Platform service 251 uses VPC controller 161 to create subnets, DNS, routing and firewalls to support the service.

In 906, system 110 needs to setup storage for the various applications involved in the service, so renders platform service 241 (PS 1: Data Services) which computes the storage types, volumes and other properties required. Platform service 241 uses VPC controller 161 to provision storage to support the service.

In 907, system 110 needs to ensure the artifacts connected to Application Packages (scripts, images, etc.) are available for the Virtualization Manager(s) which will provision the application nodes, so renders platform service 247 (PS 7: Orchestration Services). Platform service 247 coordinates the transfer of images from a remote repository to the local image repo found in the infrastructure.

In 908, system 110 needs to attach provisioned resources to compute nodes where the applications will be instantiated, so renders platform service 251 (PS 11: Network Services) which attaches the networks and storage to the nodes via VPC controller 161.

In 909, system 110 provisions VMs for a firewall on an edge node.

In 910, system 110 loads images for the firewall.

System 110 then needs to deploy the network applications, so renders platform service 245 (PS 6: Controller/Configuration Services) for this purpose. Platform service 245 determines the specific compute requirements of each application and either create Pod/Containers or VMs for them via infrastructure controller 151, resulting in one or more components per application. In 911, system 110 creates an IMS on a core node. In 912, system 110 creates an EPC on an edge node. In 913, system 110 creates resource monitors on each node. In 914, system 110 creates virtual probes each node.

Deployment then ends with system 110 closing the transaction using via platform service 253 (PS 13: Transaction Services) and at this point "committing" any/all objects. After successful completion, the system proceeds to day-one integration, described in further detail below with reference to FIG. 10.

Figure 10A:
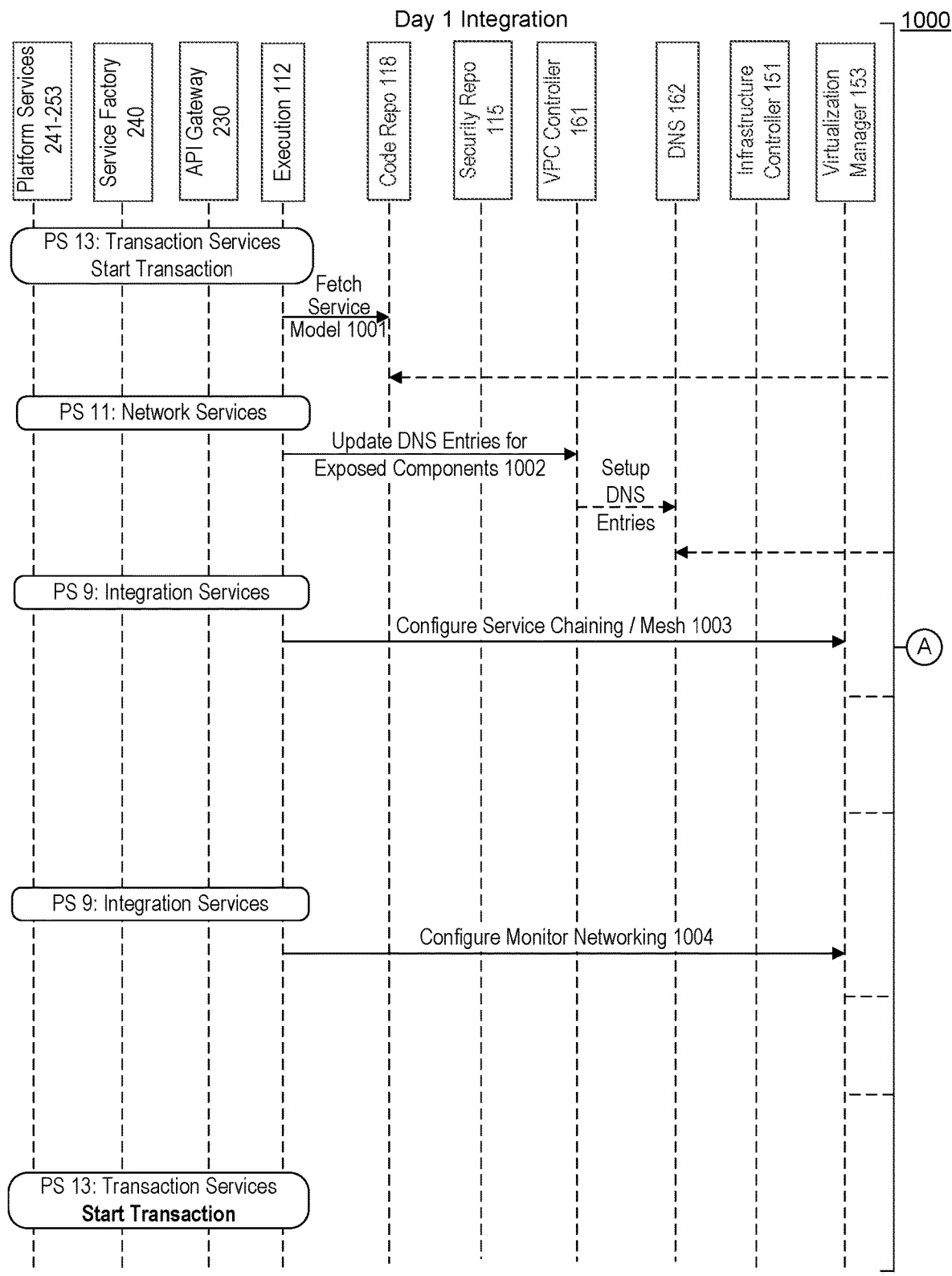
FIGS. 10A-10B are a sequence diagram illustrating a day-one integration method performed in the use case for deploying and assuring a secure, multi-cloud network for voice.
Figure 10B:
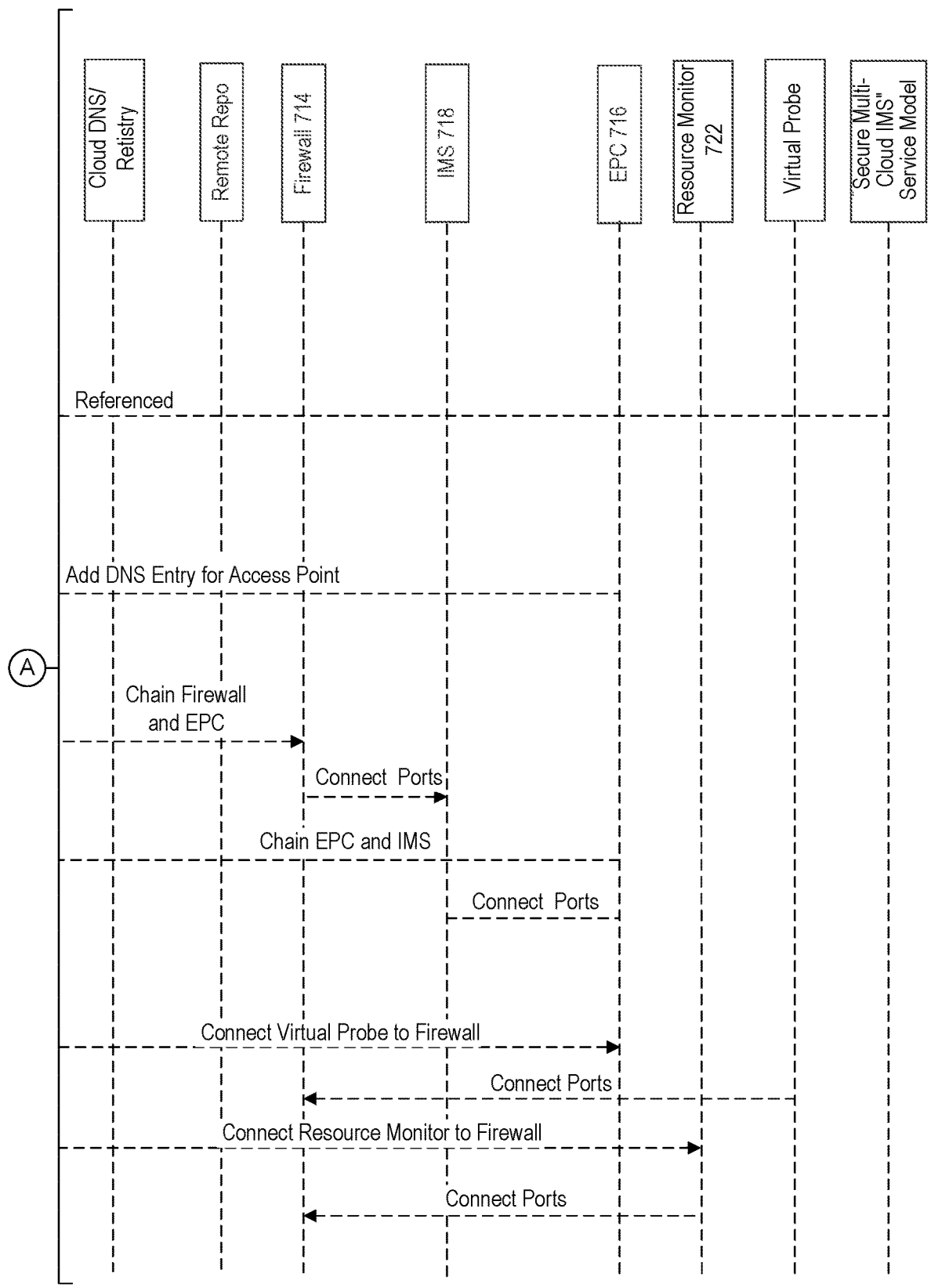

FIGS. 10A-10B are a sequence diagram illustrating a method 1000 of performing day-one integration in the use case for deploying and assuring a secure, multi-cloud network for voice, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 10A-10B, as will be understood by a person of ordinary skill in the art(s).

Day-one integration involves connecting the applications and any supporting services required by a secure, multi-cloud network for voice.

In 1001, integration starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists) to implement the transaction and allow the tasks in the use-case depicted to execute asynchronously.

In 1002, system 110 needs to expose all deployed components (from all applications) to the system at large, so renders platform service 251 (PS 11: Network Services) which resolves Hostname, port, and other requirements for the services and configures DNS 162 via VPC controller 161.

In 1003, the system needs to chain (link) the deployed components together so they function as a composite service, so renders platform service 249 (PS 9: Integration Services) which resolves the protocols, ports and other networking requirements needed to establish required packet throughput, and sends a command to virtualization manager 153 to connect ports and perform other required tasks on containers 154 and virtual machines 155 involved.

In 1004, system 110 makes configuration changes to monitor networking via virtualization manager 153.

Integration ends with the system closing the transaction using via platform service 253 (PS 13: Transaction Services), and at this point "committing" any/all objects. After successful completion, the system proceeds to day-one configuration, described in further detail below with reference to FIG. 11.

Figure 11A:
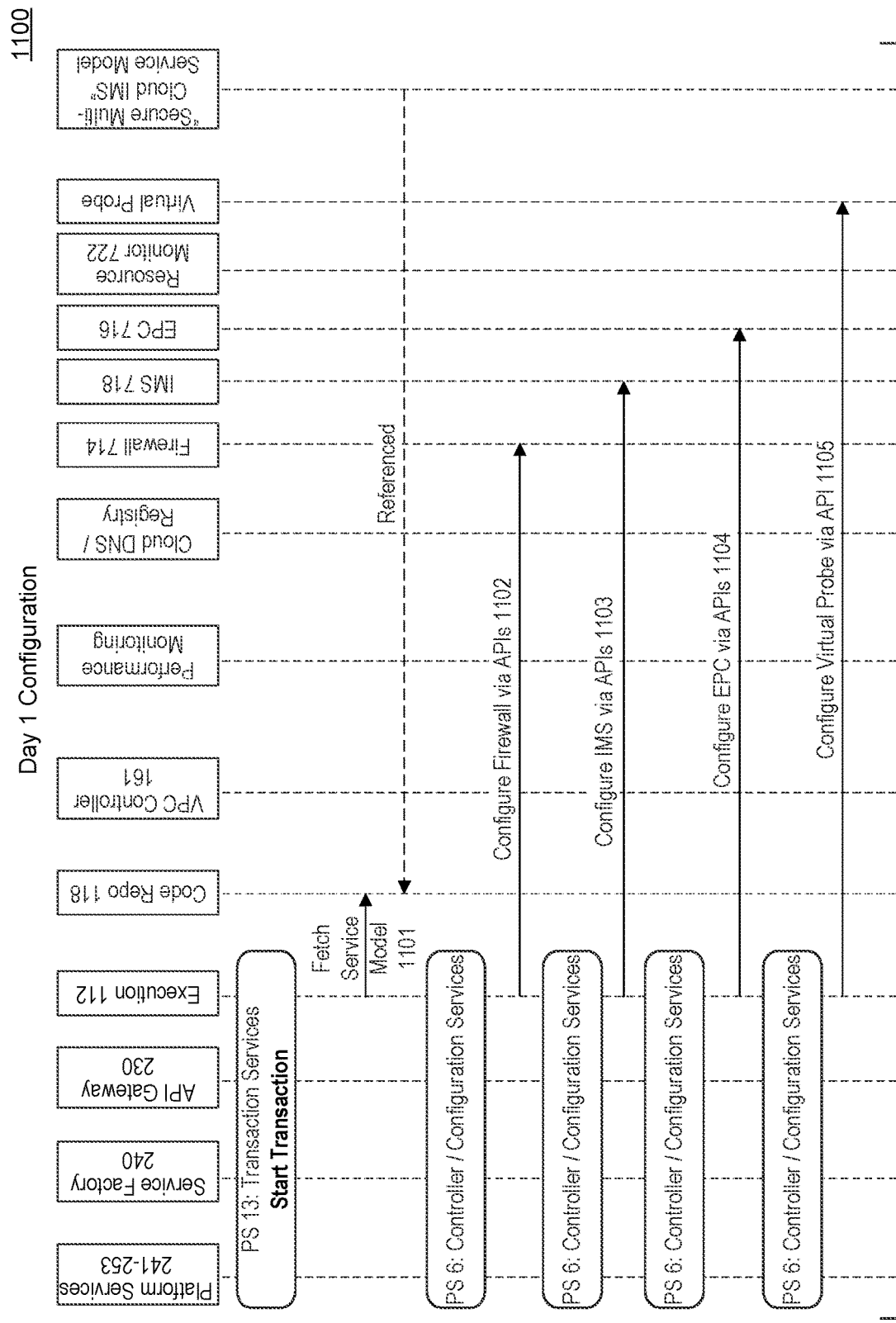
FIGS. 11A-11B are a sequence diagram illustrating a day-one configuration method performed in the use case for deploying and assuring a secure, multi-cloud network for voice.
Figure 11B:
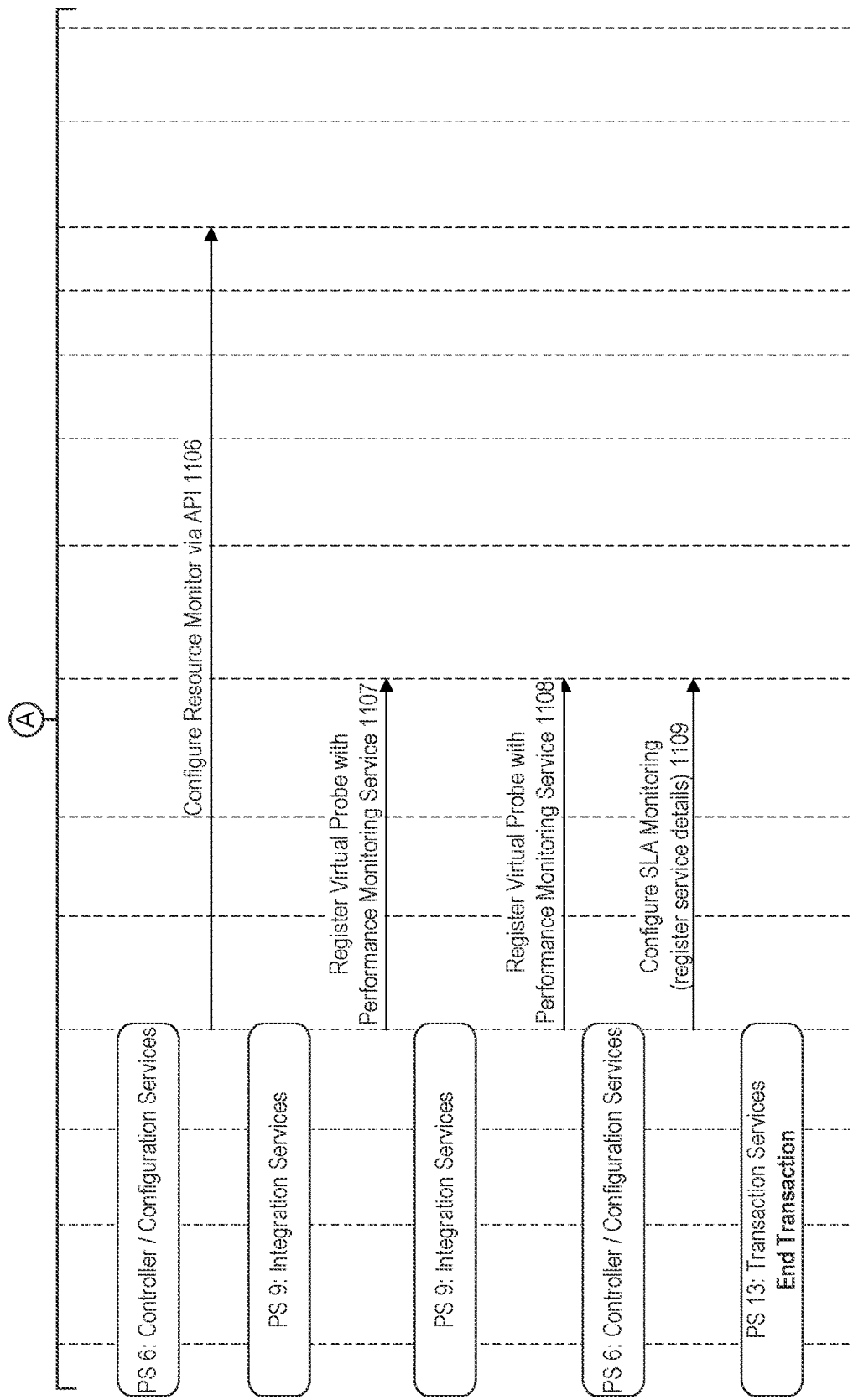

FIG. 11A-11B are a sequence diagram illustrating a method 1100 of performing day-one configuration in the use case for deploying and assuring a secure, multi-cloud network for voice, according to some embodiments. Method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 11A-11B, as will be understood by a person of ordinary skill in the art(s).

Day-one configuration involves configuring all remaining aspects of the solution to realize a secure, multi-cloud network for voice.

In 1101, configuration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists), to implement the transaction and allow the tasks in the use-case depicted to execute asynchronously.

System 110 needs to configure the service specific applications, so renders platform service 245 (PS 6: Controller/Configuration Services) for this purpose. System 110 determines the specific configuration requirements of each application so that they perform both individually and collectively (as part of the service) and resolves details needed such as types, formats and protocols required to carry out the configurations. System 110 then proceeds to configure the components of each via their available interfaces (REST, CLI, etc.). In 1102, system 110 configures the firewall. In 1103, system 110 configures the IMS. In 1104, system 110 configures the EPC. In 1105, system 110 configures the virtual probe. In 1106, the system configures the resource monitor.

In 1107, system 110 needs to register the probe with the performance monitoring service, so renders platform service 249 (PS 9: Integration Services) for this purpose.

In 1108, system 110 needs configure related SLAs within the performance monitoring service, so renders platform service 245 (PS 6: Controller/Configuration Services) for this purpose.

In 1109, system 110 needs to configure a security monitoring service, so renders platform service 245 (PS 6: Controller/Configuration Services) for this purpose.

Configuration ends with the system closing the transaction using via platform service 253 (PS 13: Transaction Services) and at this point "committing" any/all objects.

After successful completion, the network service is ready to be used, and system 110 may proceed to day-two orchestration, described in further detail below with reference to FIG. 12.

Figure 12:
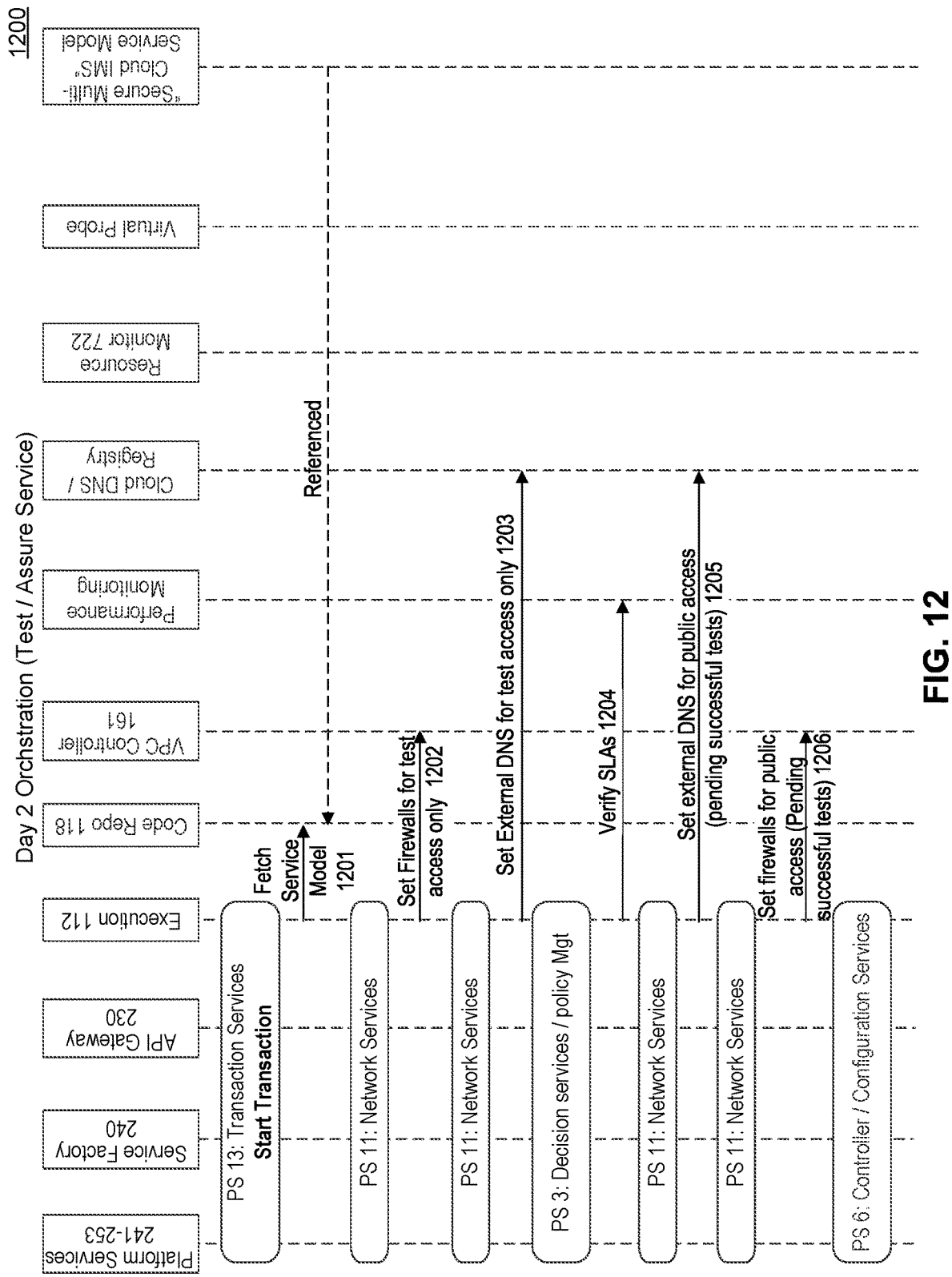
FIG. 12 is a sequence diagram illustrating a day-two orchestration method performed in the use case for deploying and assuring a secure, multi-cloud network for voice.

FIG. 12 is a sequence diagram illustrating a method 1200 of performing day-two orchestration in the use case for deploying and assuring a secure, multi-cloud network for voice, according to some embodiments. Method 1200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art(s).

The example shown in FIG. 12 of day-two orchestration is used to test and assure the service by orchestrating a set of test components to measure aspects of the secure, multi-cloud network for voice, both functional and non-functional, against simulated traffic.

In 1201, orchestration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction fetches the initial context required to carry out the sequence by fetching the Service Model from code repository 118. System 110 also creates a Process Token (or links to one if it already exists), to implement the transaction and allow the tasks in the use-case depicted to execute asynchronously.

In 1202 and 1203, for testing, system 110 needs to remove external access to the service, so renders platform service 251 (PS 11: Network Services) which resolves Hostname, port, and other requirements for the services and configures both the local DNS via VPC controller 161 and DNS 162 directly for this purpose.

In 1204, system 110 needs to verify that SLAs are met by the service under-load, so renders platform service 243 (PS 3: Decision Services/Policy Management) to carry out this evaluation via the Performance Monitoring component.

In 1205 and 1206, with testing complete, the system needs to restore external access to the service, so renders platform service 253 (PS 11: Network Services) which resolves hostname, port and other requirements for the services and configures both the local DNS via VPC controller 161 and DNS 162 directly for this purpose.

Orchestration ends with the system closing the transaction using via platform service 253 (PS 13: Transaction Services) and at this point "committing" any/all objects. After successful completion, the secure, multi-cloud network for voice is assured.

Use Case 2: Secure, 5G Radio Access Network for Voice

Use case 2 is the deployment and assurance of a secure, 5G radio access network for voice. The core service for the use-case is "Secure Edge IMS." FIGS. 13-18 describe use case 2. Use case 2 allows a communication service provider to offer a "voice over IP" (VoIP) service delivered directly to their phones or other devices via a Radio Access Network (4G or 5G) with Quality of Service (QoS) guarantees.

Figure 13:
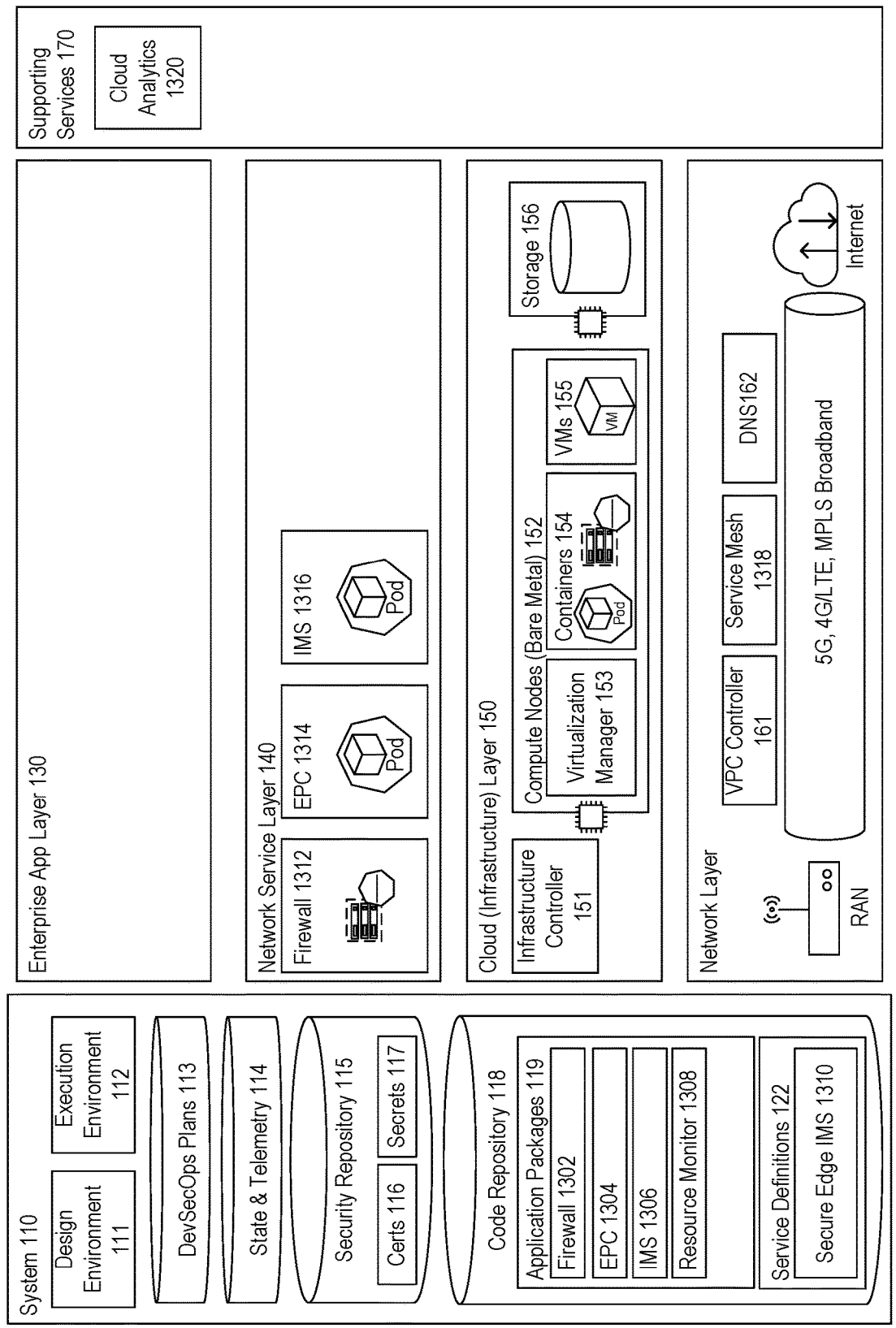
FIG. 13 is a block diagram of an architecture for deploying and assuring a secure, fifth-generation wireless ("5G") radio access network for voice.

FIG. 13 is a block diagram of an architecture 1300 for deploying and assuring a secure, 5G radio access network for voice. Architecture 1300 may include the components described above with reference to FIG. 1. Additionally, architecture 1300 may include firewall package 1302, EPC package 1304, IMS package 1306, resource monitor package 1308, secure IMS edge 1310, firewall 1312, evolved packet core (EPC) 1314, IP media subsystem (IMS) 1316, service mesh 1318, and cloud analytics tool 1320.

Service definitions 122 and application packages 119 are found in code repository 118 in system 110.

In network layer 160, a VPC is implemented via VPC controller 161 with a linked Service Mesh and DNS.

In cloud layer 150, infrastructure controller 151 provides an interface to compute nodes 152 for each site involved in the use case and to storage 156. Compute nodes 152 have virtualization manager 153 present to support the execution of container-based applications (containers 154) and virtual machine based applications that run on virtual machines 155.

In network service layer 140, the core-network service consists of firewall 1312, EPC 1314, and IMS 1316, which together provide the end-to-end voice service. Firewall 1312 may run as a VM over containers on the Edge Compute Node, EPC 1314 may run as containers on the Access Compute Node, and IMS 1316 may run as containers on the Core Compute Node. Application Packages for each are found in the Code Repository.

No applications are deployed in enterprise application layer 130 for this use-case.

Supporting service 170 for this use-case include cloud analytics tool 1320.

Figure 14:
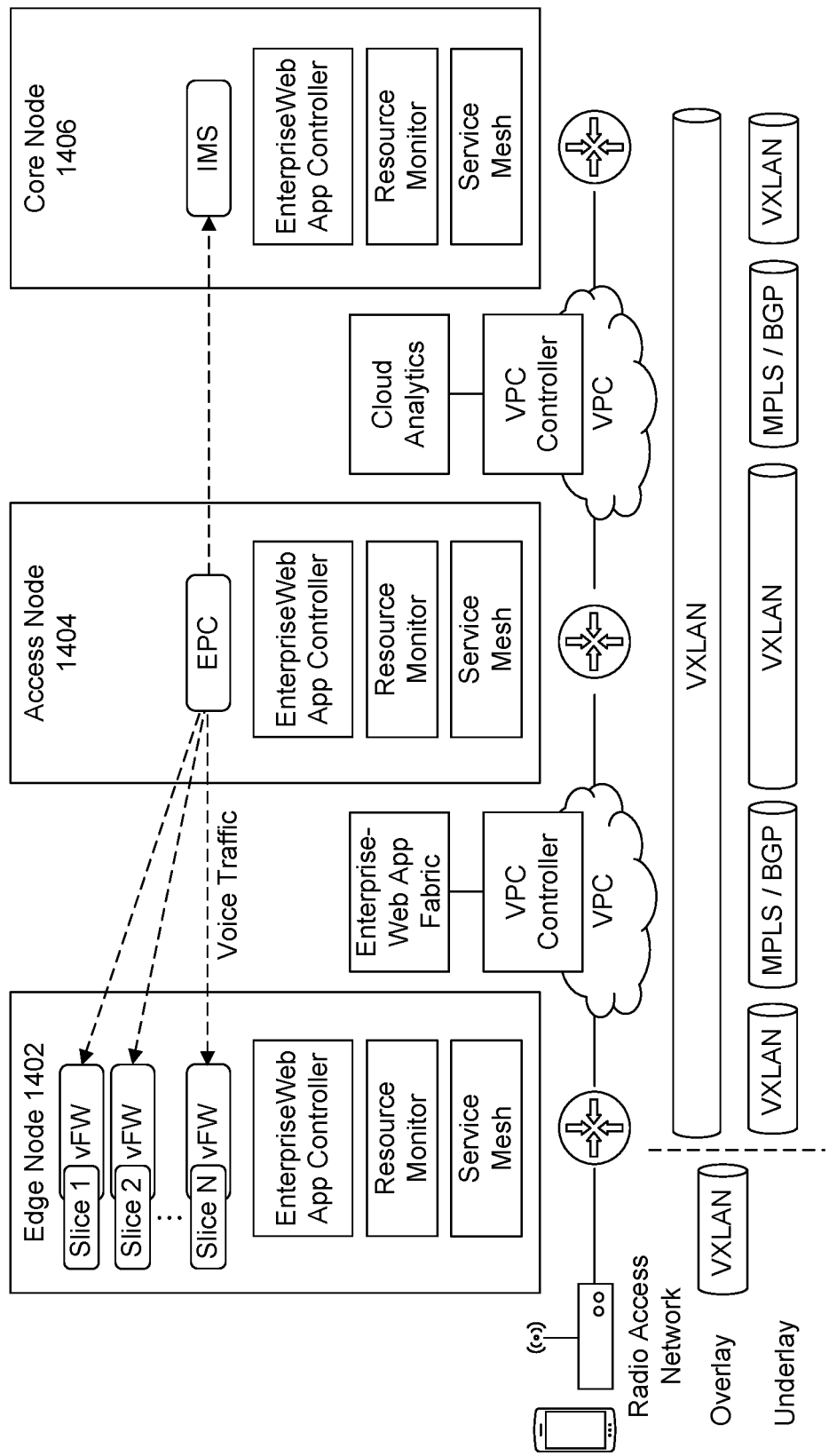
FIG. 14 is a network service diagram for the use case for deploying and assuring a secure, 5G radio access network for voice.
Figure 15A:
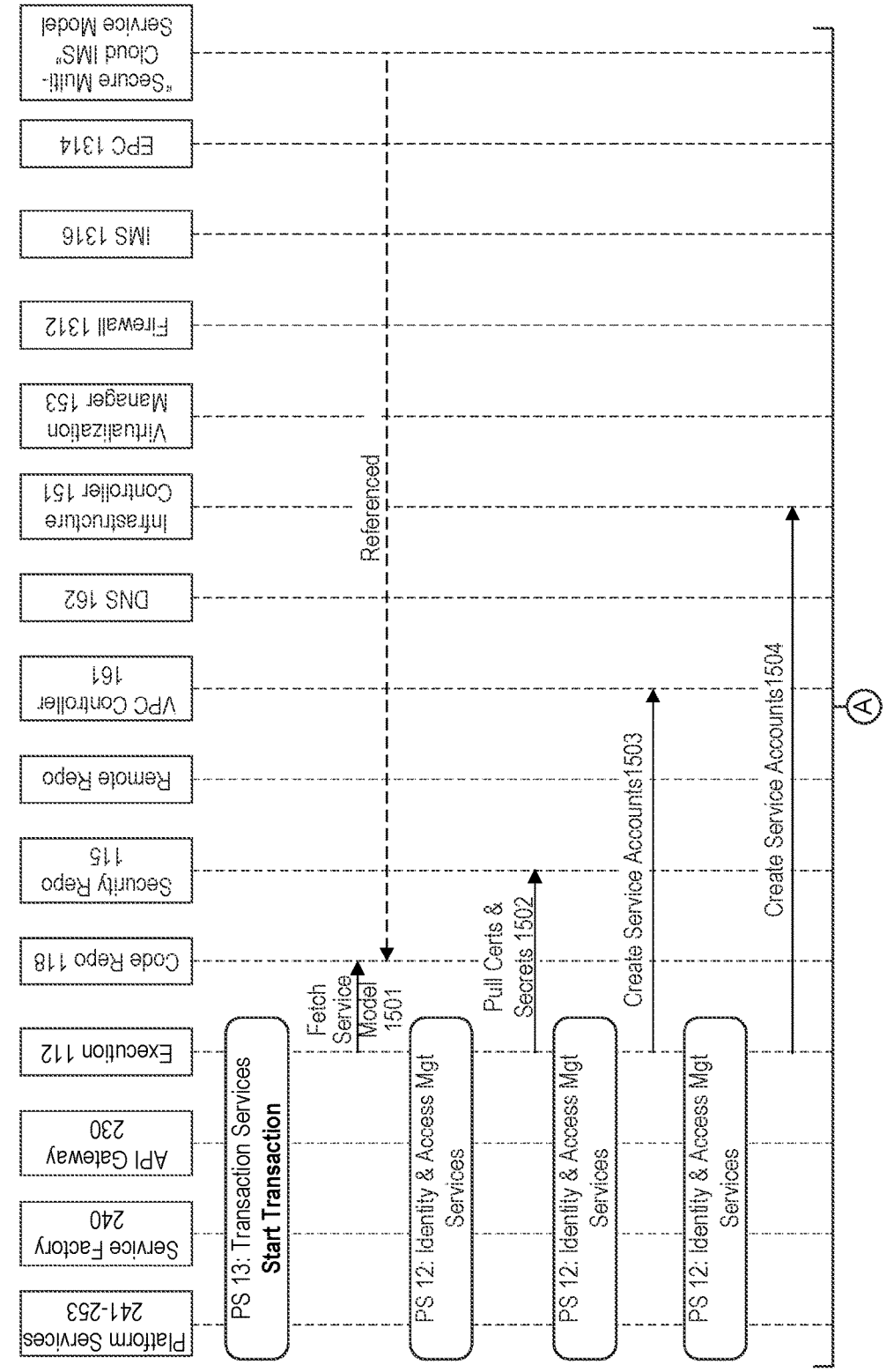
FIGS. 15A-15D are a sequence diagram illustrating a day-one deployment method performed in the use case for deploying and assuring a secure, 5G radio access network for voice.
Figure 15B:
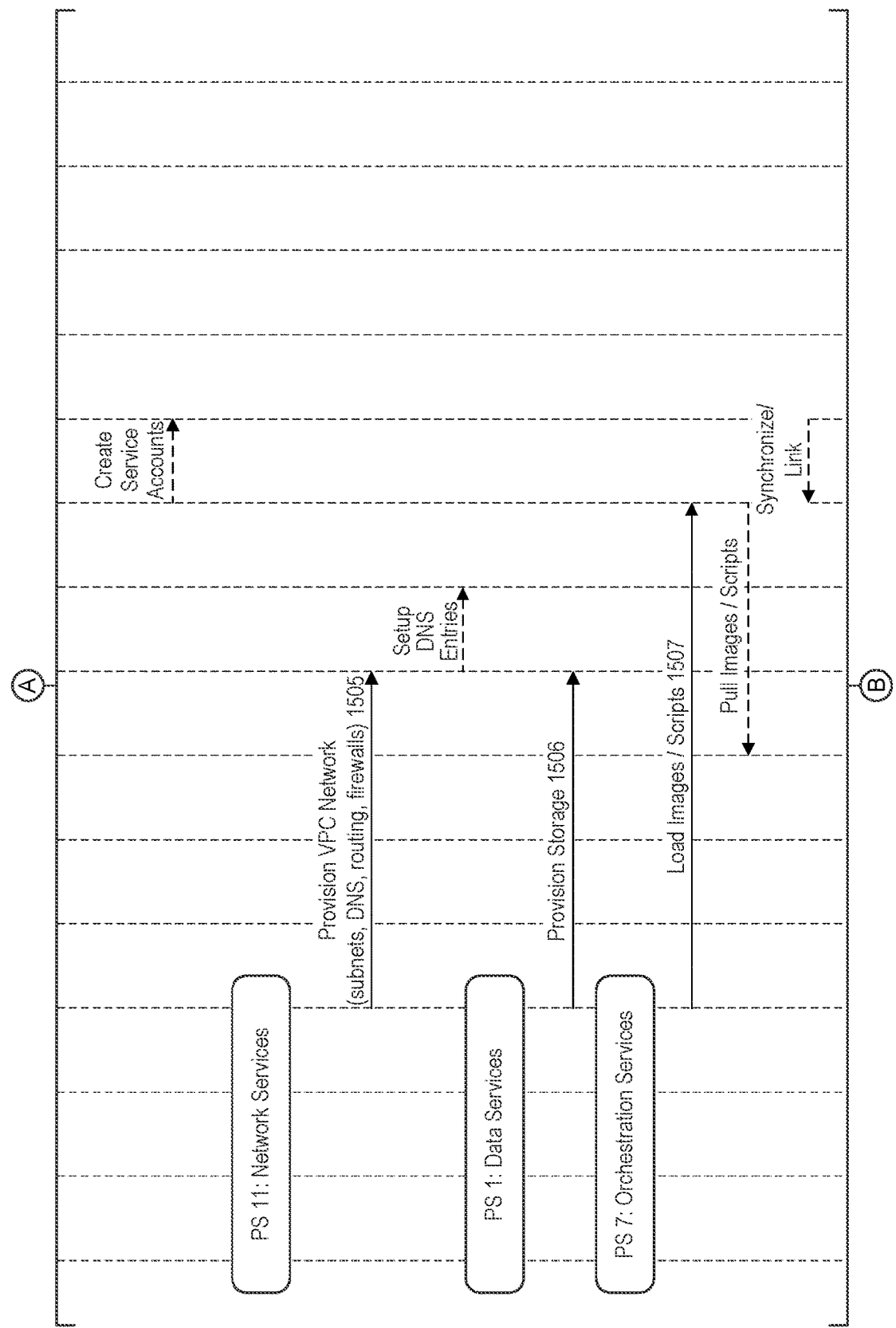
Figure 15C:
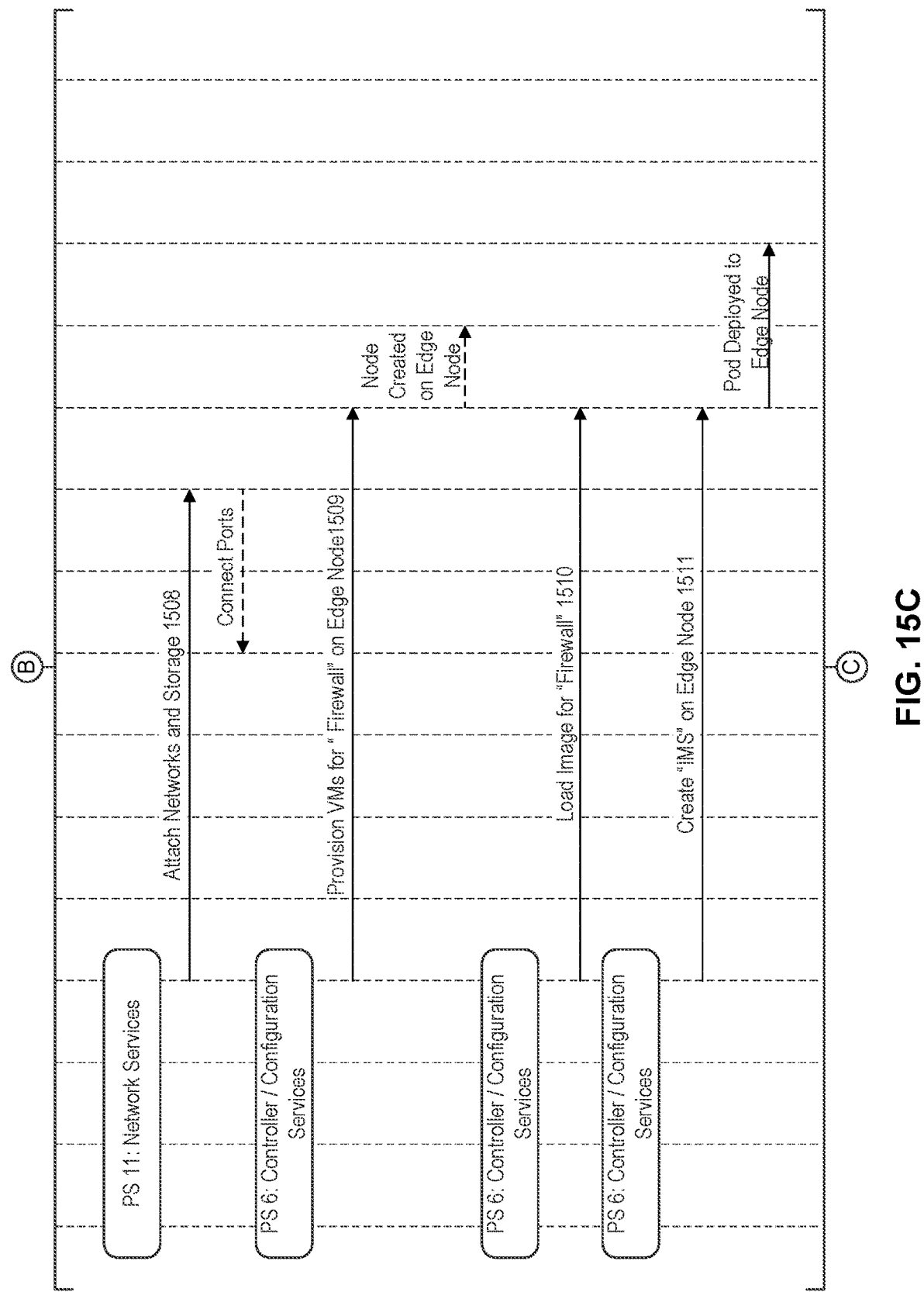
Figure 15D:
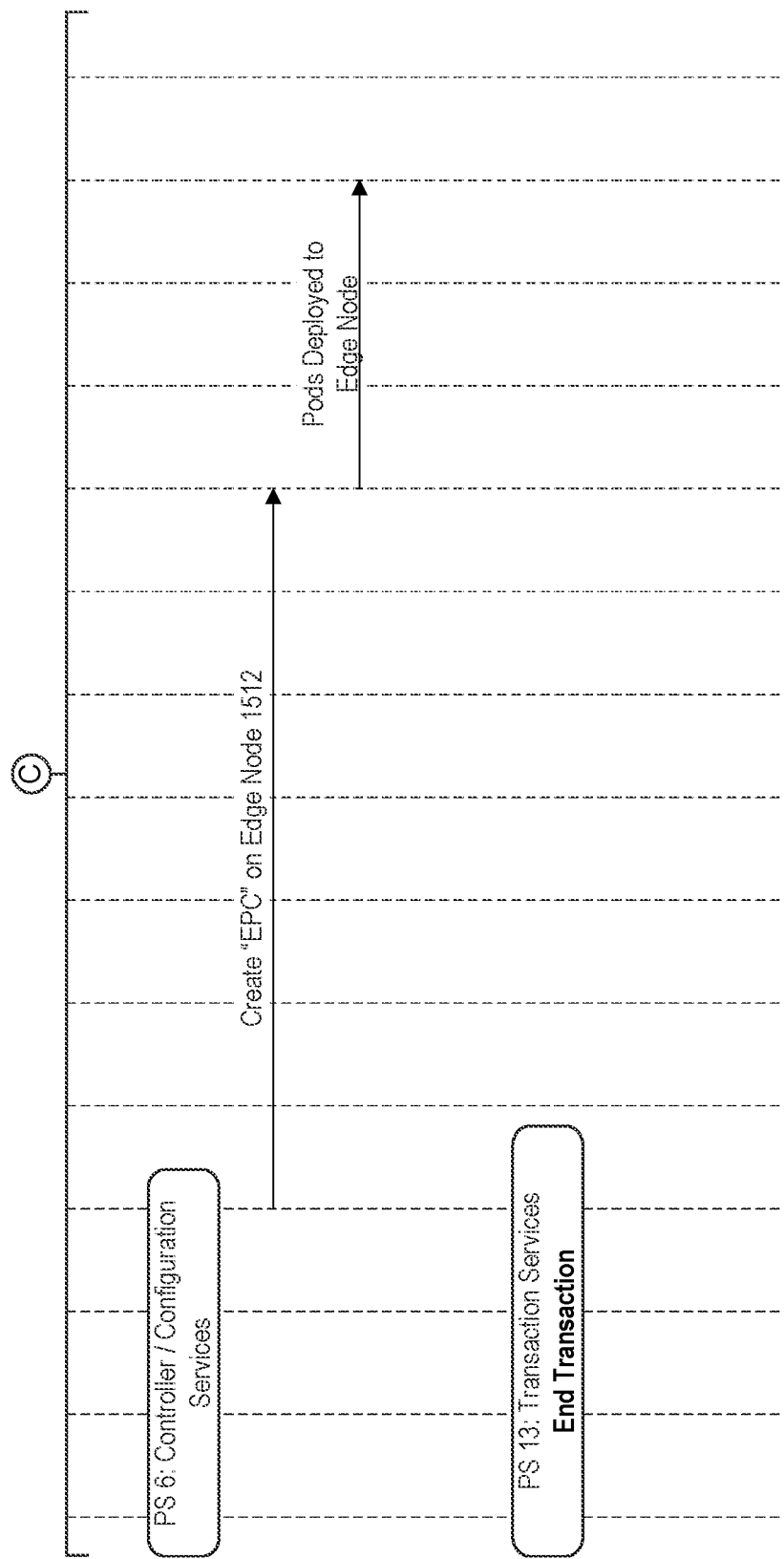

FIG. 14 is a network service diagram of a network service 1400 for the use case for deploying and assuring a secure, 5G radio access network for voice. Network service 1400 may include edge node 1402, access node 1404, and core node 1406.

The use-case is implemented across three nodes (edge node 1402, access node 1404, and core node 1406), connected via an VPC network and connected switches. Edge node 1402 may be connected to a RAN (Radio Access Network), and core node 1406 is also connected to the Internet. The VPC is implemented by a standard set of overlay and underlay protocols.

Edge node 1402 has VMs over containers for the vFW (virtual Firewall) slices; containers/pods for probes that act as a Resource Monitor; containers/pods for the EnterpriseWeb System deployed as an App Controller to execute node-specific aspects of the use-case; and a dedicated Service Mesh which is part of the infrastructure.

Access node 1404 has containers/pods for the EPC; containers/pods for probes that act as a Resource Monitor; containers/pods for the EnterpriseWeb System deployed as an App Controller to execute node-specific aspects of the use-case; and a dedicated Service Mesh which is part of the infrastructure.

Core node 1406 has containers/pods for the IMS; containers/pods for probes that act as a Resource Monitor; containers/pods for EnterpriseWeb System deployed as an App Controller to execute node-specific aspects of the use-case; and a dedicated Service Mesh which is part of the infrastructure.

A centralized deployment of the EnterpriseWeb System acts as an App Fabric to execute the end-to-end use-case and is connected independently via the VPC.

Cloud analytics tool 1320 is connected independently via the VPC.

Each sequence diagram (e.g., FIGS. 15-18) is organized the same. System 110's components for "Platform Services" (platform services 241-253), "Service Factory" (service factory 240, "and "API Gateway," (API gateway 230), which together are responsible for "Execution," are shown to the left. Each system interaction includes a note indicating which platform service in platform services 241-253 is rendered to deliver the task. The right side shows the resulting interaction with the system's actors.

FIGS. 15A-15D are a sequence diagram indicating is a sequence diagram illustrating a method 1500 of performing day-one deployment in the use case for deploying and assuring a secure, 5G radio access network for voice, according to some embodiments. Method 1500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 15A-15D, as will be understood by a person of ordinary skill in the art(s).

Day-one deployment involves provisioning the network, storage and compute resources, and deploying all applications required by a secure, 5G radio access network for voice.

In 1501, deployment starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching models 123 from code repository 118. The system also creates a process token (or links to one if it already exists) to implement the transaction and allow the tasks in the use-case depicted to execute asynchronously.

In 1502, system 110 requires a security context to interact with the underlying systems, so renders platform service 252 (PS 12: Identity and Access Management Services) which pulls security credentials from security repository 115.

In 1503 and 1504, system 110 requires service accounts to work with the infrastructure, so renders platform service 252 (PS 12: Identity and Access Management Services) to create service accounts for use with VPC controller 161 and infrastructure controller 151.

In 1505, system 110 needs to setup the base network for the service so renders platform service 251 (PS 11: Network Services) which computes the network topology, protocols, constraints and other properties required. Platform service 251 uses VPC controller 161 to create subnets, DNS, routing, and firewalls to support the service.

In 1506, system 110 needs to setup storage for the various applications involved in the service, so renders platform service 241 (PS 1: Data Services) which computes the storage types, volumes and other properties required. Platform service 241 uses VPC controller 161 to provision storage to support the service.

In 1507, system 110 needs to ensure the artifacts connected to Application Packages (scripts, images, etc.) are available for the Virtualization Manager(s) which will provision the application nodes, so renders platform service 247 (PS 7: Orchestration Services). Platform service 247 coordinates the transfer of images from a remote repository to the local image repo found in the infrastructure.

In 1508, system 110 needs to attach provisioned resources to compute nodes where the applications will be instantiated, so renders platform service 251 (PS 11: Network Services) which attaches the networks and storage to the nodes via VPC controller 161.

In 1509, system 110 provisions VMs for a firewall on an edge node.

In 1510, system 110 loads images for the firewall.

System 110 then needs to deploy the network applications, so renders platform service 245 (PS 6: Controller/Configuration Services) for this purpose. Platform service 245 determines the specific compute requirements of each application and either create Pod/Containers or VMs for them via infrastructure controller 151, resulting in one or more components per application. In 1511, system 110 creates an IMS on an edge node. The IMS may include Proxy Call Session Control Function (P-CSCF), Web Real-Time Communication (WebRTC) and Radio Frequency Channel Transfer Function (Rf CTF) packet processing components, a subscriber database, and various Telecom Application Servers (TAS) in addition to other components that collectively process voice and video traffic over an IP transport. In 1512, system 110 creates an EPC on an edge node, include a Mobile Management Entity (MME), Serving Gateway (SW), and Packet Data Network Gateway (PGW) which collectively handle the tracking of packets across various access/points and devices.

Deployment then ends with system 110 closing the transaction using via platform service 253 (PS 13: Transaction Services) and at this point "committing" any/all objects. After successful completion, the system proceeds to day-one integration, described in further detail below with reference to FIG. 16.

Figure 16A:
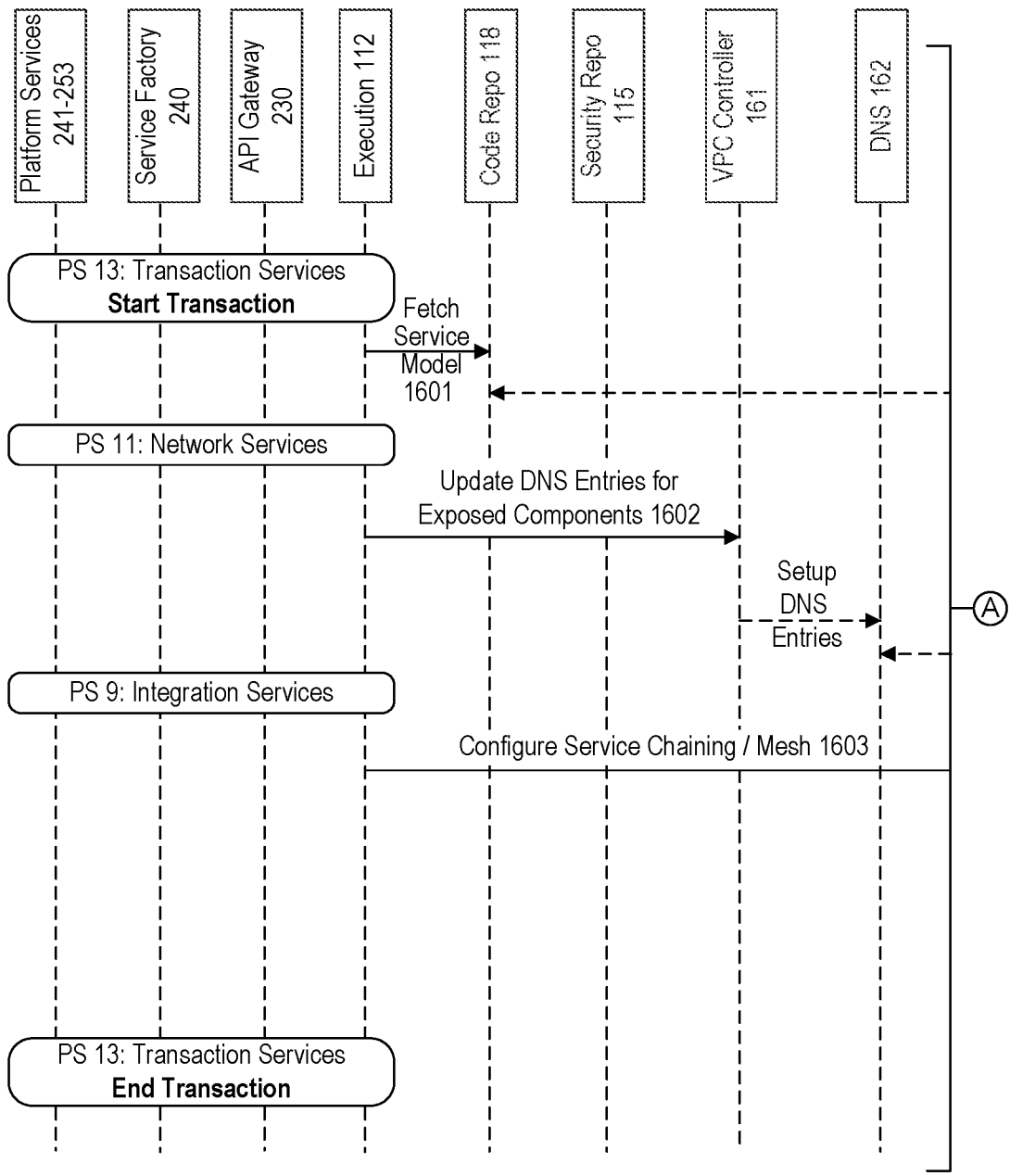
FIGS. 16A-16B are a sequence diagram illustrating a day-one integration method performed in the use case for deploying and assuring a secure, 5G radio access network for voice.
Figure 16B:
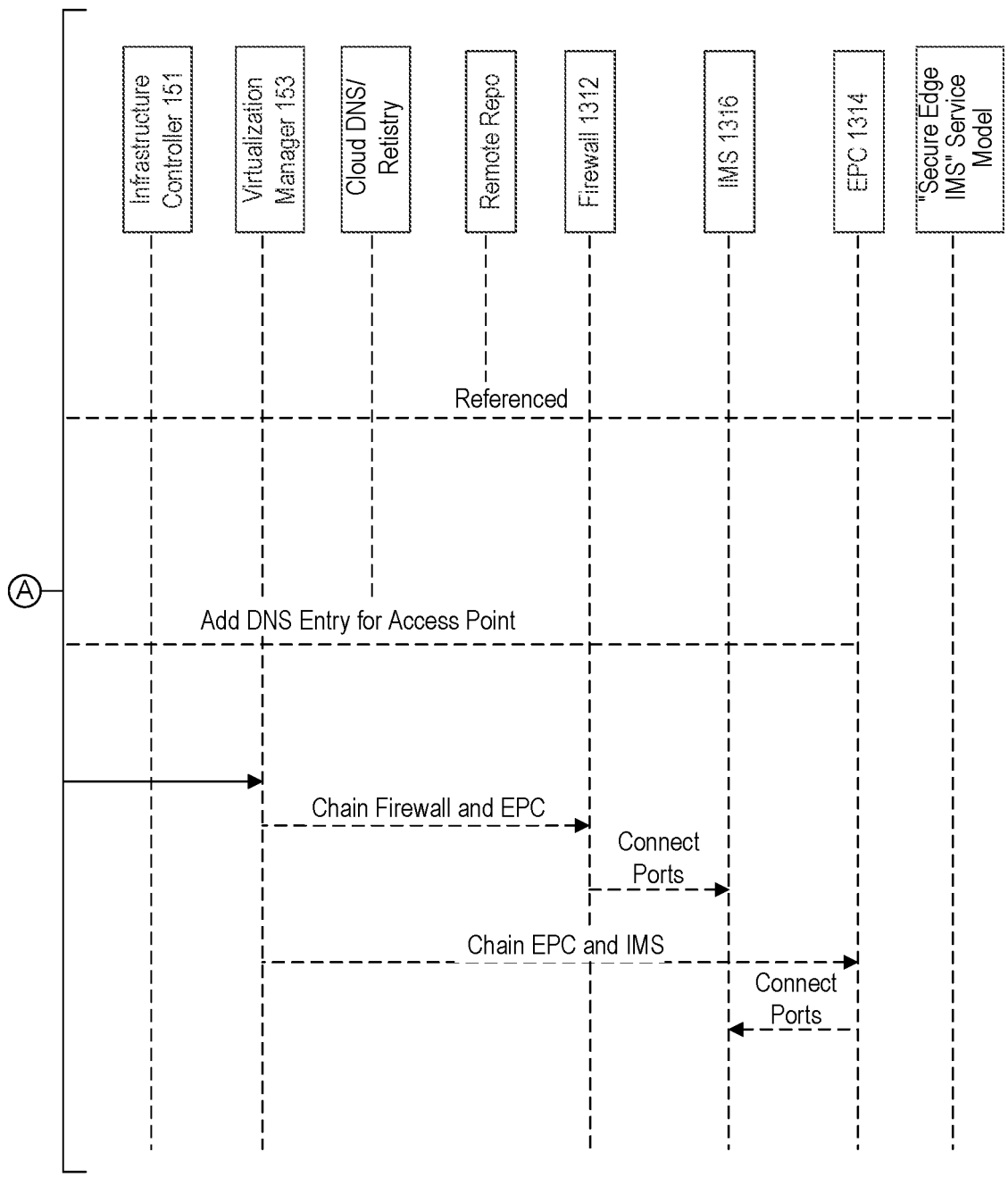

FIGS. 16A-16B are a sequence diagram illustrating a method 00 of performing day-one integration in the use case for deploying and assuring a secure, 5G radio access network for voice, according to some embodiments. Method 1600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 16A-16B, as will be understood by a person of ordinary skill in the art(s).

Day-one integration involves connecting the applications and any supporting services required by a secure, 5G radio access network for voice.

In 1601, integration starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists) to implement the transaction and allow the tasks in the use-case depicted to execute asynchronously.

In 1602, system 110 needs to expose all deployed components (from all applications) to the system at large, so renders platform service 251 (PS 11: Network Services) which resolves Hostname, port, and other requirements for the services and configures DNS 162 via VPC controller 161.

In 1603, system 110 needs to chain (link) the deployed components together so they function as a composite service, so renders platform service 249 (PS 9: Integration Services) which resolves the protocols, ports and other networking requirements needed to establish required packet throughput, and sends a command to virtualization manager 153 to connect ports and perform other required tasks on containers 154 and virtual machines 155 involved.

Integration ends with the system closing the transaction using via platform service 253 (PS 13: Transaction Services), and at this point "committing" any/all objects. After successful completion, the system proceeds to day-one configuration, described in further detail below with reference to FIG. 17.

Figure 17A:
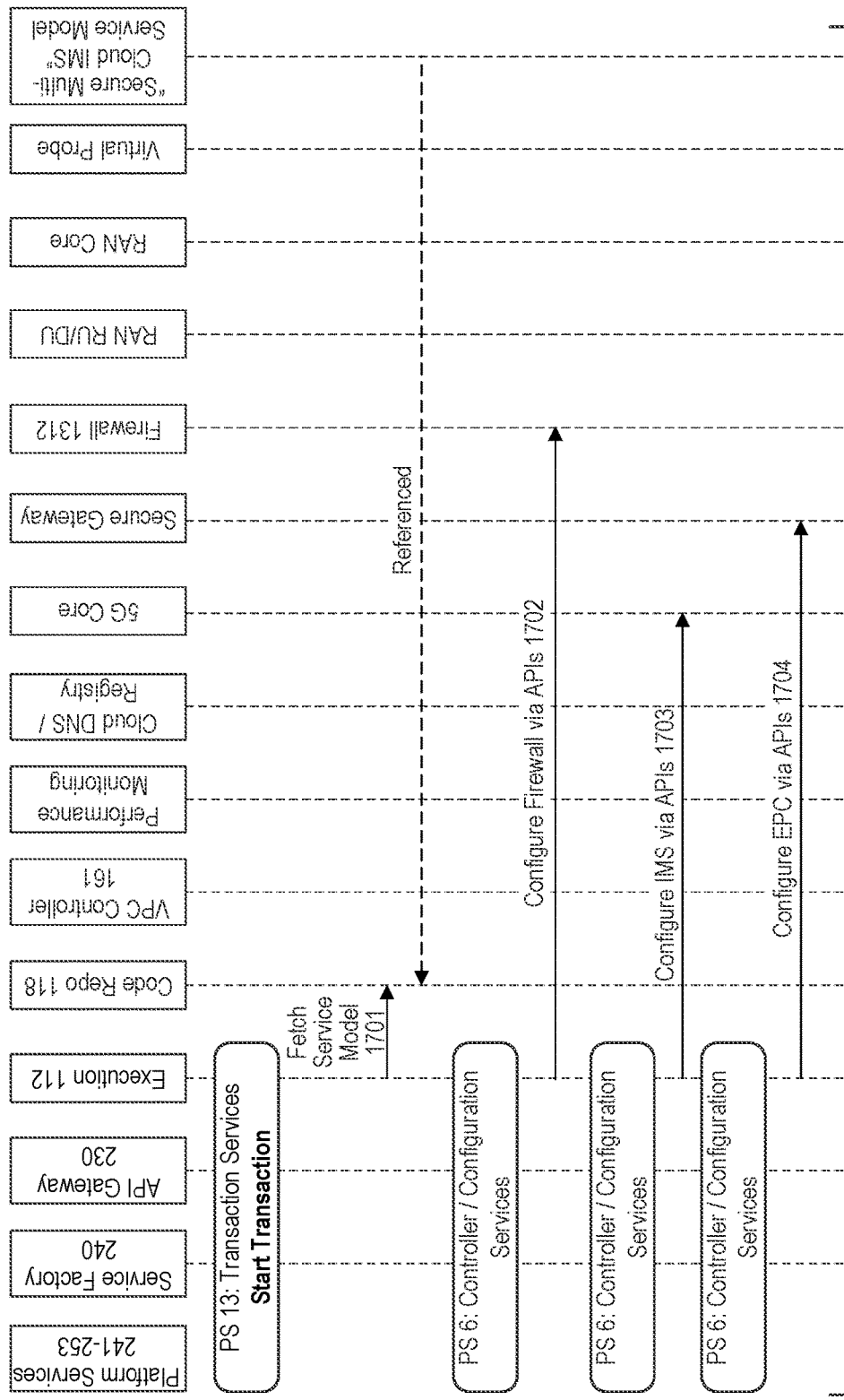
FIGS. 17A-17B are a sequence diagram illustrating a day-one configuration method performed in the use case for deploying and assuring a secure, 5G radio access network for voice.
Figure 17B:
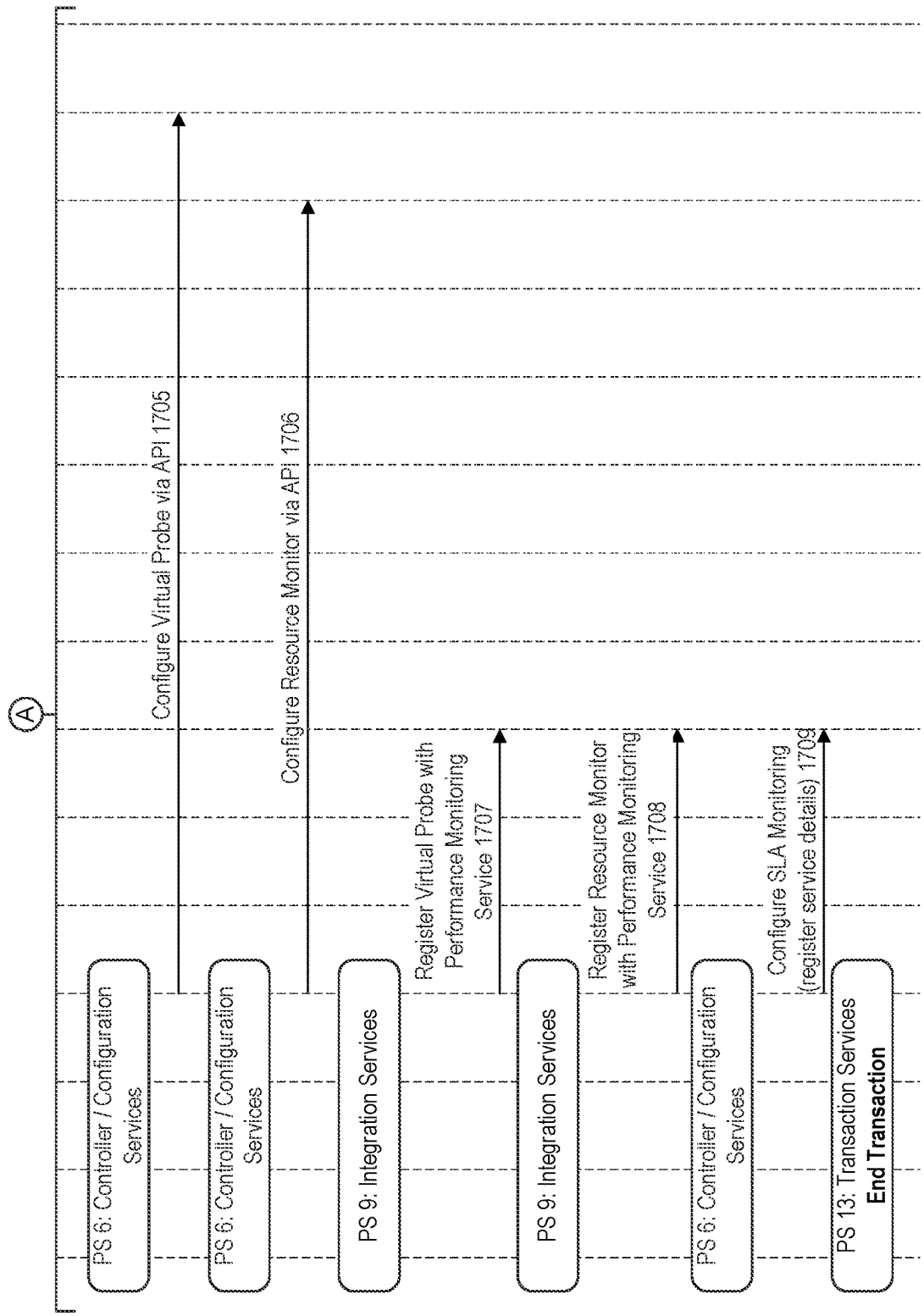

FIGS. 17A-17B are a sequence diagram illustrating a method 1700 of performing day-one configuration in the use case for deploying and assuring a secure, 5G radio access network for voice, according to some embodiments. Method 1700 can be performed by processing logic that can comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIGS. 17A-17B, as will be understood by a person of ordinary skill in the art(s).

Day-one configuration involves configuring all remaining aspects of the solution to realize a secure, 5G radio access network for voice.

In 1701, configuration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists), to implement the transaction and allow the tasks in the use-case depicted to execute asynchronously.

System 110 needs to configure the service specific applications, so renders platform service 245 (PS 6: Controller/Configuration Services) for this purpose. System 110 determines the specific configuration requirements of each application so that they perform both individually and collectively (as part of the service) and resolves details needed such as types, formats and protocols required to carry out the configurations. System 110 then proceeds to configure the components of each via their available interfaces (REST, CLI, etc.). In 1702, system 110 configures the firewall, e.g., by specifying routing tables, safe and restricted endpoint listings, and other routing rules to secure traffic for the service. In 1703, system 110 configures the IMS, e.g., by specifying voice/video parameters and EPC connection points. In 1704, system 110 configures the EPC, e.g., by specifying radio network connection parameters and user/packet handling policies. In 1705, system 110 configures the virtual probe, e.g., by specifying general monitoring capabilities such as traffic signatures, protocols and formats. In 1706, the system configures the resource monitor, e.g., by specifying general monitoring capabilities such as metrics of interest, protocols and formats.

In 1707, system 110 needs to register the probe with the performance monitoring service, so renders platform service 249 (PS 9: Integration Services) for this purpose.

In 1708, system 110 needs configure related SLAs within the performance monitoring service, so renders platform service 245 (PS 6: Controller/Configuration Services) for this purpose.

In 1709, system 110 needs to configure a security monitoring service, so renders platform service 245 (PS 6: Controller/Configuration Services) for this purpose.

Configuration ends with the system closing the transaction using via platform service 253 (PS 13: Transaction Services) and at this point "committing" any/all objects.

After successful completion, the network service is ready to be used, and system 110 may proceed to day-two orchestration, described in further detail below with reference to FIG. 18.

Figure 18:
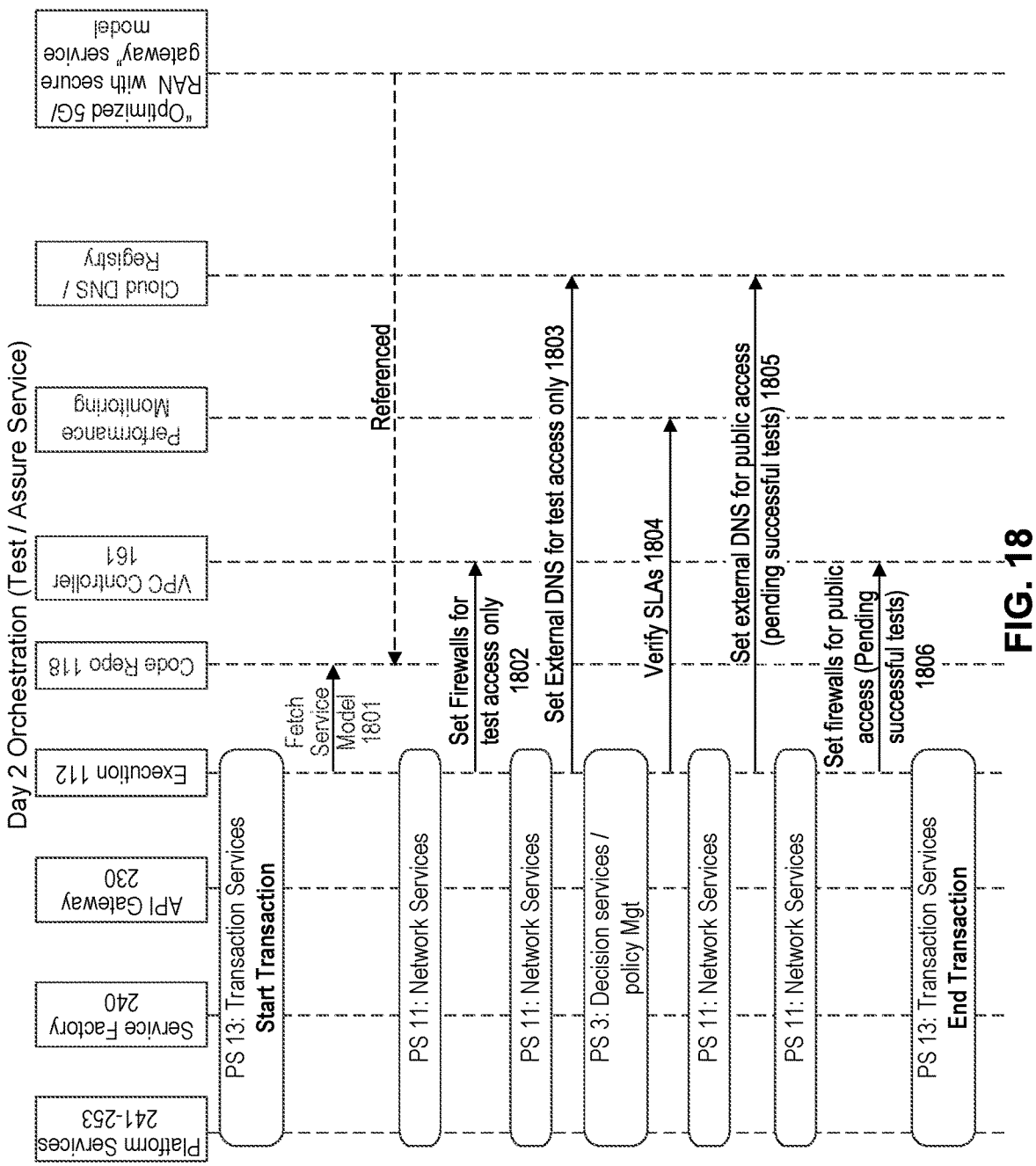
FIG. 18 is a sequence diagram illustrating a day-two orchestration method performed in the use case for deploying and assuring a secure, 5G radio access network for voice.

FIG. 18 is a sequence diagram illustrating a method 1800 of performing day-two deployment in the use case for deploying and assuring a secure, 5G radio access network for voice, according to some embodiments. Method 1800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 18, as will be understood by a person of ordinary skill in the art(s).

The example shown in FIG. 18 of day-two orchestration is used to test and assure the service by orchestrating a set of test components to measure aspects of the secure, 5G radio access network for voice, both functional and non-functional, against simulated traffic.

In 1801, orchestration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction fetches the initial context required to carry out the sequence by fetching the Service Model from code repository 118. System 110 also creates a Process Token (or links to one if it already exists), to implement the transaction and allow the tasks in the use-case depicted to execute asynchronously.

In 1802 and 1803, for testing, system 110 needs to remove external access to the service, so renders platform service 251 (PS 11: Network Services) which resolves Hostname, port, and other requirements for the services and configures both the local DNS via VPC controller 161 and DNS 162 directly for this purpose.

In 1804, system 110 needs to verify that SLAs are met by the service under-load, so renders platform service 243 (PS 3: Decision Services/Policy Management) to carry out this evaluation via the Performance Monitoring component.

In 1805 and 1806, with testing complete, the system needs to restore external access to the service, so renders platform service 253 (PS 11: Network Services) which resolves hostname, port and other requirements for the services and configures both the local DNS via VPC controller 161 and DNS 162 directly for this purpose.

Orchestration ends with the system closing the transaction using via platform service 253 (PS 13: Transaction Services) and at this point "committing" any/all objects. After successful completion, the secure, 5G radio access network for voice is assured.

Use Case 3: Secure, Multi-Cloud 5G Network

Use-case 3 is the deployment secure, multi-cloud 5G network. Users on mobile devices connect to a 5G network which provides secure access to an edge-hosted IoT Application. The end-to-end network is deployed as part of the use-case. The core service for the use-case is "Secure Multi-Cloud 5G Core." FIGS. 19-24 describe a use case 3. Use case 3 allows a communication service provider to offer a "voice over IP" (VoIP) service and secured access to "core services" (e.g., content management systems) delivered directly to their phones or other devices via a Radio Access Network (4G or 5G) with Quality of Service (QoS) guarantees.

Figure 19:
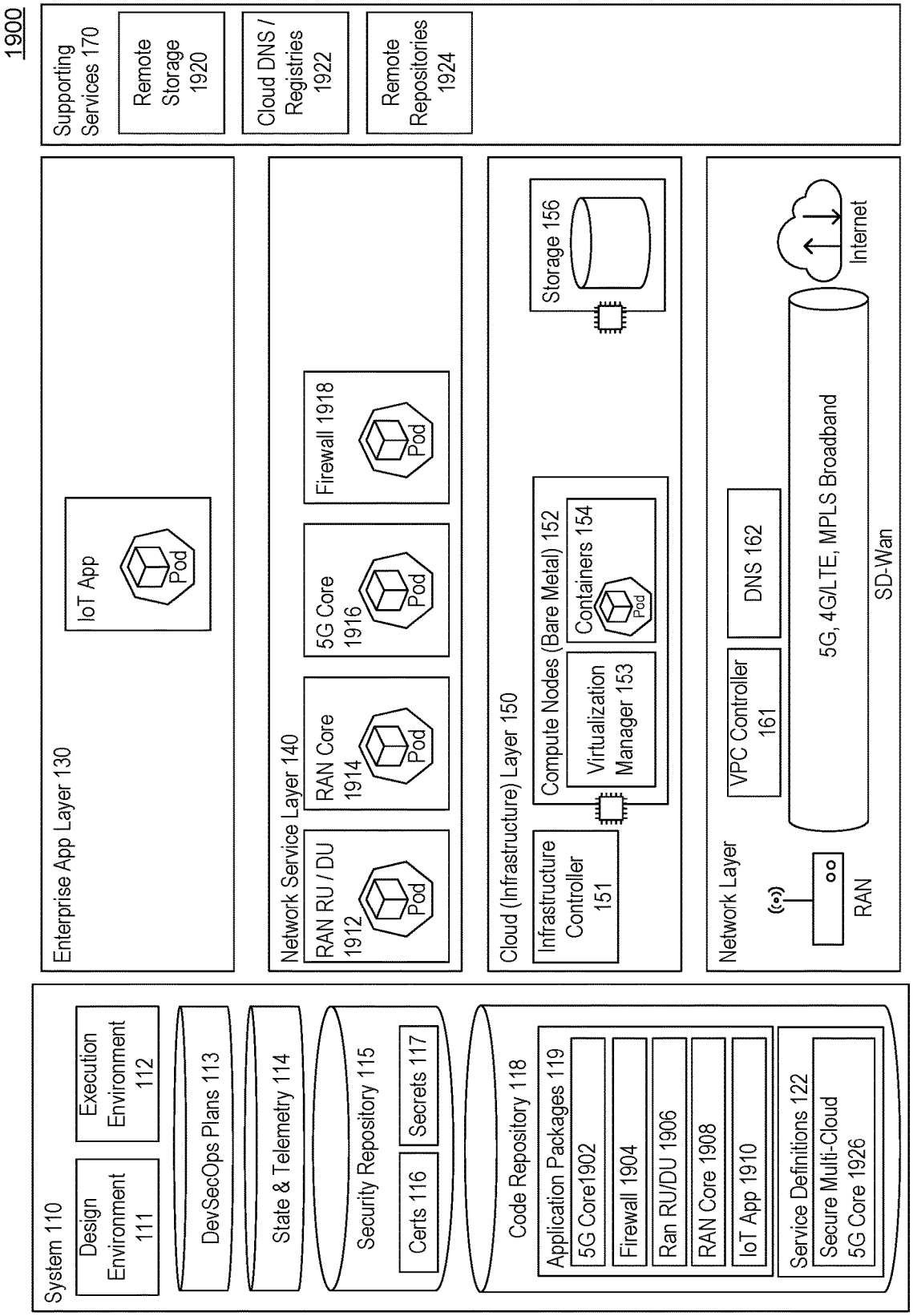
FIG. 19 is a block diagram of an architecture for deploying and assuring a secure, multi-cloud 5G network.

FIG. 19 is a block diagram of an architecture 1900 for deploying and assuring a secure, multi-cloud 5G network. Architecture 1900 may include the components described above with reference to FIG. 1. Additionally, architecture 1900 may include 5G core package 1902, firewall package 1904, RAN RU/DU package 1906, RAN Core package 1908, IoT App package 1910, RAN RU/DU 1912, RAN core 1914, 5G core 1916, firewall 1918, remote storage 1920, cloud DNS 1922, remote repositories 1924, and secure multi-cloud 5G core 1926.

Service definitions 122 and application packages 119 are found in code repository 118 in system 110. IoT application 1914 is then deployed on the resulting Edge Network.

In network layer 160, a software defined wide area network ("SD-WAN") is implemented via VPC controller 161 with DNS 162.

In cloud layer 150, infrastructure controller 151 provides an interface to compute nodes 152 for each site involved in the use case and to storage 156. Compute nodes 152 have virtualization manager 153 present to support the execution of container-based applications (containers 154).

In network service layer 140, the core-network service consists of a "RAN RU/DU" (Radio Access Network Radio Unit/Distributed Unit) (RAN RU/DU 1912), RAN core 1914, 5G core 1916, and firewall 1918, which together provide the end-to-end 5G connectivity for connected devices. All components are running over containers on the Compute Nodes. Application packages 119 for each component are found in code repository 118 (5G core package 1902, firewall package 1904, RAN RU/DU package 1906, RAN core package 1908, and IoT app package 1910).

In enterprise application layer 130, Internet of Things application 1914 is deployed as a container on the Edge Compute node. The Application Package is found in the Code Repository.

Supporting service 170 for this use-case include centralized remote storage 1920 (a cloud-based DB), cloud DNS 1922, and remote repositories 1924 (for images).

Figure 20:
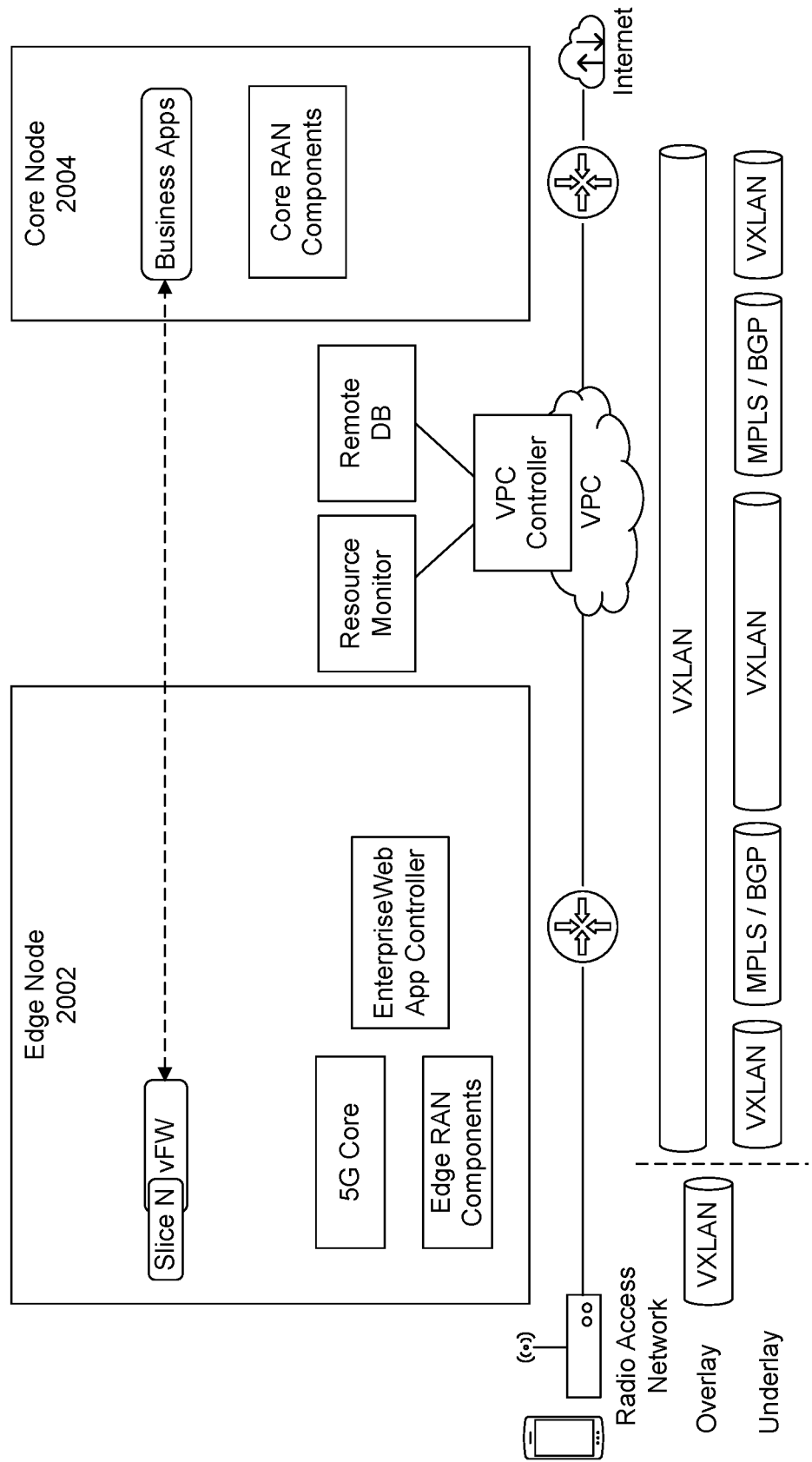
FIG. 20 is a network service diagram for the use case for deploying and assuring a secure, multi-cloud 5G network.

FIG. 20 is a network service diagram for a network service 2000 for the use case for deploying and assuring a secure, multi-cloud 5G network. Network service 2000 may include edge node 2002 and core node 2004.

The use-case is implemented across two nodes (edge node 2002 and core node 2004), connected via a VPC (SD-WAN) network and connected switches. Edge node 2002 is also connected to a RAN (Radio Access Network), and core node 2004 is also connected to the Internet. The VPC is implemented by a standard set of overlay and underlay protocols.

Edge node 2002 has containers/pods for the 5G Core and Edge RAN Components to deliver shared base functionality across all 5G slices; containers/pods per 5G slice for the vFW (virtual Firewall); and containers/pods for EnterpriseWeb System deployed as an App Controller to execute the use-case.

Core node 2004 has containers/pods for the Core RAN Components. Optionally, other Business Apps could be deployed at the core.

A Remote DB and centralized Resource Monitoring are both connected independently via the VPC.

Each sequence diagram (e.g., FIGS. 21-24) is organized the same. System 110's components for "Platform Services" (platform services 241-253), "Service Factory" (service factory 240, "and "API Gateway," (API gateway 230), which together are responsible for "Execution," are shown to the left. Each system interaction includes a note indicating which platform service in platform services 241-253 is rendered to deliver the task. The right side shows the resulting interaction with the system's actors.

Figure 21A:
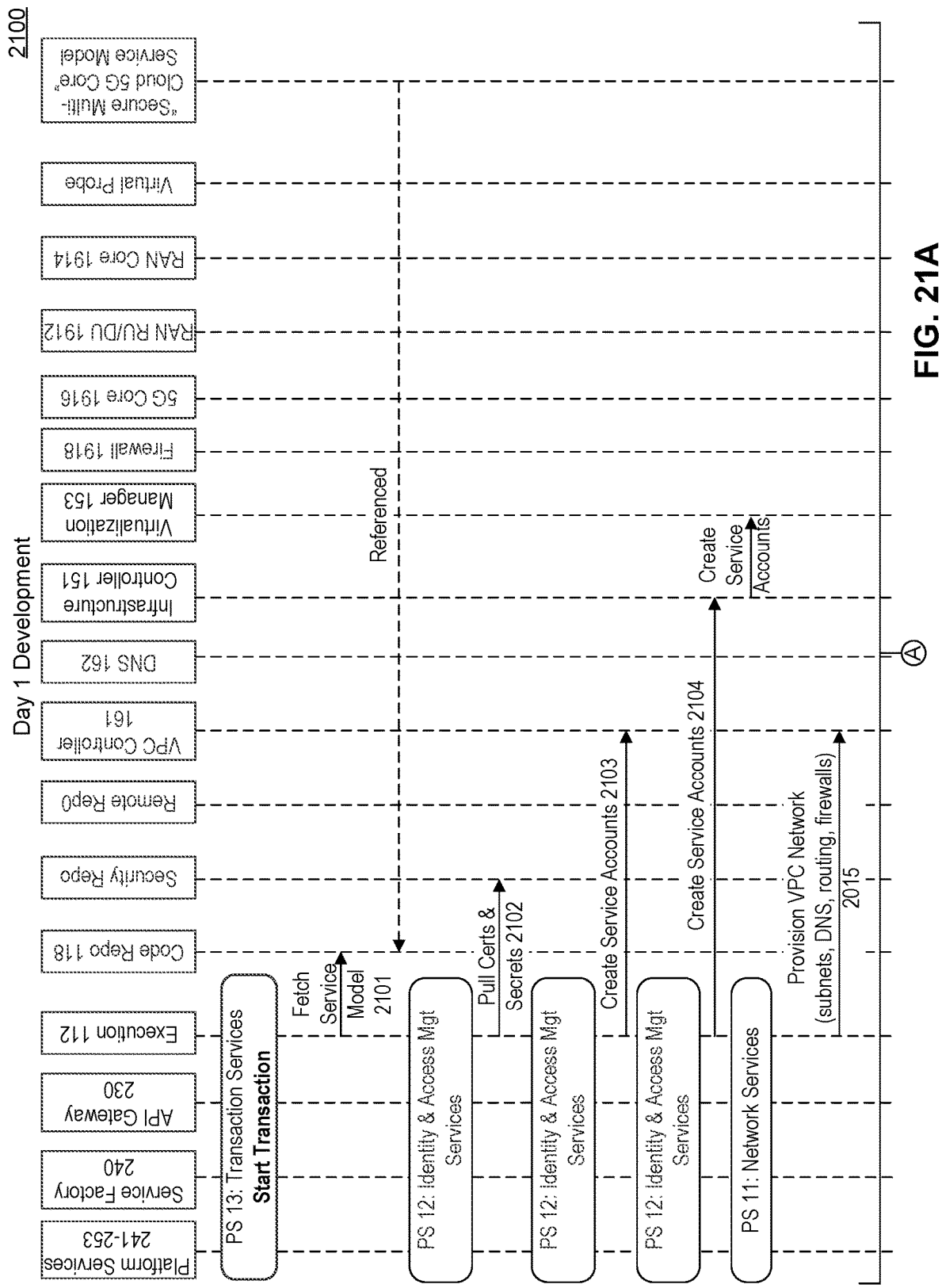
FIGS. 21A-21C are a sequence diagram illustrating a day-one deployment method performed in the use case for deploying and assuring a secure, multi-cloud 5G network.
Figure 21B:
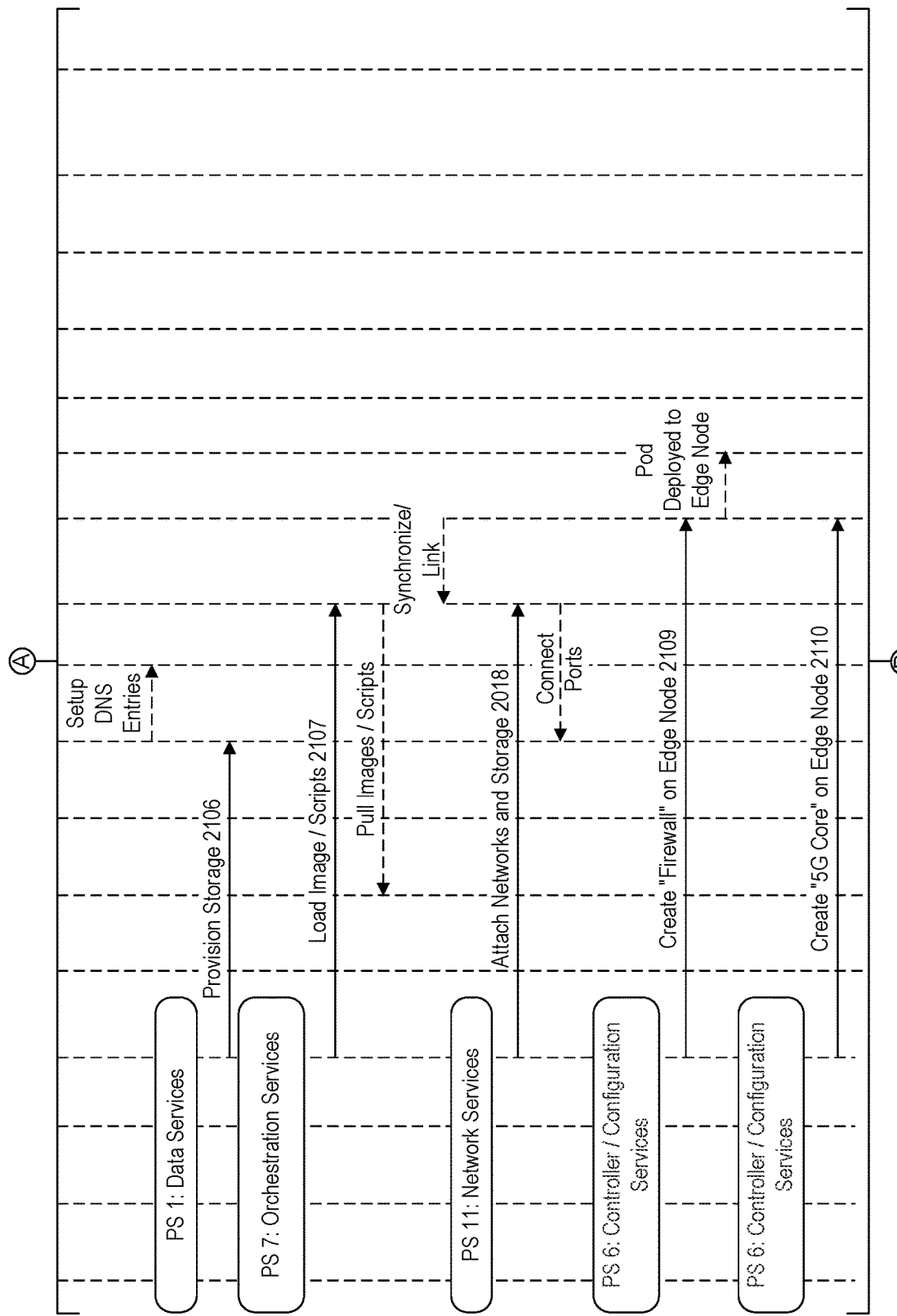
Figure 21C:
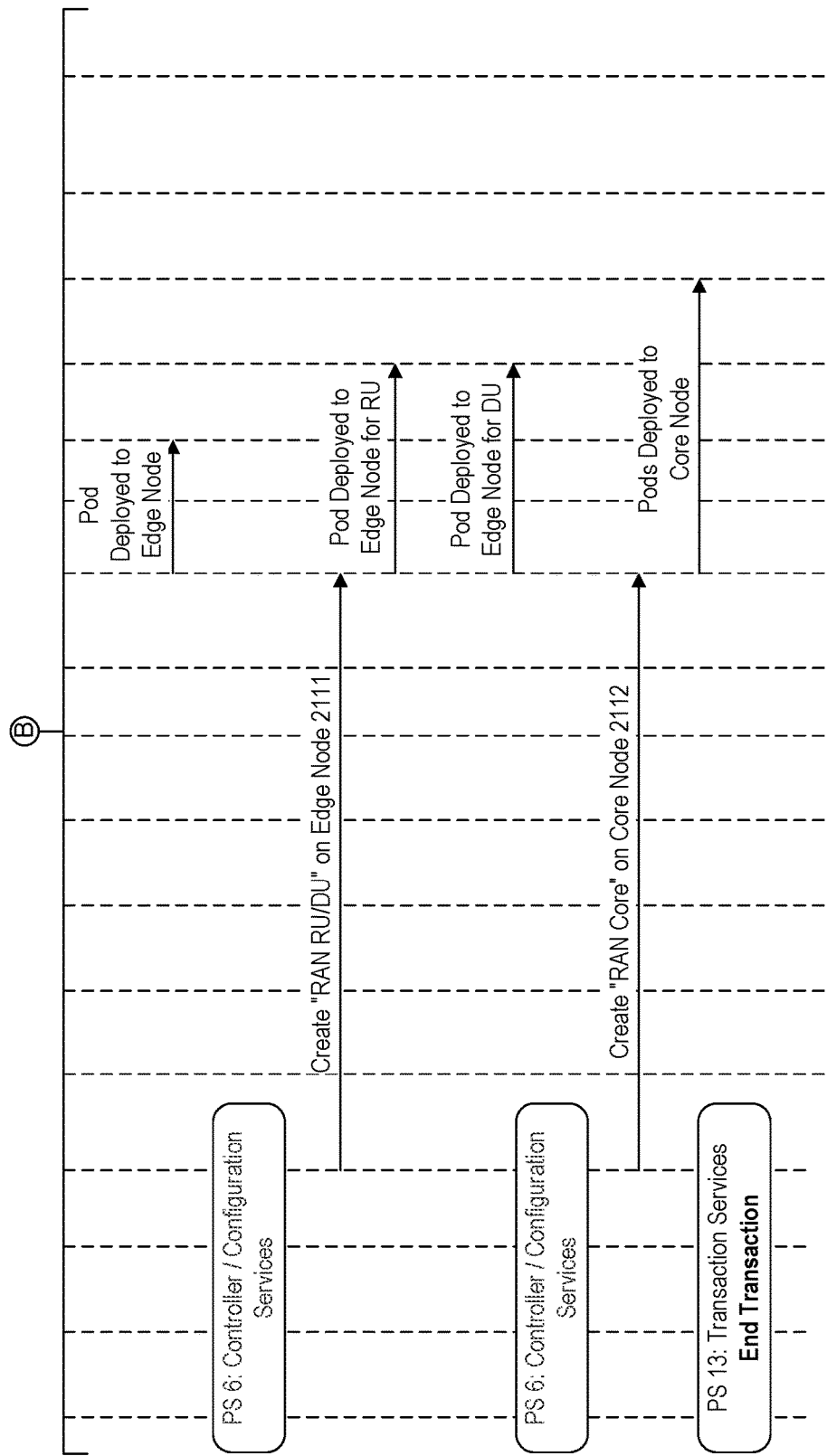

FIGS. 21A-21C are a sequence diagram illustrating a method 2100 of performing day-one deployment in the use case for deploying and assuring a secure, multi-cloud 5G network, according to some embodiments. Method 2100 can be performed by processing logic that can comprise hardware (e.g., circuitry, dedicated logic, programmable logic, microprocessor, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 21A-21C, as will be understood by a person of ordinary skill in the art(s).

Day-one deployment involves provisioning the network, storage and compute resources, and deploying all applications required by a secure, multi-cloud 5G network.

In 2101, deployment starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching models 123 from code repository 118. The system also creates a process token (or links to one if it already exists) to implement the transaction and allow the tasks in the use-case depicted to execute asynchronously.

In 2102, system 110 requires a security context to interact with the underlying systems, so renders platform service 252 (PS 12: Identity and Access Management Services) which pulls security credentials from security repository 115.

In 2103 and 2104, system 110 requires service accounts to work with the infrastructure, so renders platform service 252 (PS 12: Identity and Access Management Services) to create service accounts for use with VPC controller 161 and infrastructure controller 151.

In 2105, system 110 needs to setup the base network for the service so renders platform service 251 (PS 11: Network Services) which computes the network topology, protocols, constraints and other properties required. Platform service 251 uses VPC controller 161 to create subnets, DNS, routing, and firewalls to support the service.

In 2106, system 110 needs to setup storage for the various applications involved in the service, so renders platform service 241 (PS 1: Data Services) which computes the storage types, volumes and other properties required. Platform service 241 uses VPC controller 161 to provision storage to support the service.

In 2107, system 110 needs to ensure the artifacts connected to Application Packages (scripts, images, etc.) are available for the Virtualization Manager(s) which will provision the application nodes, so renders platform service 247 (PS 7: Orchestration Services). Platform service 247 coordinates the transfer of images from a remote repository to the local image repo found in the infrastructure.

In 2108, system 110 needs to attach provisioned resources to compute nodes where the applications will be instantiated, so renders platform service 251 (PS 11: Network Services) which attaches the networks and storage to the nodes via VPC controller 161.

System 110 then needs to deploy the network applications, so renders platform service 245 (PS 6: Controller/Configuration Services) for this purpose. Platform service 245 determines the specific compute requirements of each application and either create Pod/Containers or VMs for them via infrastructure controller 151, resulting in one or more components per application. In 2109, system 110 creates a firewall on an edge node including a VM to filter ingress/egress traffic for the overall service. In 2110, system 110 creates a 5G core on an edge node including network packet and software gateways, subscriber databases, and other components that collectively handle packet tracking across 5G slices. In 2711, system 110 creates a RAN RU/DU on an edge node including packet processing components for control and data planes of a radio access network. In 2712, system 110 creates a RAN core on a core node including packet processing, management, and policy components for control and data planes of a radio access network.

Deployment ends with system 110 closing the transaction using via platform service 253 (PS 13: Transaction Services) and at this point committing any/all objects. After successful completion, the system proceeds to day-one integration, described in further detail below with reference to FIG. 22.

Figure 22A:
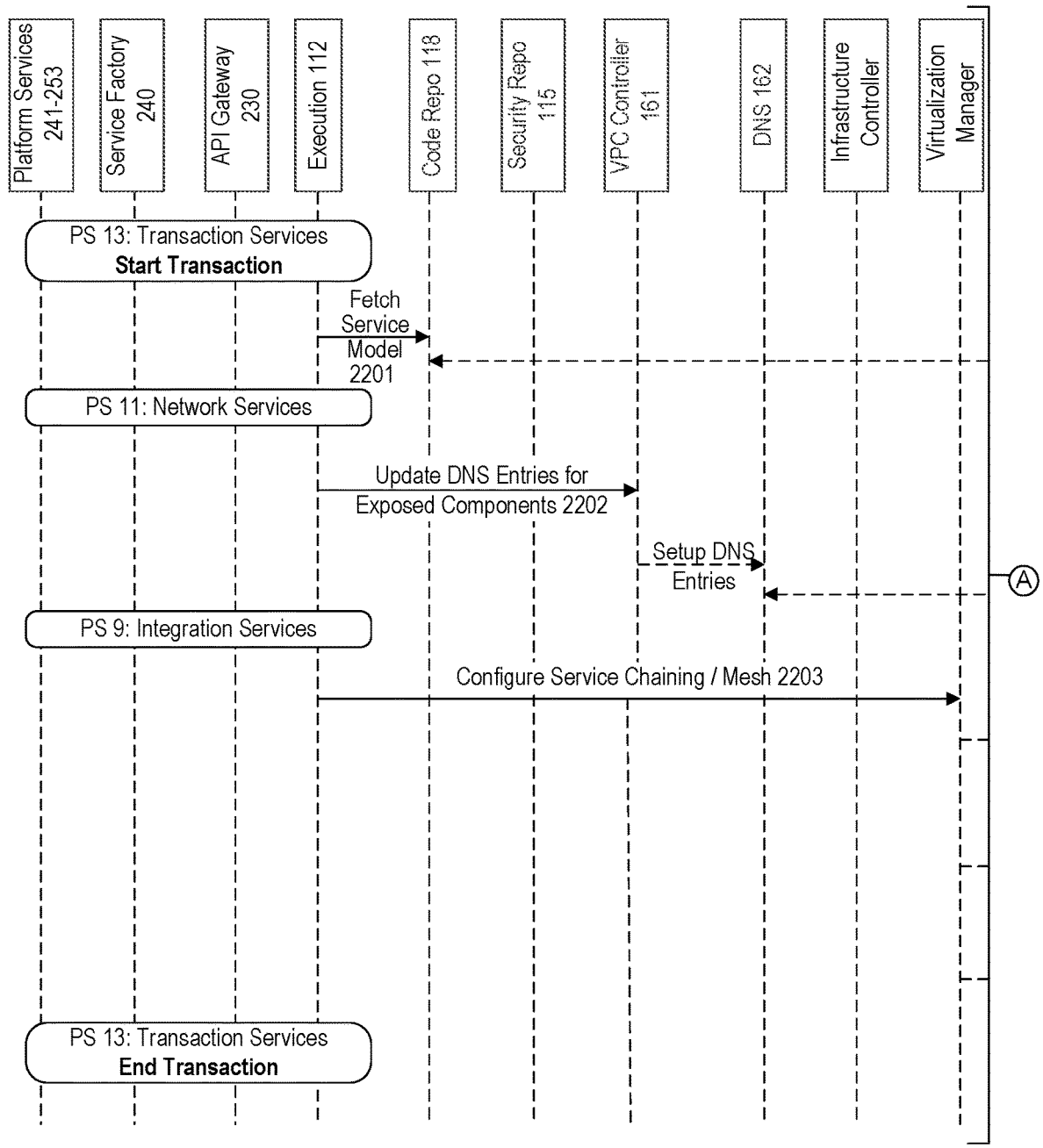
FIGS. 22A-22B are a sequence diagram illustrating a day-one integration method performed in the use case for deploying and assuring a secure, multi-cloud 5G network.
Figure 22B:
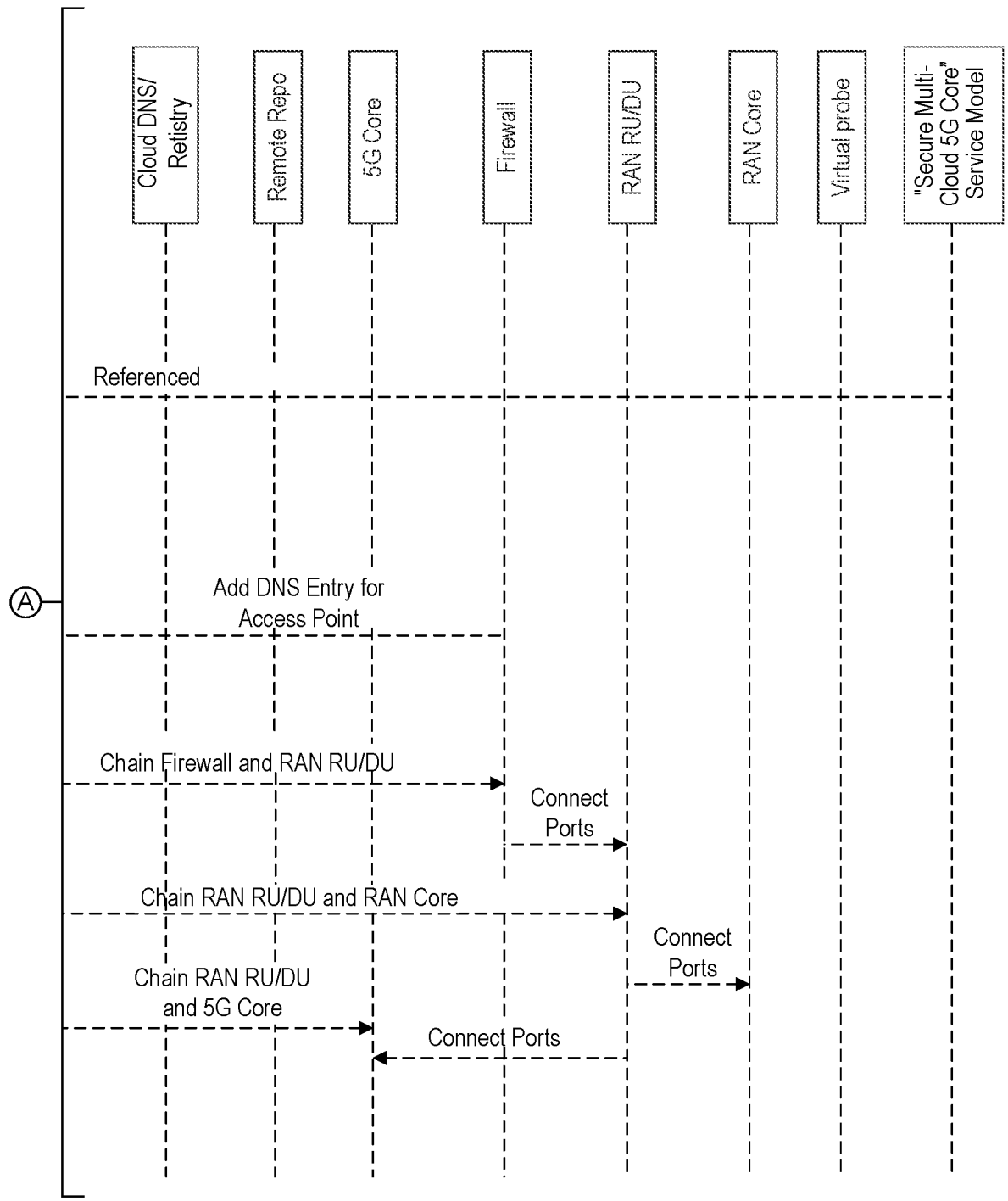

FIGS. 22A-22B are a sequence diagram illustrating a method 2200 of performing day-one integration in the use case for deploying and assuring a secure, multi-cloud 5G network, according to some embodiments. Method 2200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 22A-22B, as will be understood by a person of ordinary skill in the art(s).

Day-one integration involves connecting the applications and any supporting services required by a secure, multi-cloud 5G network.

In 2201, integration starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists) to implement the transaction and allow the tasks in the use-case depicted to execute asynchronously.

In 2202, system 110 needs to expose all deployed components (from all applications) to the system at large, so renders platform service 251 (PS 11: Network Services) which resolves Hostname, port, and other requirements for the services and configures DNS 162 via VPC controller 161.

In 2203, the system needs to chain (link) the deployed components together so they function as a composite service, so renders platform service 249 (PS 9: Integration Services) which resolves the protocols, ports and other networking requirements needed to establish required packet throughput, and sends a command to virtualization manager 153 to connect ports and perform other required tasks on containers 154 and virtual machines 155 involved. This includes chaining the firewall and the RAN RU/DU, the RAN RU/DU and the RAN core, and the RAN RU/DU and the 5G core.

Integration ends with the system closing the transaction using via platform service 253 (PS 13: Transaction Services), and at this point "committing" any/all objects. After successful completion, the system proceeds to day-one configuration, described in further detail below with reference to FIG. 23.

Figure 23A:
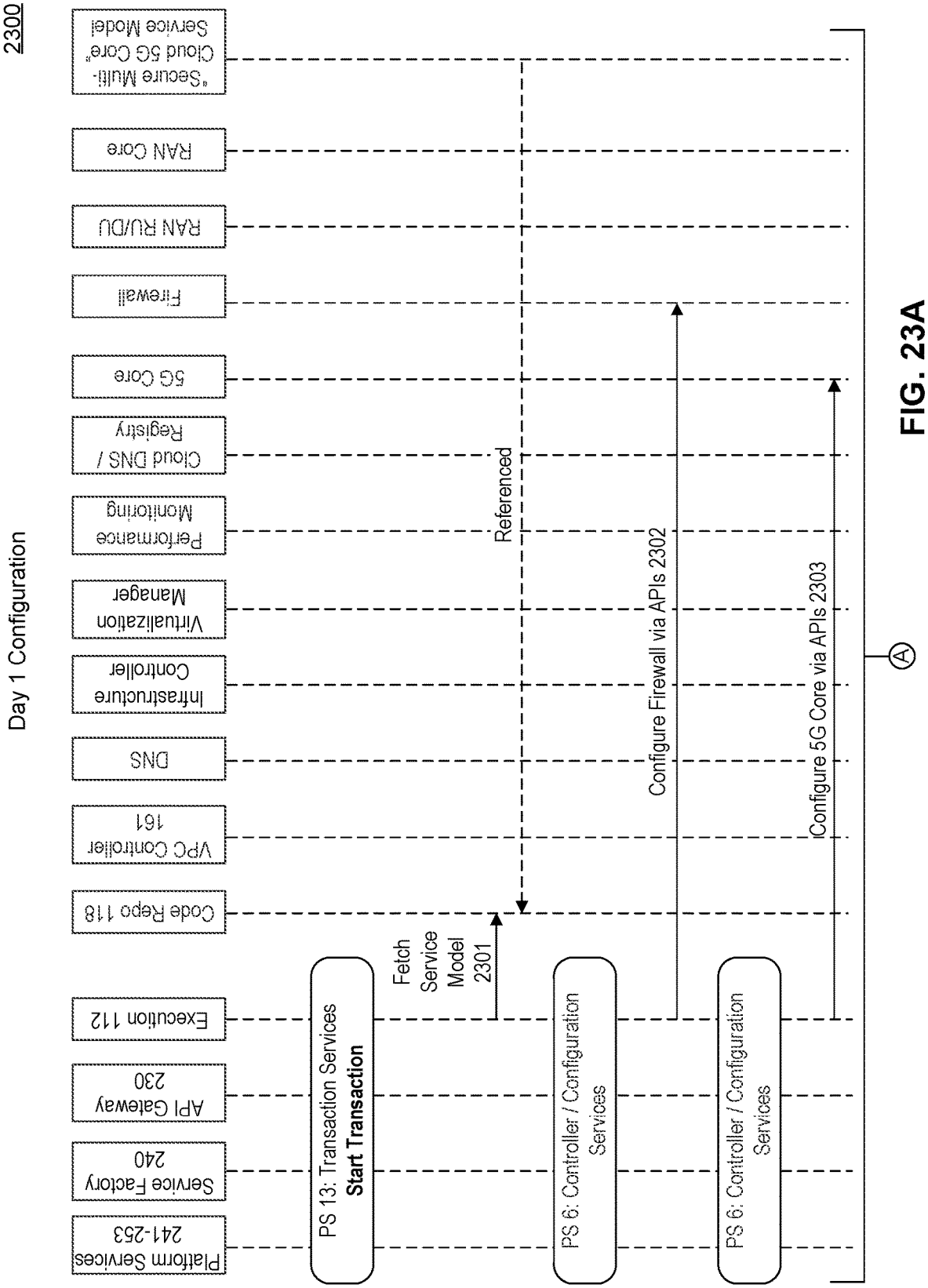
FIGS. 23A-23B are a sequence diagram illustrating a day-one configuration method performed in the use case for deploying and assuring a secure, multi-cloud 5G network.
Figure 23B:
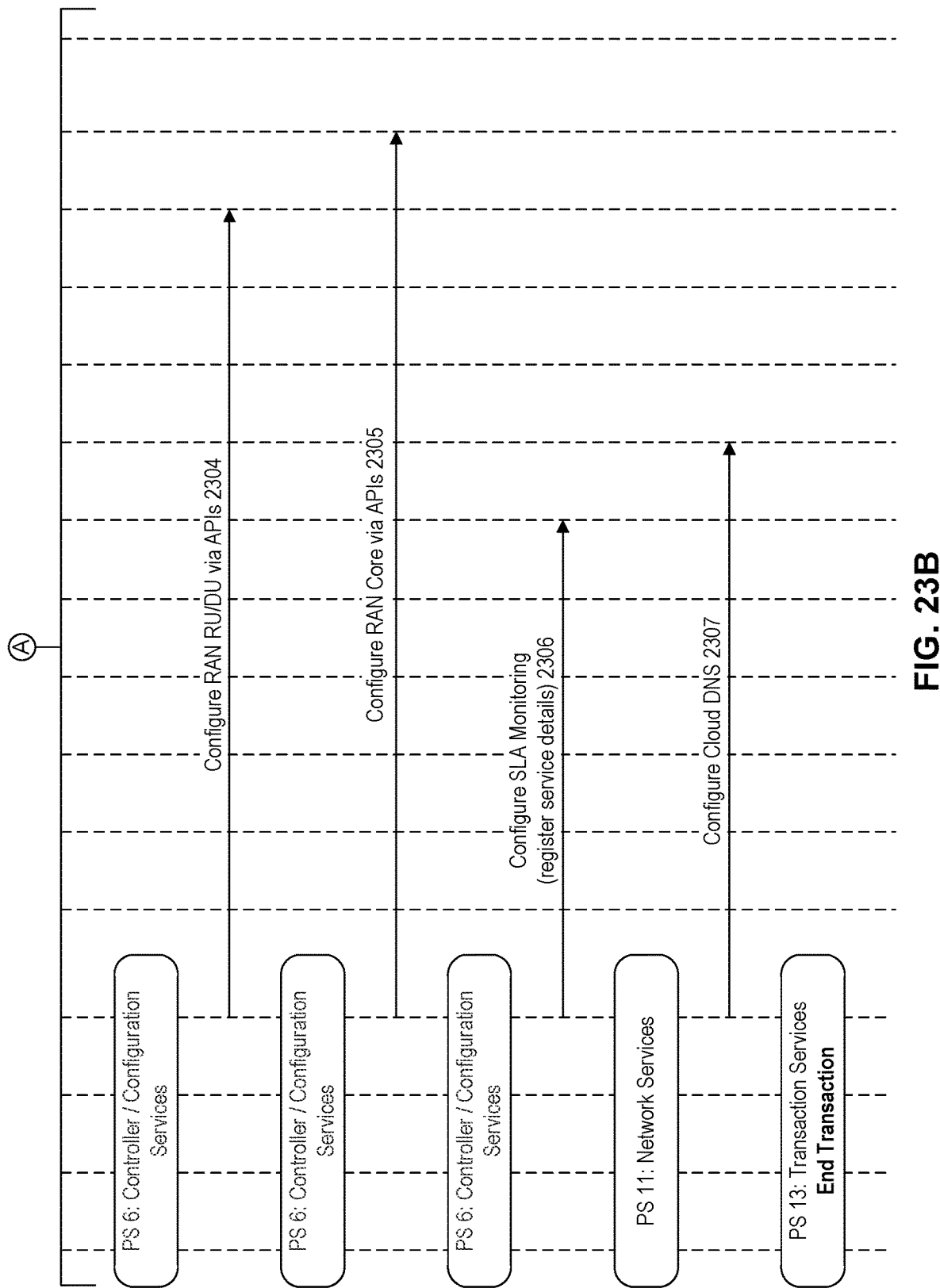

FIGS. 23A-23B are a sequence diagram illustrating a method 2300 of performing day-one configuration in the use case for deploying and assuring a secure, multi-cloud 5G network, according to some embodiments. Method 2300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 23A-23B, as will be understood by a person of ordinary skill in the art(s).

Day-one configuration involves configuring all remaining aspects of the solution to realize a secure, multi-cloud 5G network.

In 2301, configuration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists), to implement the transaction and allow the tasks in the use-case depicted to execute asynchronously.

System 110 needs to configure the service specific applications, so renders platform service 245 (PS 6: Controller/Configuration Services) for this purpose. System 110 determines the specific configuration requirements of each application so that they perform both individually and collectively (as part of the service) and resolves details needed such as types, formats and protocols required to carry out the configurations. System 110 then proceeds to configure the components of each via their available interfaces (REST, CLI, etc.). In 2302, system 110 configures the firewall, e.g., by specifying routing tables, safe and restricted endpoint listing, and other routing rules to secure traffic for the service. In 2303, system 110 configures the 5G core, e.g., by specifying high-level user/packet handling policies, and 5G slice management controls and policies. In 2304, system 110 configures the RAN RU/DU, e.g., by specifying radio network connection parameters and radio hardware specifications. In 2305, system 110 configures the RAN Core, e.g., by specifying user/packet handling and overall management policies.

In 2306, system 110 needs configure related SLAs monitoring within the performance monitoring service, so renders platform service 245 (PS 6: Controller/Configuration Services) for this purpose.

In 2307, system 110 needs to expose the service externally so that users can consume it, so renders platform service 251 (PS 11: Network Services) which resolves Hostname, port, and other requirements for the services and configures DNS 162.

Configuration ends with the system closing the transaction using via platform service 253 (PS 13: Transaction Services) and at this point "committing" any/all objects.

After successful completion, the network service is ready to be used, and system 110 may proceed to day-two orchestration, described in further detail below with reference to FIG. 24.

Figure 24:
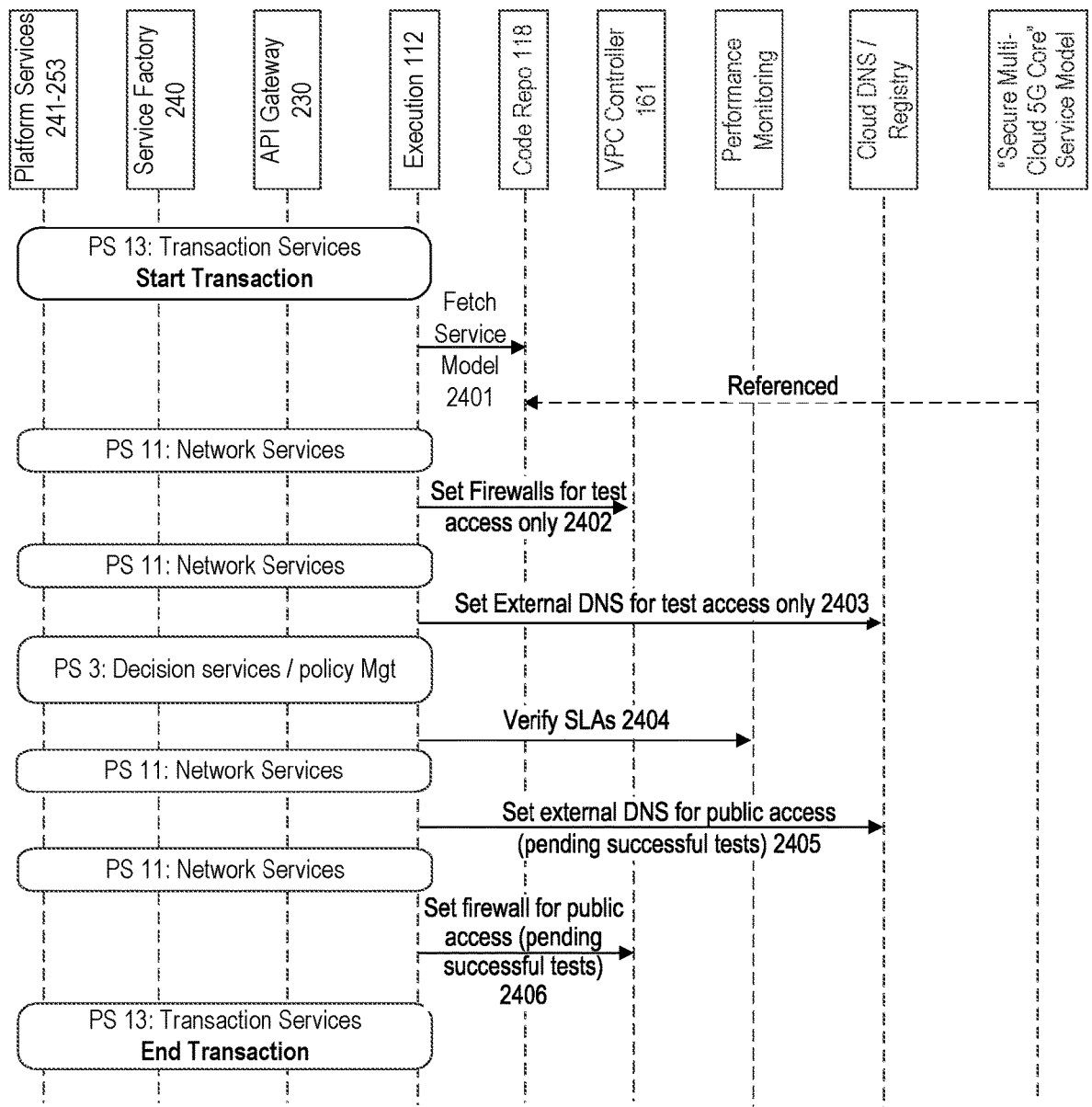
FIG. 24 is a sequence diagram illustrating a day-two orchestration method performed in the use case for deploying and assuring a secure, multi-cloud 5G network.

FIG. 24 is a sequence diagram illustrating a method 2400 of performing day-two orchestration in the use case for deploying and assuring a secure, multi-cloud 5G network, according to some embodiments. Method 2400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 24, as will be understood by a person of ordinary skill in the art(s).

The example shown in FIG. 24 of day-two orchestration is used to test and assure the service by orchestrating a set of test components to measure aspects of the secure, multi-cloud 5G network, both functional and non-functional, against simulated traffic.

In 2401, orchestration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction fetches the initial context required to carry out the sequence by fetching the Service Model from code repository 118. System 110 also creates a Process Token (or links to one if it already exists), to implement the transaction and allow the tasks in the use-case depicted to execute asynchronously.

In 2402 and 2403, for testing, system 110 needs to remove external access to the service, so renders platform service 251 (PS 11: Network Services) which resolves Hostname, port, and other requirements for the services and configures both the local DNS via VPC controller 161 and DNS 162 directly for this purpose.

In 2304, system 110 needs to verify that SLAs are met by the service under-load, so renders platform service 243 (PS 3: Decision Services/Policy Management) to carry out this evaluation via the Performance Monitoring component.

In 2305 and 2306, with testing complete, the system needs to restore external access to the service, so renders platform service 253 (PS 11: Network Services) which resolves hostname, port and other requirements for the services and configures both the local DNS via VPC controller 161 and DNS 162 directly for this purpose.

Orchestration ends with the system closing the transaction using via platform service 253 (PS 13: Transaction Services) and at this point "committing" any/all objects. After successful completion, the secure, multi-cloud 5G network is assured.

Use Case 4: Optimized, Secure 5G Radio Access Network

Use-case 4 (UC4) is the deployment and assurance of an optimized, secure 5G radio access network. Users on mobile devices use a VPN client to connect to a 5G edge node which provides optimized, private, secure traffic (SASE—Secure Access Service Edge). The end-to-end network is deployed and optimized as part of the use-case, and assured both in terms of performance (SLAs) and security. FIGS. 25-34 describe use case 4. Use case 4 allows a communication service provider to offer an optimized VPN service allowing customers secured access to all of their "core services" (e.g., secure business systems like content management, human resources management, etc.) delivered directly to their phones or other devices via a Radio Access Network (4G or 5G) with Quality of Service (QoS) guarantees.

Figure 25:
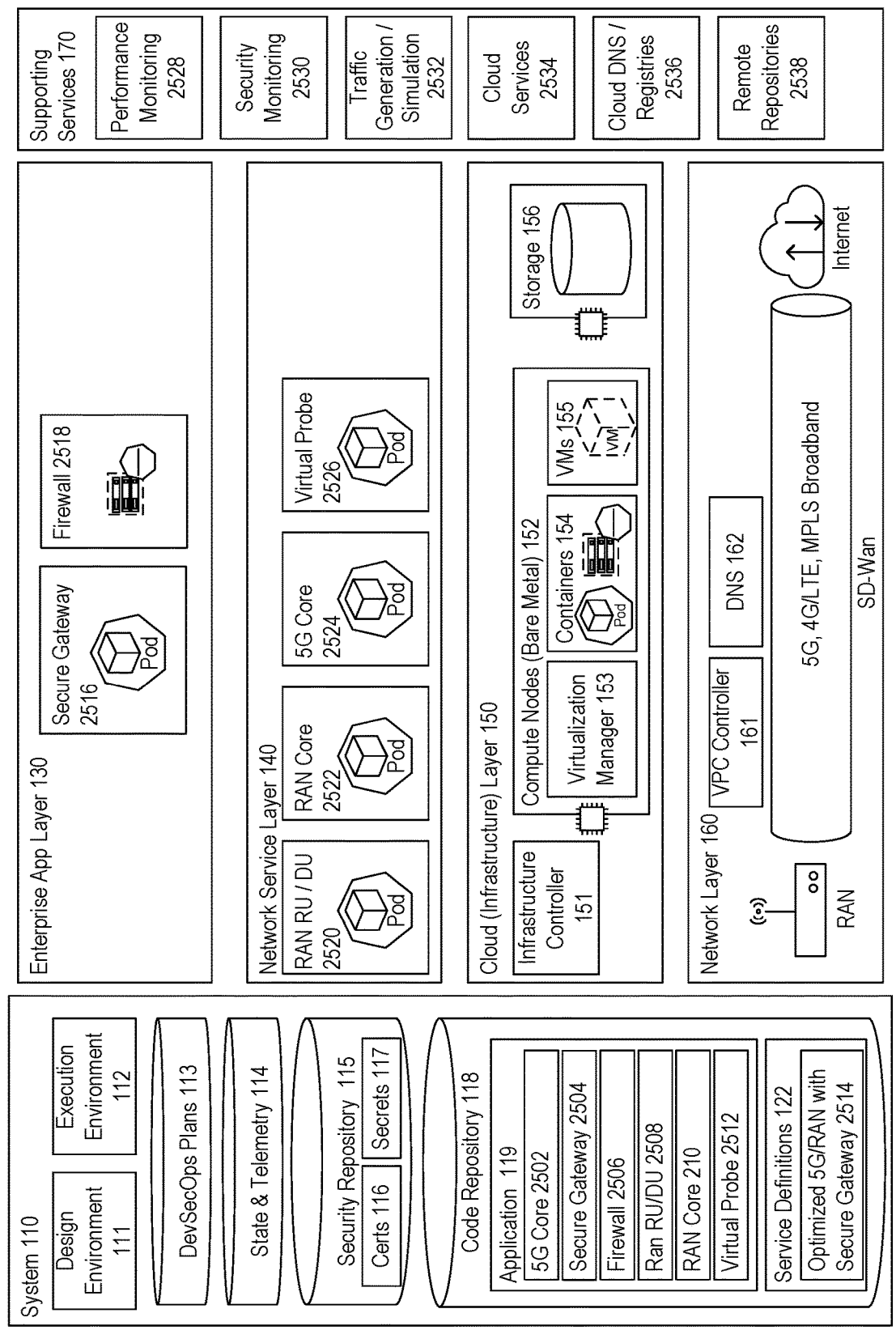
FIG. 25 is a block diagram of an architecture for deploying and assuring an optimized, secure 5G radio access network.

FIG. 25 is a block diagram of an architecture for deploying and assuring an optimized, secure 5G radio access network. Architecture 2500 may include the components described above with reference to FIG. 1. Additionally, architecture 2500 may include 5G core package 2502, secure gateway package 2504, firewall package 2506, RAN RU/DU package 2508, RAN core package 2510, virtual probe package 2512, optimized 5G/RAN 2514, secure gateway 2516, firewall 2518, RAN RU/DU 2520, RAN core 2522, 5G core 2524, virtual probe 2526, performance monitoring components F2528, security monitoring 2530, traffic generation 2532, cloud services 2534, cloud DNS 2536, and remote repositories 2538.

The core service for the use-case is "Optimized 5G/RAN with Secure Gateway." Service definitions 122 and application packages 119 are found in code repository 118 in system 110.

In network layer 160, a VPC is implemented via VPC controller 161 with DNS 162.

In cloud layer 150, infrastructure controller 151 provides an interface to compute nodes 152 for each site involved in the use case and to storage 156. Compute nodes 152 have virtualization manager 153 present to support the execution of container-based applications (containers 154) and virtual machine based applications that run on virtual machines 155. Also, compute nodes 152 provide a programming interface for their hardware (NIC—Network Interface Controllers) so that they can be optimized for the applications running on them.

In network service layer 140, the core-network service consists of a RAN RU/DU 2520, RAN core 2522, and 5G core 2524, which together provide the end-to-end 5G connectivity for connected devices. Virtual probe 2526 is also deployed for monitoring. All components are running over containers on the Compute Nodes. Application packages 119 for each component are found in code repository 118.

In enterprise application layer 130, secure gateway 2514 is deployed as a container, and firewall 2516 is deployed as a VM over containers, both on the Edge Compute node. Application packages 119 for each component are found in code repository 118.

Supporting services 170 for this use-case include performance monitoring components 2528, security monitoring 2530, traffic generation 2532, cloud services 2534 for service account creation, a cloud DNS/Registry 2536, and remote repositories 2538 (for images).

Figure 26:
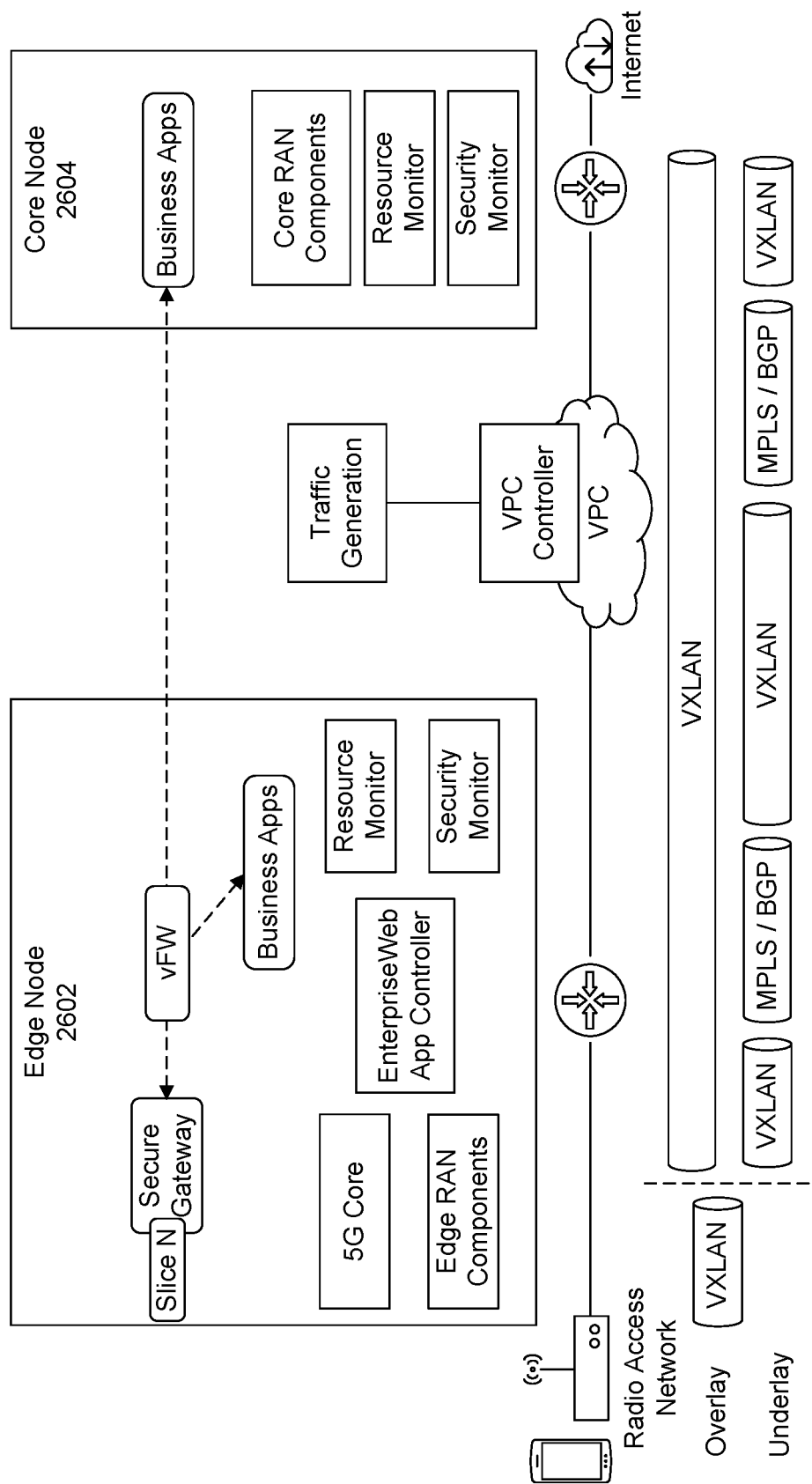
FIG. 26 is a network service diagram for the use case for deploying and assuring an optimized, secure 5G radio access network.
Figure 27A:
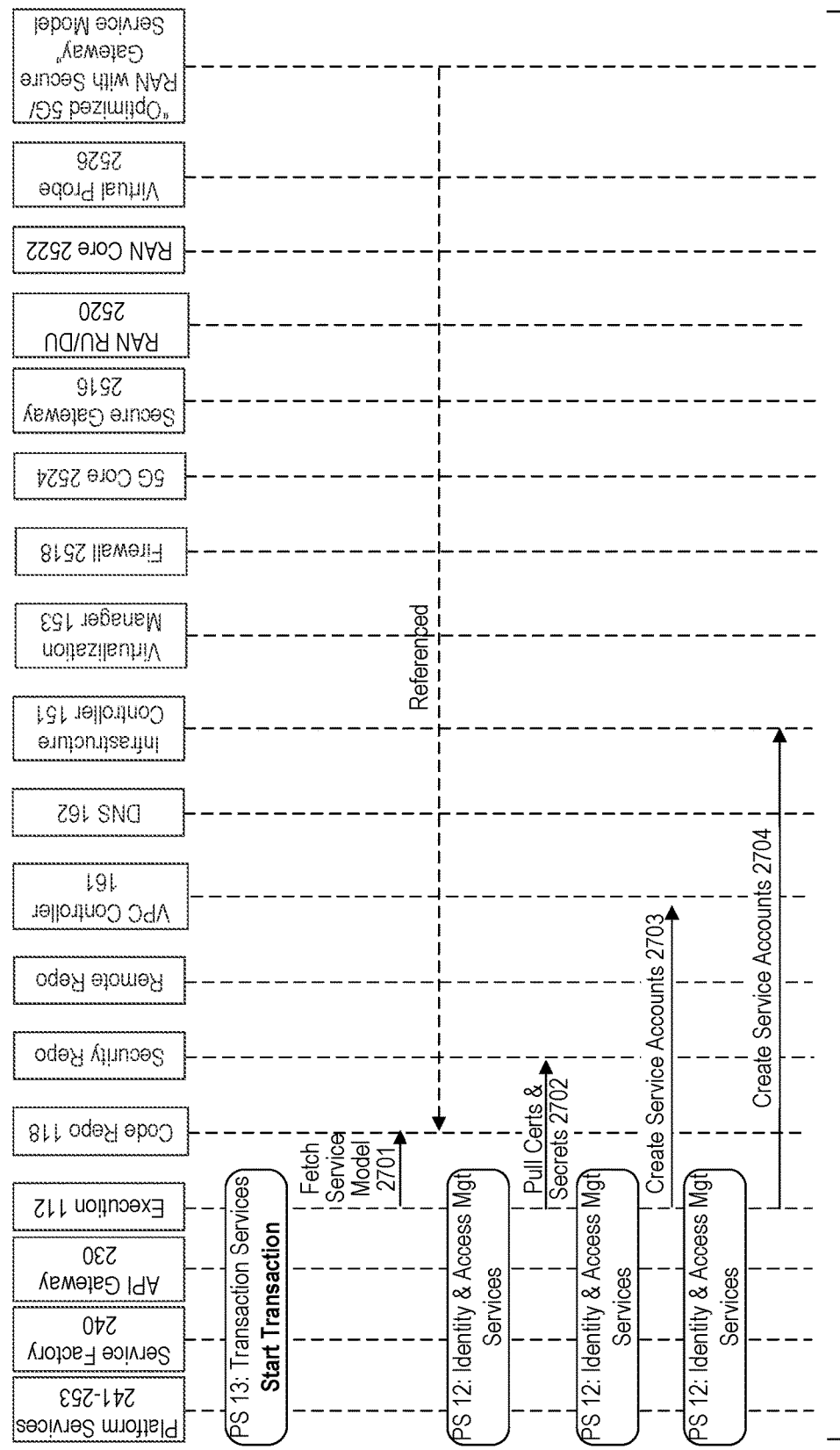
Figure 27C:
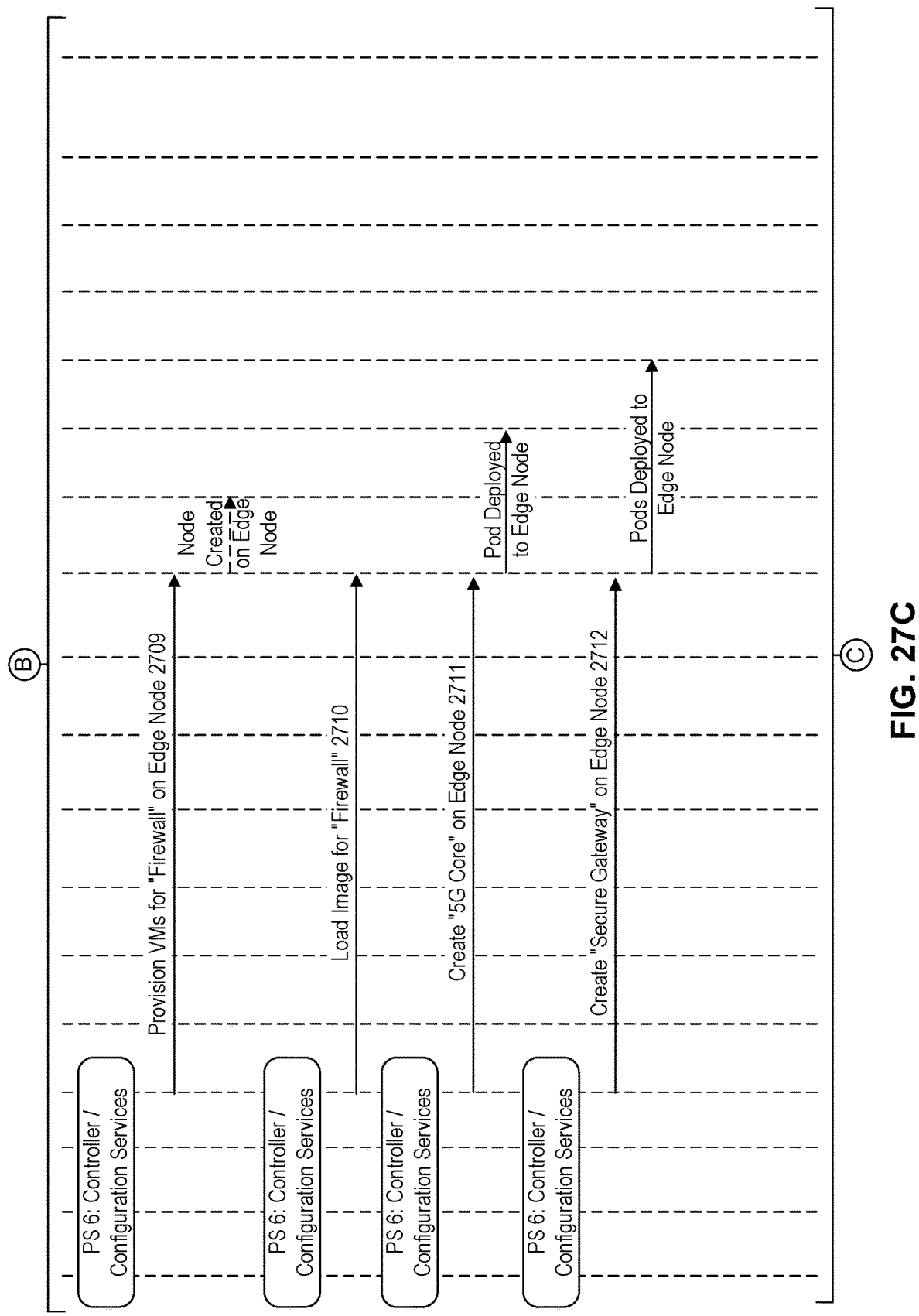
Figure 27D:
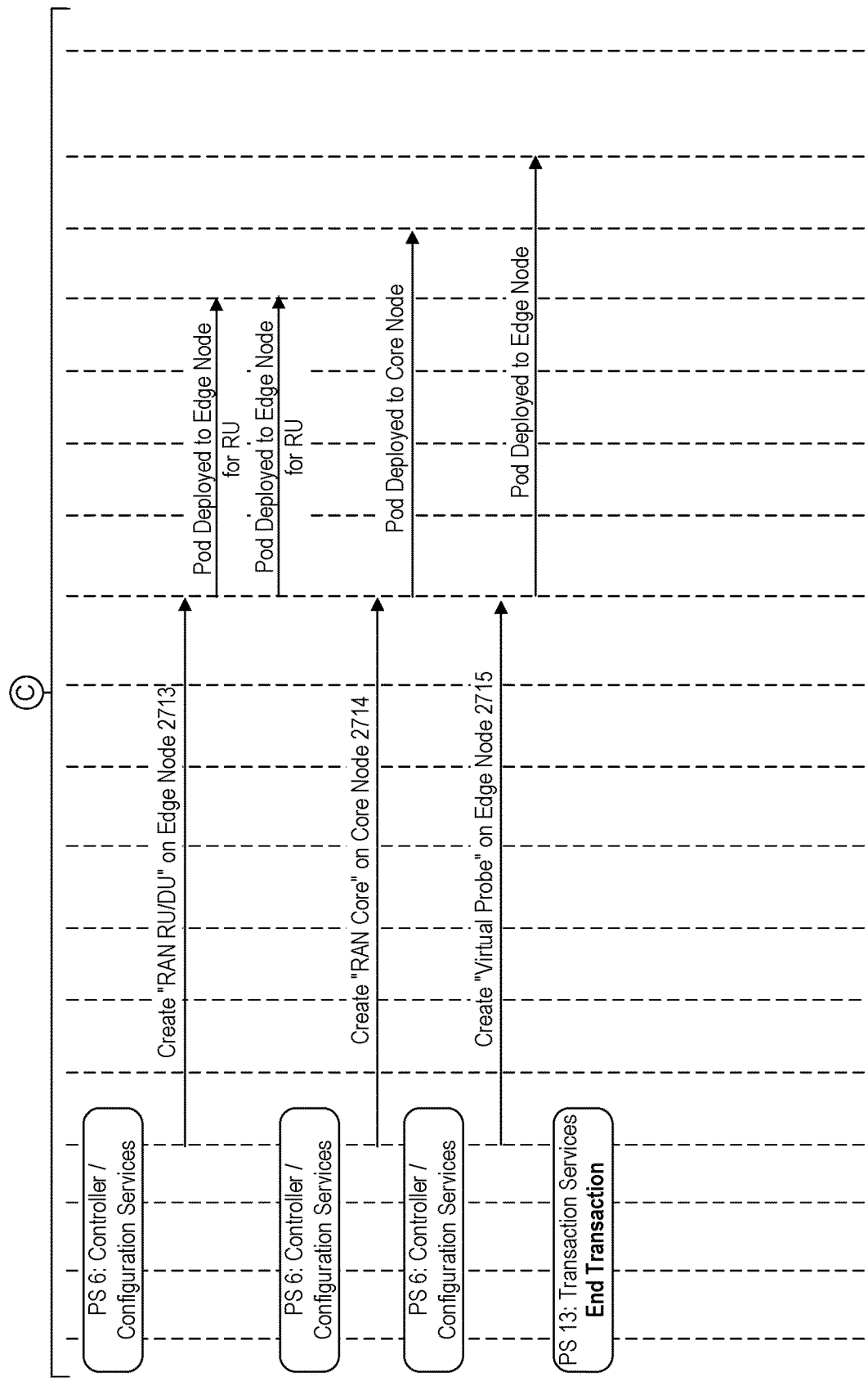

FIG. 26 is a network service diagram of network service 2600 for the use case for deploying and assuring an optimized, secure 5G radio access network. Network service 2600 may include edge node 2602 and core node 2604.

The use-case is implemented across two nodes (edge node 2602 and core node 2604), connected via a VPC (SD-WAN) network and connected switches. Edge node 2602 is also connected to a RAN (Radio Access Network), and core node 2604 is also connected to the Internet. The VPC is implemented by a standard set of overlay and underlay protocols.

Edge node 2602 has containers/pods for the 5G Core and Edge RAN Components, a VM over containers for the vFW (virtual Firewall) to deliver shared base functionality across all 5G slices; containers/pods per 5G slice for the Secure Gateway itself; containers/pods for probes that act as Resource and Security Monitors; and containers/pods for the EnterpriseWeb System deployed as an App Controller to execute the use-case. Optionally, other Business Apps could be deployed at the edge.

Core node 2604 has containers/pods for the Core RAN Components; and containers/pods for probes that act as Resource and Security Monitors. Optionally, other Business Apps could be deployed at the core.

A Traffic Generator is connected independently via the VPC for testing purposes.

Each sequence diagram (e.g., FIGS. 27-34) is organized the same. System 110's components for "Platform Services" (platform services 241-253), "Service Factory" (service factory 240, "and "API Gateway," (API gateway 230), which together are responsible for "Execution," are shown to the left. Each system interaction includes a note indicating which platform service in platform services 241-253 is rendered to deliver the task. The right side shows the resulting interaction with the system's actors.

FIGS. 27A-27D are a sequence diagram illustrating a method 2700 of performing day-one deployment in the use case for deploying and assuring an optimized, secure 5G radio access network, according to some embodiments. Method 2700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 27A-27D, as will be understood by a person of ordinary skill in the art(s).

Day-one deployment involves provisioning the network, storage and compute resources, and deploying all applications required by an optimized, secure 5G radio access network.

In 2701, deployment starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching models 123 from code repository 118. The system also creates a process token (or links to one if it already exists) to implement the transaction and allow the tasks in the use-case depicted to execute asynchronously.

In 2702, system 110 requires a security context to interact with the underlying systems, so renders platform service 252 (PS 12: Identity and Access Management Services) which pulls security credentials from security repository 115.

In 2703 and 2704, system 110 requires service accounts to work with the infrastructure, so renders platform service 252 (PS 12: Identity and Access Management Services) to create service accounts for use with VPC controller 161 and infrastructure controller 151.

In 2705, system 110 needs to setup the base network for the service so renders platform service 251 (PS 11: Network Services) which computes the network topology, protocols, constraints and other properties required. Platform service 251 uses VPC controller 161 to create subnets, DNS, routing, and firewalls to support the service.

In 2706, system 110 needs to setup storage for the various applications involved in the service, so renders platform service 241 (PS 1: Data Services) which computes the storage types, volumes and other properties required. Platform service 241 uses VPC controller 161 to provision storage to support the service.

In 2707, system 110 needs to ensure the artifacts connected to Application Packages (scripts, images, etc.) are available for the Virtualization Manager(s) which will provision the application nodes, so renders platform service 247 (PS 7: Orchestration Services). Platform service 247 coordinates the transfer of images from a remote repository to the local image repo found in the infrastructure.

In 2708, system 110 needs to attach provisioned resources to compute nodes where the applications will be instantiated, so renders platform service 251 (PS 11: Network Services) which attaches the networks and storage to the nodes via VPC controller 161.

In 2709, system 110 provisions VMs for a firewall on an edge node, e.g., by allocating required vCPUs, RAM, attached disc volumes, and NIC ports to support the firewall requirements.

In 2710, system 110 loads images for the firewall, installing the Operating System, firewall software, and all dependencies onto the VM.

System 110 then needs to deploy the network applications, so renders platform service 245 (PS 6: Controller/Configuration Services) for this purpose. Platform service 245 determines the specific compute requirements of each application and either create Pod/Containers or VMs for them via infrastructure controller 151, resulting in one or more components per application. In 2711, system 110 creates a 5G core on an edge node. In 2712, system 110 creates a secure gateway on an edge node. In 2713, system 110 creates a RAN RU/DU on an edge node. In 2714, system 110 creates a RAN core on a core node. In 2715, system 110 creates a virtual probe on an edge node.

Deployment then ends with system 110 closing the transaction using via platform service 253 (PS 13: Transaction Services) and at this point "committing" any/all objects. After successful completion, the system proceeds to day-one integration, described in further detail below with reference to FIG. 28.

Figure 28A:
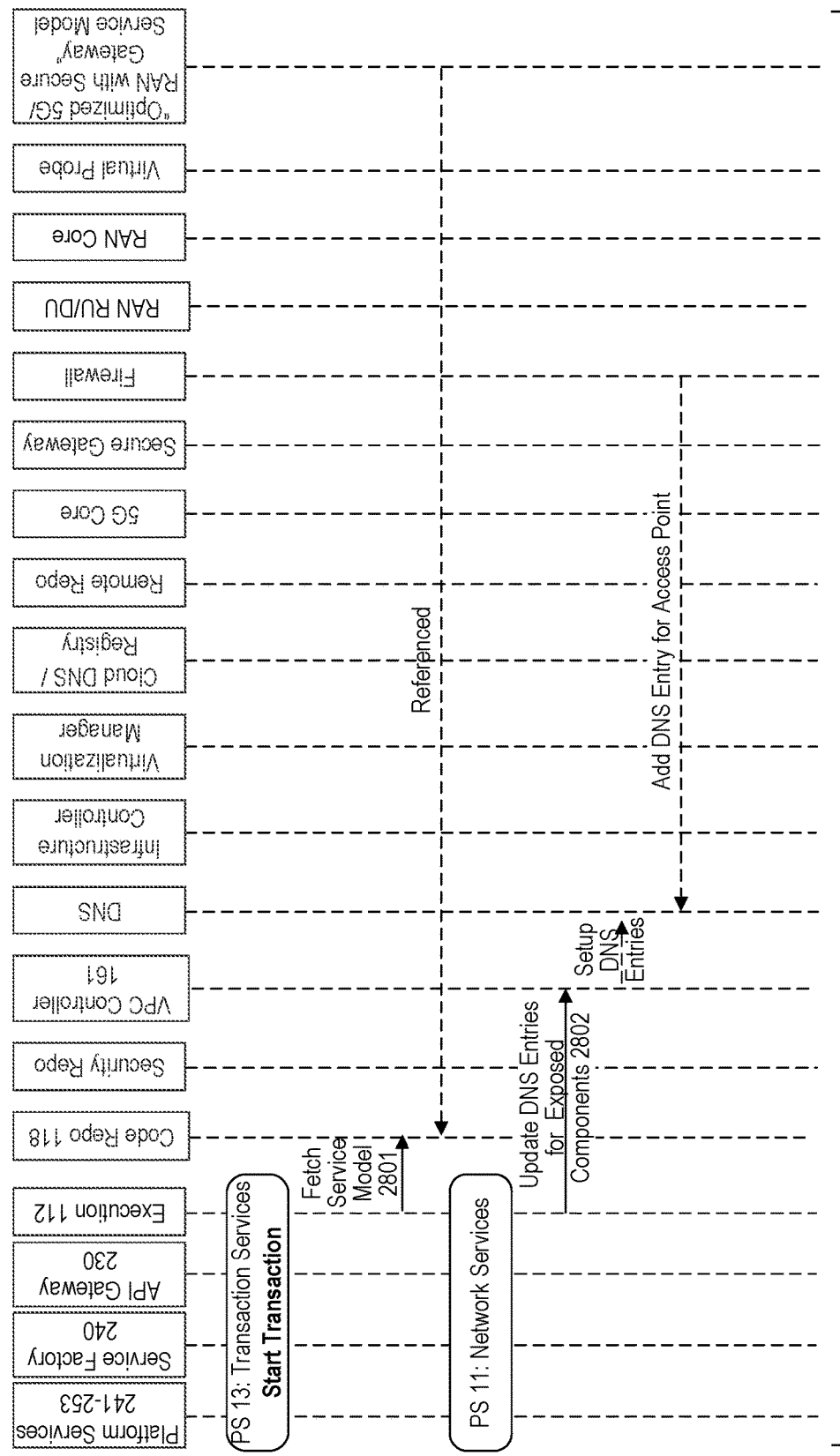
FIGS. 28A-28C are a sequence diagram illustrating a day-one integration method performed in the use case for deploying and assuring an optimized, secure 5G radio access network.
Figure 28B:
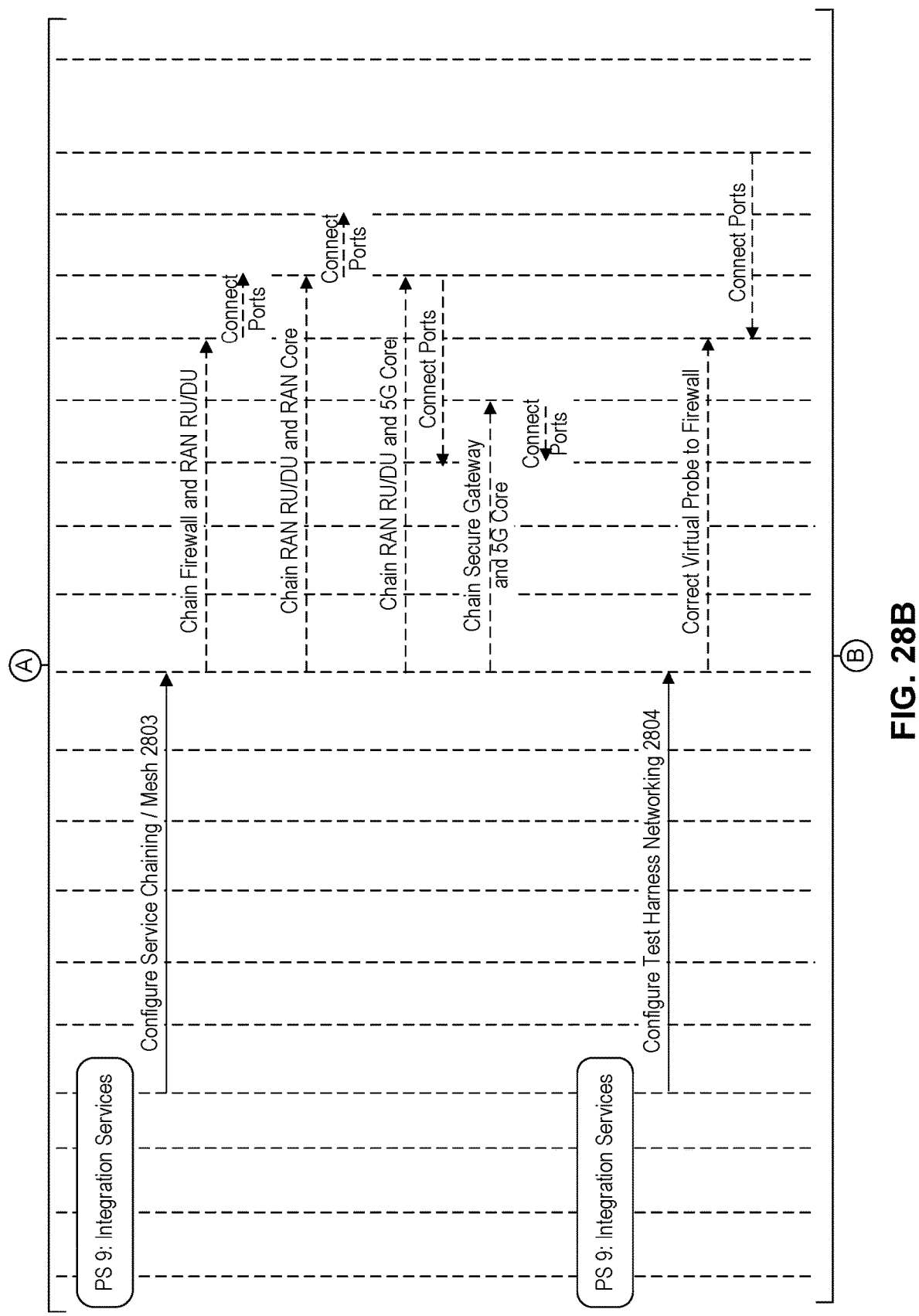
Figure 28C:
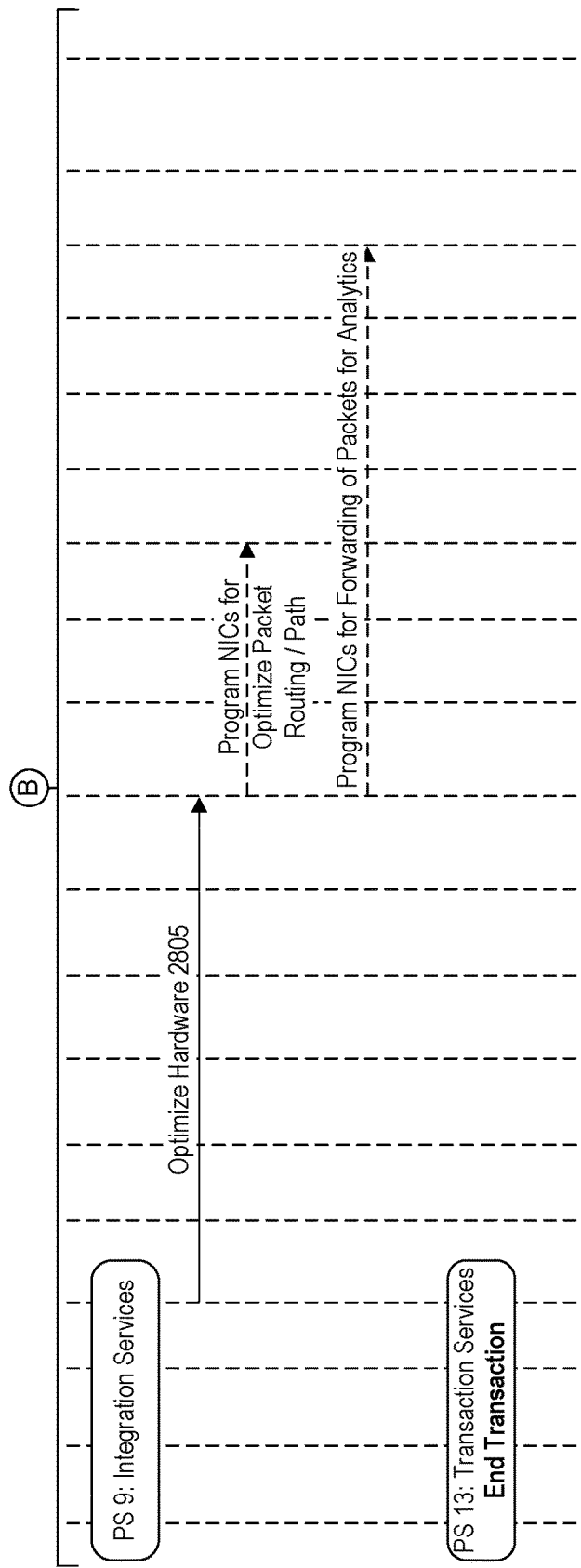

FIGS. 28A-28C are a sequence diagram illustrating a method 2800 of performing day-one integration in the use case for deploying and assuring an optimized, secure 5G radio access network, according to some embodiments. Method 2800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 28A-28C, as will be understood by a person of ordinary skill in the art(s).

Day-one integration involves connecting the applications and any supporting services required by an optimized, secure 5G radio access network.

In 2801, integration starts with system 110 opening up a transaction so that all tasks can be rolled back and the infrastructure restored if there is a failure. All interactions happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists) to implement the transaction and allow the tasks in the use-case depicted to execute asynchronously.

In 2802, system 110 needs to expose all deployed components (from all applications) to the system at large, so renders platform service 251 (PS 11: Network Services) which resolves Hostname, port, and other requirements for the services and configures DNS 162 via VPC controller 161.

In 2803, the system needs to chain (link) the deployed components together so they function as a composite service, so renders platform service 249 (PS 9: Integration Services) which resolves the protocols, ports and other networking requirements needed to establish required packet throughput, and sends a command to virtualization manager 153 to connect ports and perform other required tasks on containers 154 and virtual machines 155 involved.

In 2804, system 110 configures the test harness and network monitoring via virtualization manager 153.

In 2805, the service model includes possible hardware optimizations, which are applicable for the given infrastructure, so system 110 renders platform service 249 (PS 9:

Integration Services) which calculates the optimal configuration of packet routing for the specified service, converts this configuration into a set of commands to execute on the hardware (NIC—Network Interface Controller), and uses the commands to program the NIC via infrastructure controller 151.

Integration ends with the system closing the transaction using via platform service 253 (PS 13: Transaction Services), and at this point "committing" any/all objects. After successful completion, the system proceeds to day-one configuration, described in further detail below with reference to FIG. 29.

Figure 29A:
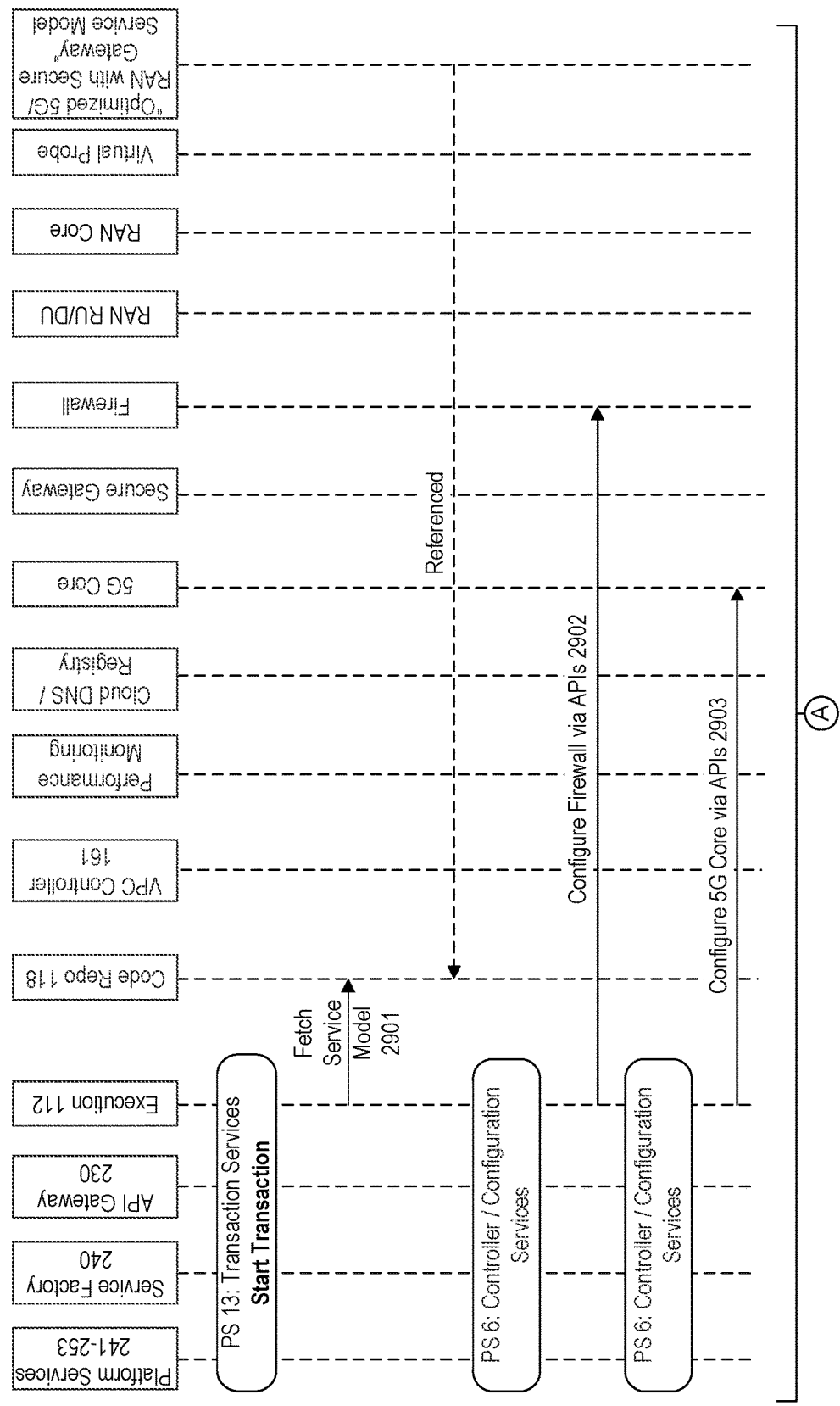
FIGS. 29A-29C are a sequence diagram illustrating a day-one configuration method performed in the use case for deploying and assuring an optimized, secure 5G radio access network.
Figure 29B:
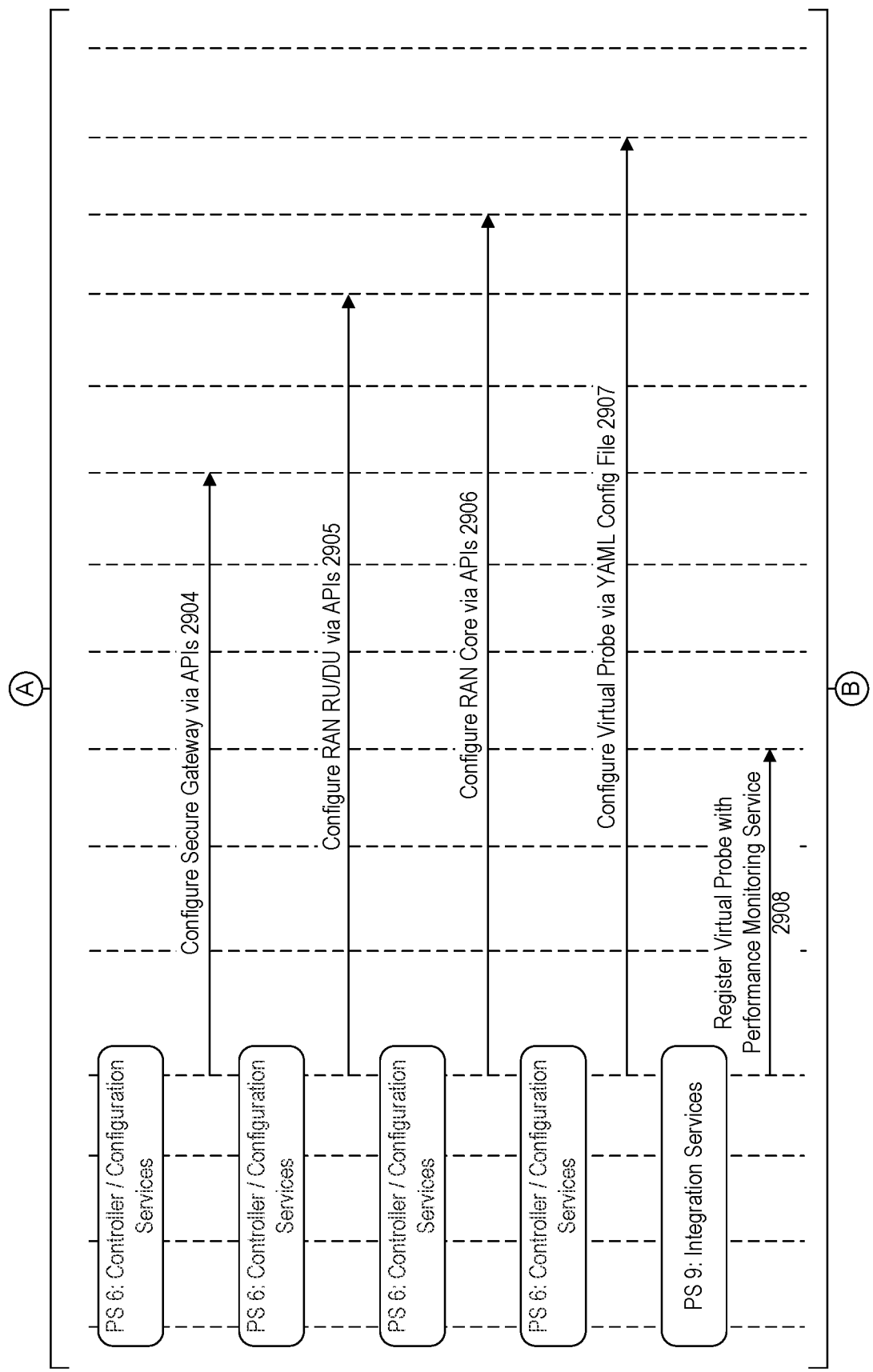
Figure 29C:
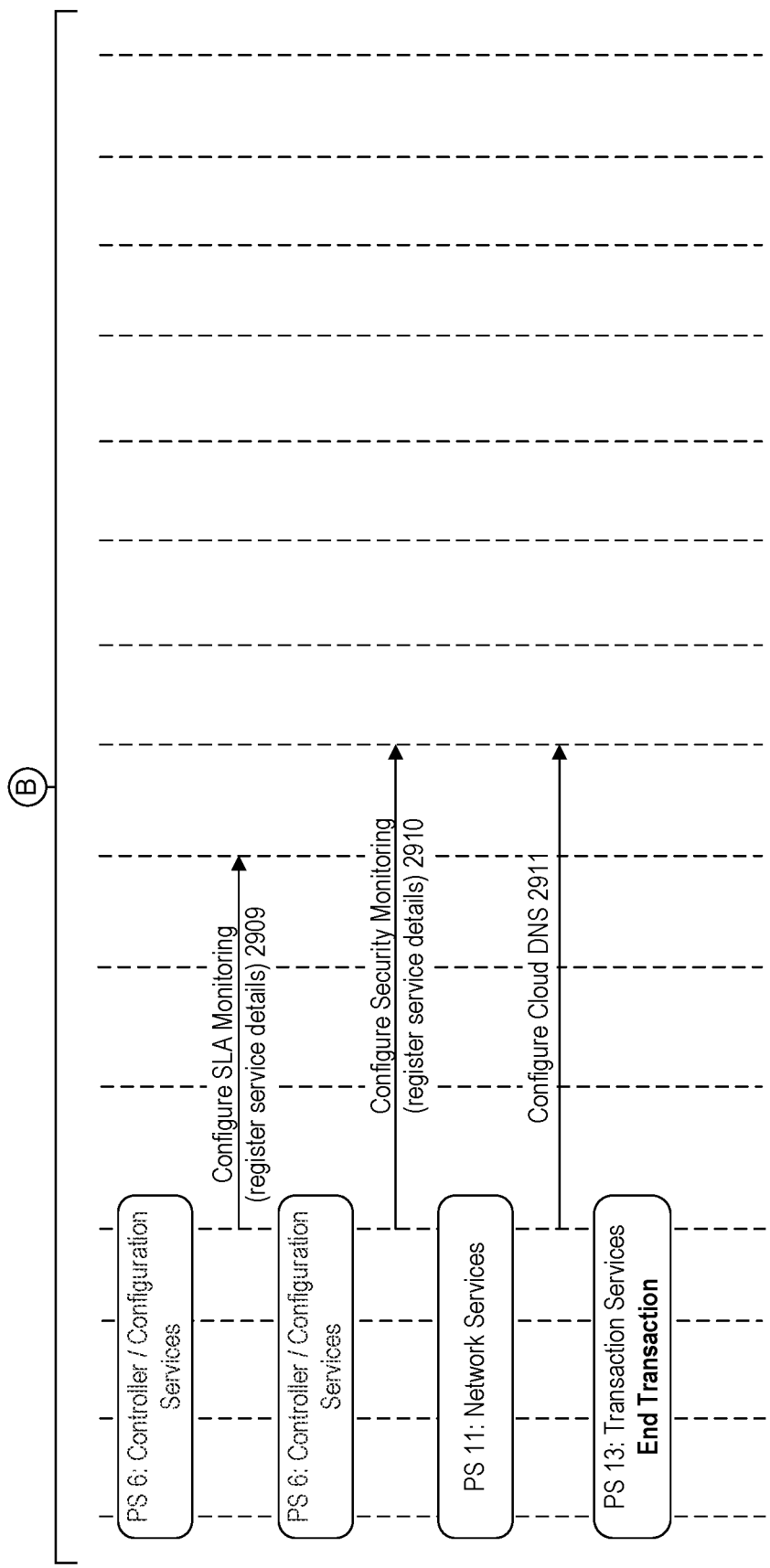

FIGS. 29A-29C are a sequence diagram illustrating a method 2900 of performing day-one configuration in the use case for deploying and assuring an optimized, secure 5G radio access network, according to some embodiments. Method 2900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 29A-29C, as will be understood by a person of ordinary skill in the art(s).

Day-one configuration involves configuring all remaining aspects of the solution to realize an optimized, secure 5G radio access network.

In 2901, configuration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction, system 110 fetches the initial context required to carry out the sequence by fetching a service model from code repository 118. System 110 also creates a Process Token (or links to one if it already exists), to implement the transaction and allow the tasks in the use-case depicted to execute asynchronously.

System 110 needs to configure the service specific applications, so renders platform service 245 (PS 6: Controller/Configuration Services) for this purpose. System 110 determines the specific configuration requirements of each application so that they perform both individually and collectively (as part of the service) and resolves details needed such as types, formats and protocols required to carry out the configurations. System 110 then proceeds to configure the components of each via their available interfaces (REST, CLI, etc.). In 2902, system 110 configures the firewall, e.g., by specifying routing tables, safe and restricted endpoint listing, and other routing rules to secure traffic for the service. In 2903, system 110 configures the 5G core, e.g., by specifying high-level user/packet handling policies, and 5G slice management controls and policies. In 2904, system 110 configures the secure gateway, e.g., by specifying certs, secrets, and traffic policies for secure/VPN based connections to the service. In 2905, system 110 configures the RAN RU/DU, e.g., by specifying radio network connection parameters and radio hardware specifications. In 2906, the system configures the RAN core, e.g., by specifying user/packet handling and overall management policies. In 2907, system 110 configures the virtual probe via the Yet Another Modeling Language ("YAML").

In 2908, system 110 needs to register the probe with the performance monitoring service, so renders platform service 249 (PS 9: Integration Services) for this purpose.

In 2909, system 110 needs configure related SLAs within the performance monitoring service, so renders platform service 245 (PS 6: Controller/Configuration Services) for this purpose.

In 2910, system 110 needs to configure a security monitoring service, so renders platform service 245 (PS 6: Controller/Configuration Services) for this purpose.

In 2911, system 110 needs to expose the service externally so that users can consume it, so renders platform service 251 (PS 11: Network Services) which resolves Hostname, port, and other requirements for the services and configures DNS 162.

Configuration ends with the system closing the transaction using via platform service 253 (PS 13: Transaction Services) and at this point "committing" any/all objects.

After successful completion, the network service is ready to be used, and system 110 may proceed to day-two orchestration, described in further detail below with reference to FIG. 30.

Figure 30A:
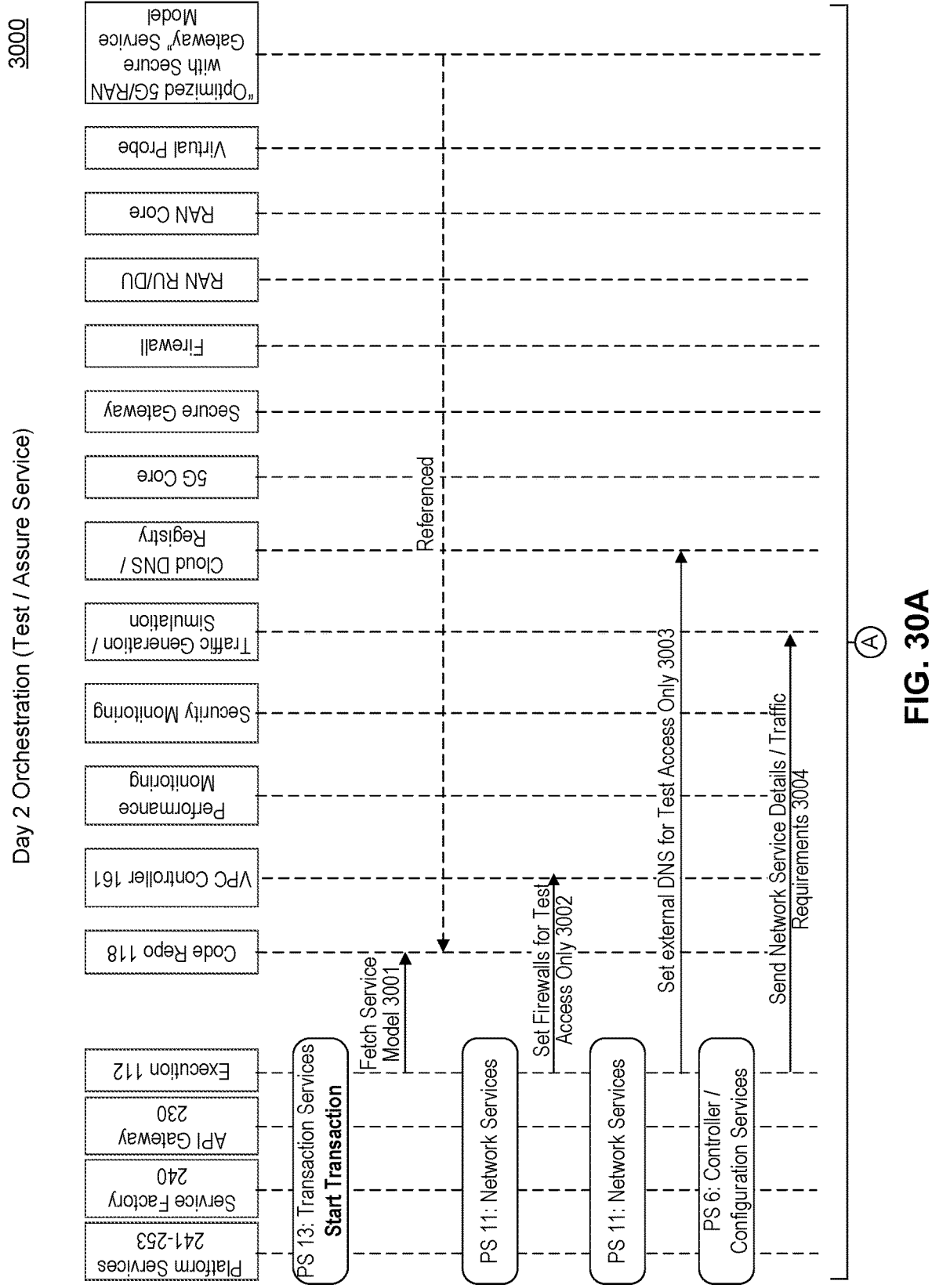
FIGS. 30A-30C are a sequence diagram illustrating a day-two orchestration method performed in the use case for deploying and assuring an optimized, secure 5G radio access network.
Figure 30B:
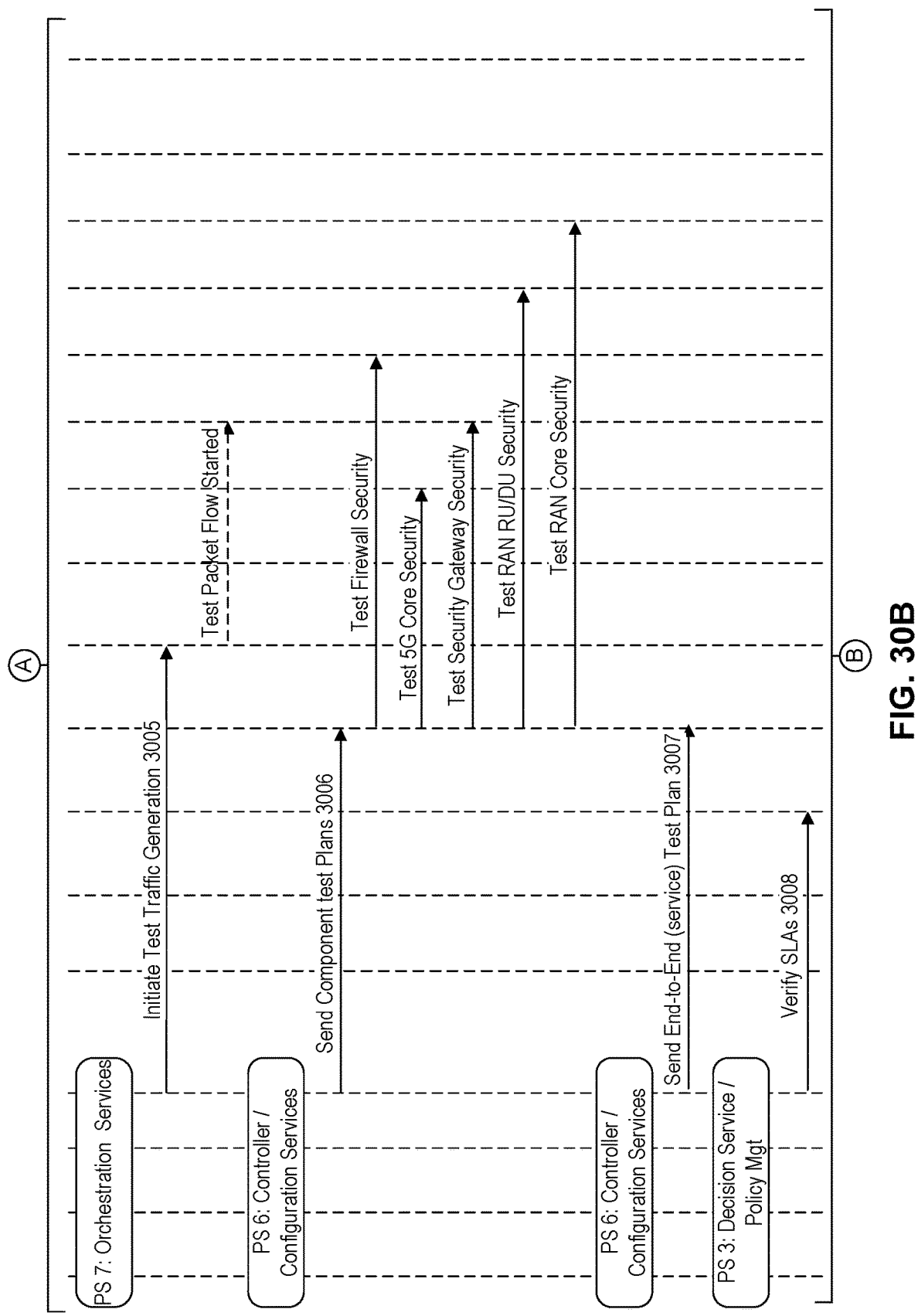
Figure 30C:
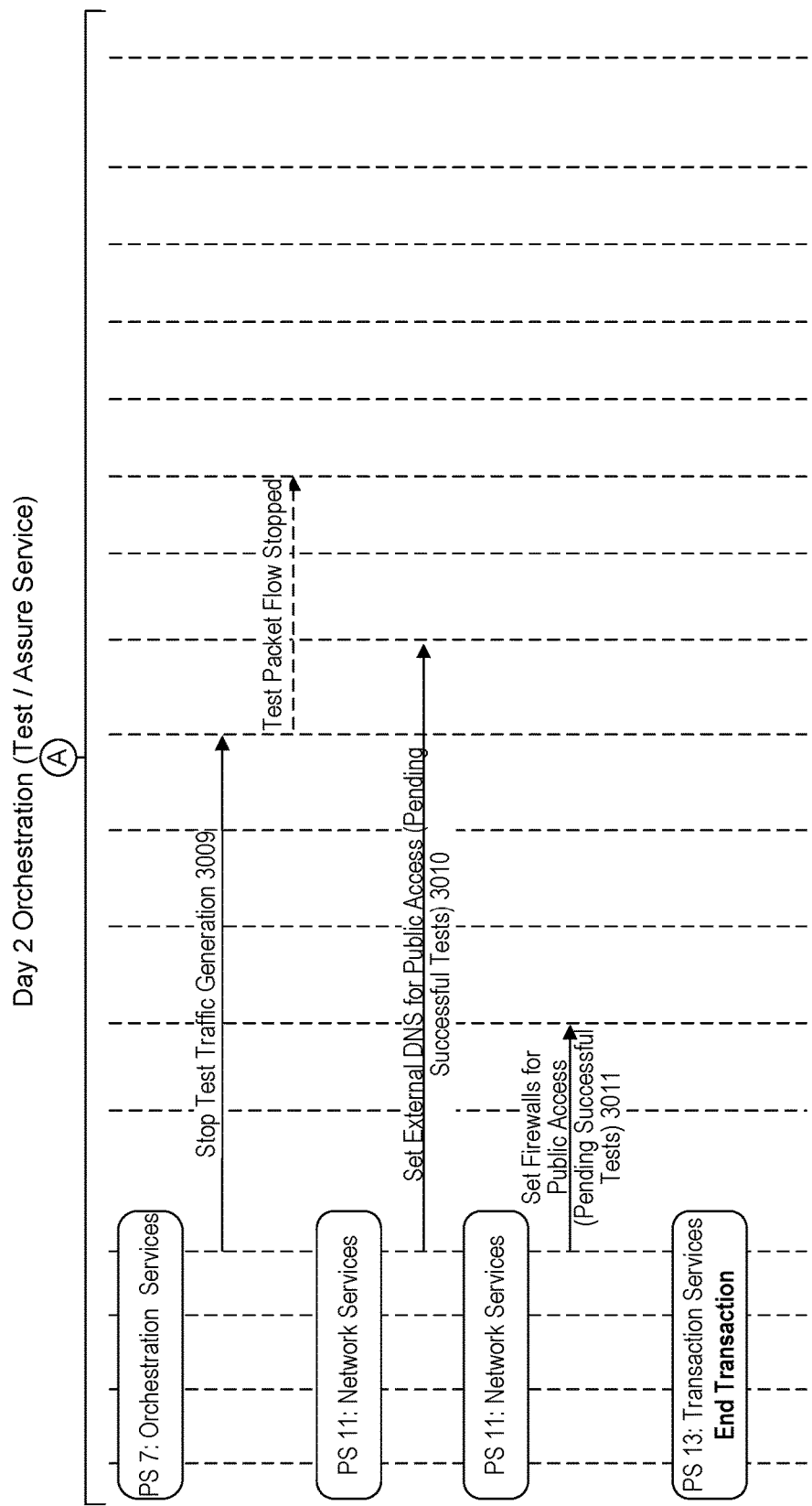

FIGS. 30A-30C are a sequence diagram illustrating a method 3000 of performing day-two orchestration in the use case for deploying and assuring an optimized, secure 5G radio access network, according to some embodiments. Method 3000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 30A-30C, as will be understood by a person of ordinary skill in the art(s).

The example shown in FIG. 30 of day-two orchestration is used to test and assure the service by orchestrating a set of test components to measure aspects of the optimized, secure 5G radio access network, both functional and non-functional, against simulated traffic.

In 3001, orchestration starts with system 110 opening up a transaction so that all tasks can be rolled back/the infrastructure can be restored if there is a failure. All interactions of the system happen within a transaction. For this, system 110 renders platform service 253 (PS 13: Transaction Services). Upon opening the transaction fetches the initial context required to carry out the sequence by fetching the Service Model from code repository 118. System 110 also creates a Process Token (or links to one if it already exists), to implement the transaction and allow the tasks in the use-case depicted to execute asynchronously.

In 3002 and 3003, for testing, system 110 needs to remove external access to the service, so renders platform service 251 (PS 11: Network Services) which resolves Hostname, port, and other requirements for the services and configures both the local DNS via VPC controller 161 and DNS 162 directly for this purpose.

In 3004, for testing, system 110 needs to start a flow to simulate test traffic, so renders platform service 246 (PS 6: Controller/Configuration Services) which determines the formats and protocols required for the test traffic, any other specific characteristics of the traffic, and details such as target IPs/Ports, and configures the Traffic Generation/Simulation component for these purposes via REST.

In 3005, once simulated traffic is configured, system 110 needs to start it, so renders platform service 247 (PS 7: Orchestration Services) for this purpose.

In 3006, for testing, system 110 needs to verify the success of unit (per application/component) and end-to-end security test plans, so renders platform service 246 (PS 6:

Controller/Configuration Services) to compile these plans based on the characteristics of components and the service, and executes them via the Security Monitoring Component.

In 3007, system 110 sends an end-to-end test.

In 3008, system 110 needs to verify that SLAs are met by the service under-load, so renders platform service 243 (PS 3: Decision Services/Policy Management) to carry out this evaluation via the Performance Monitoring component.

In 3009, after testing is completed, simulated traffic needs to be stopped, so system 110 renders platform service 247 (PS 7: Orchestration Services) for this purpose.

In 3010 and 3011, with testing complete, the system needs to restore external access to the service, so renders platform service 253 (PS 11: Network Services) which resolves hostname, port and other requirements for the services and configures both the local DNS via VPC controller 161 and DNS 162 directly for this purpose.

Orchestration ends with the system closing the transaction using via platform service 253 (PS 13: Transaction Services) and at this point "committing" any/all objects. After successful completion, the network service is assured.

The following sequence diagrams "drill into" the internal system flow when rendering a service in the use for the optimized, secure 5G radio access network. In particular, they focus on three separate tasks from FIG. 30.

Figure 31A:
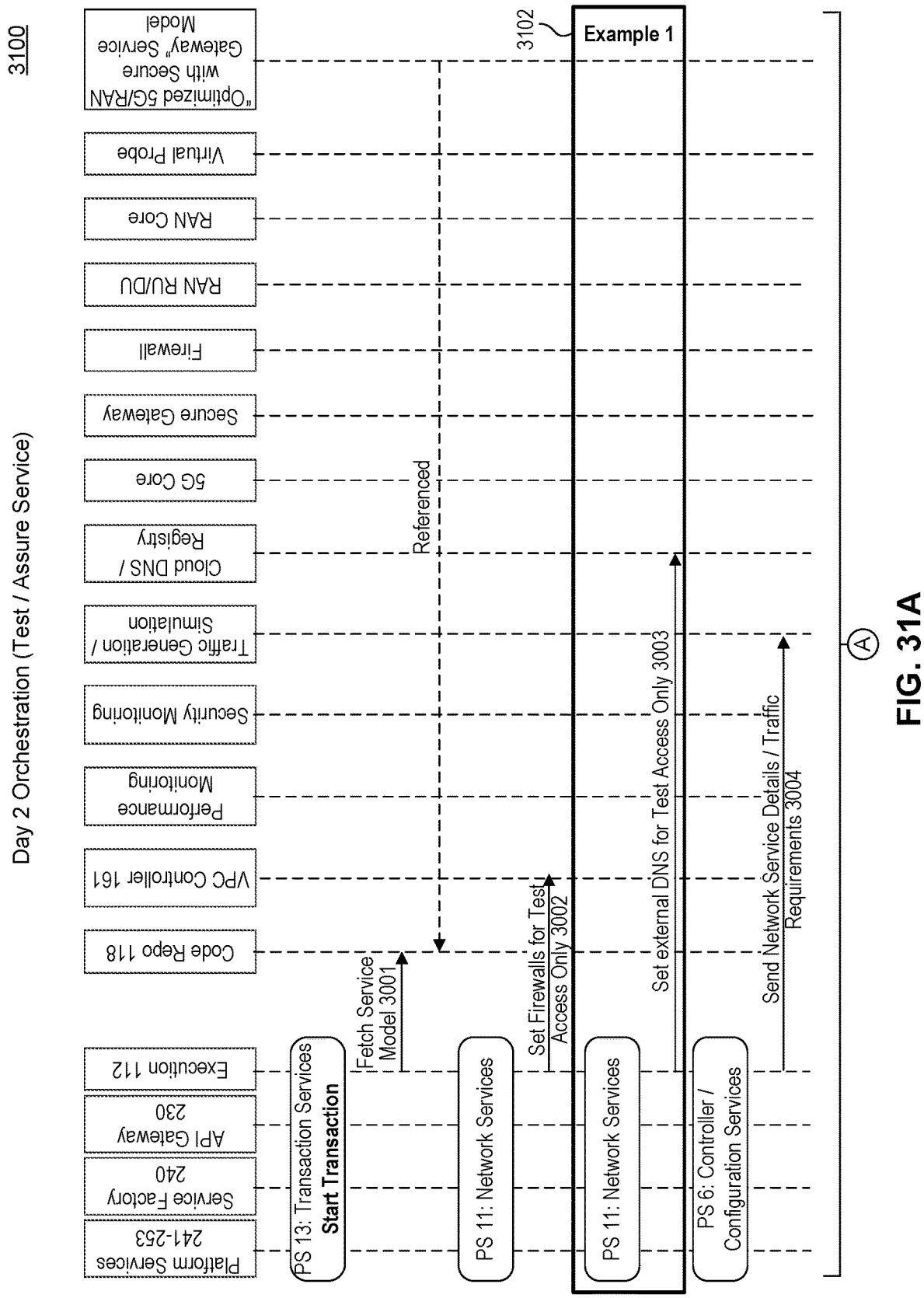
FIGS. 31A-31C are a sequence diagram highlighting particular examples of a day-two-orchestration method performed in the use case for deploying and assuring an optimized, secure 5G radio access network.
Figure 31B:
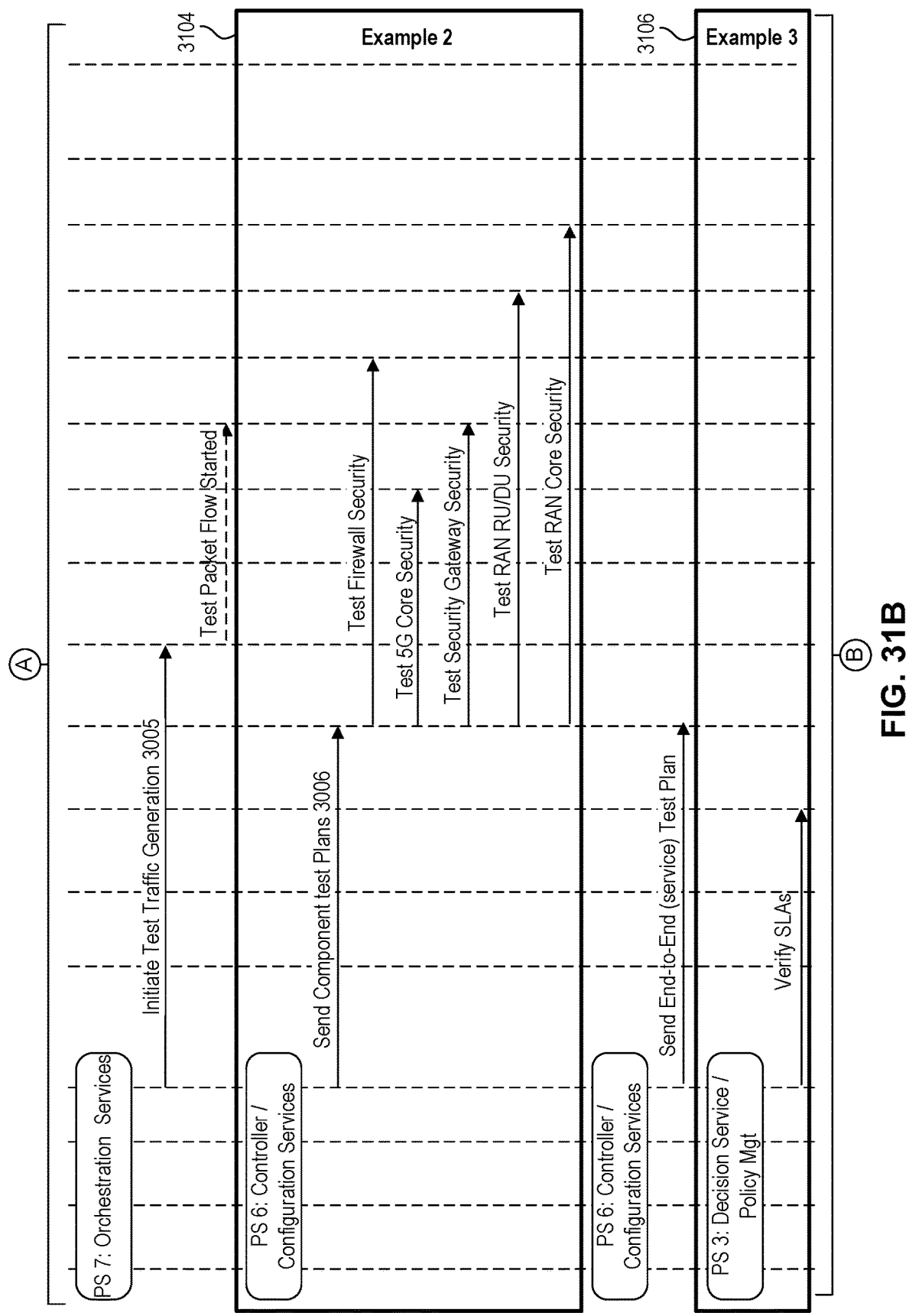
Figure 31C:
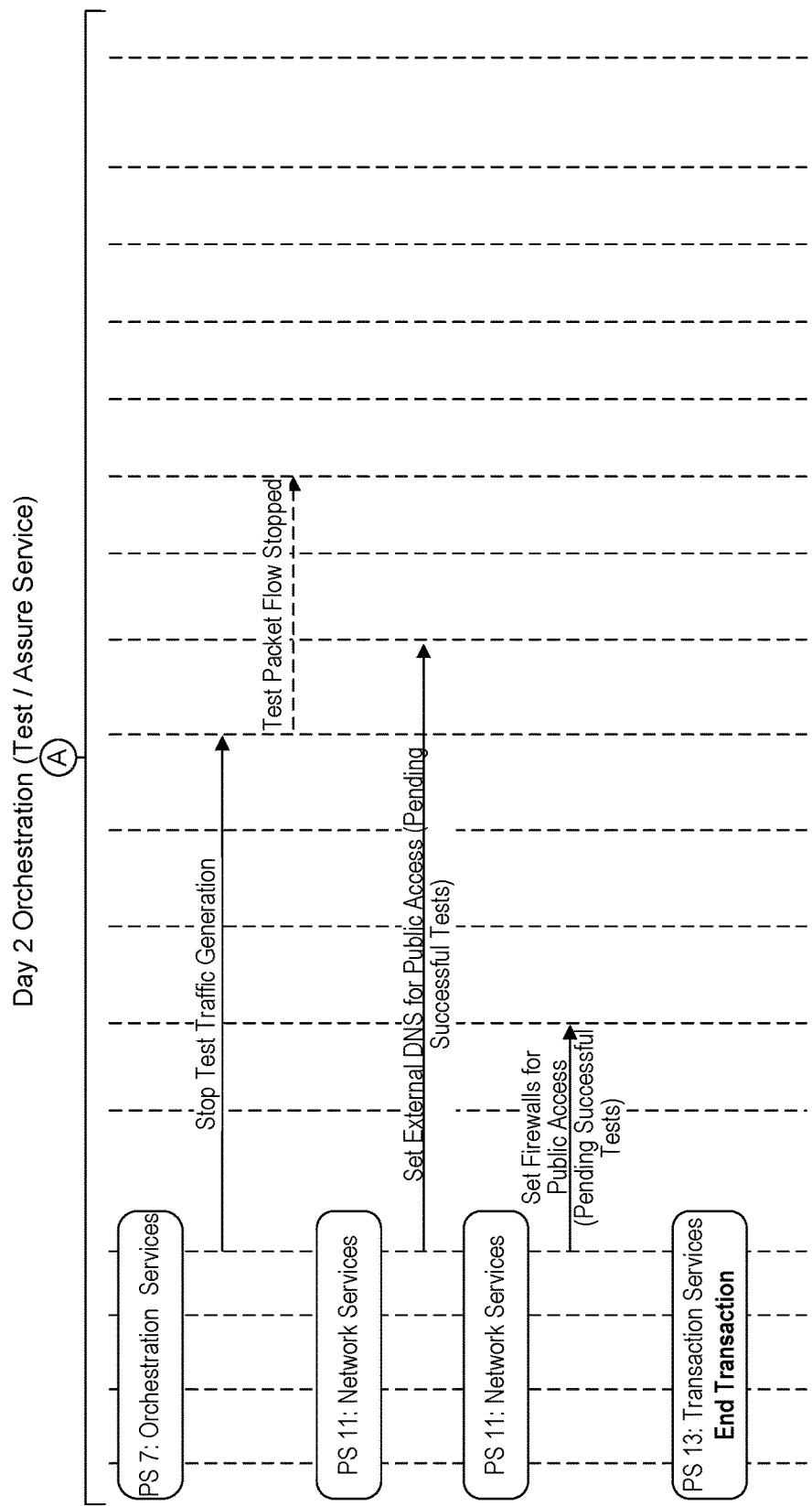

FIGS. 31A-31C are a sequence diagram illustrating the same method described above with reference to FIGS. 30A-30C. Highlighted area 3102 is covered in more detail below with reference to FIG. 32. Highlighted area 3104 is covered in more detail below with reference to FIG. 33. Highlighted area 3106 is covered in more detail below with reference to FIG. 34.

Each of FIGS. 32-34 is organized the same. "Graph Domain Model", "Type System" and "Catalog Inventory" show the three major internal elements of the system from which it derives logic.

The execution of a task starts with a description of the underspecified/generic Task required in the greater sequence diagram. This is accompanied by the system context from the greater use-case (i.e., the Process Token which is tracking the flow across these tasks).

To meet the intent of the Task requirement, service factory 240 interacts with the "Graph Domain Model", "Type System" and "Catalog Inventory" to render a platform service in platform services 241-253 required for the task. Once the rendering is complete the resulting interaction from the higher level sequence diagram is carried out.

At each step in these sequence diagrams the system is memozing results and accumulating state and metadata so that the service rendered is optimized for the execution context.

Figure 32B:
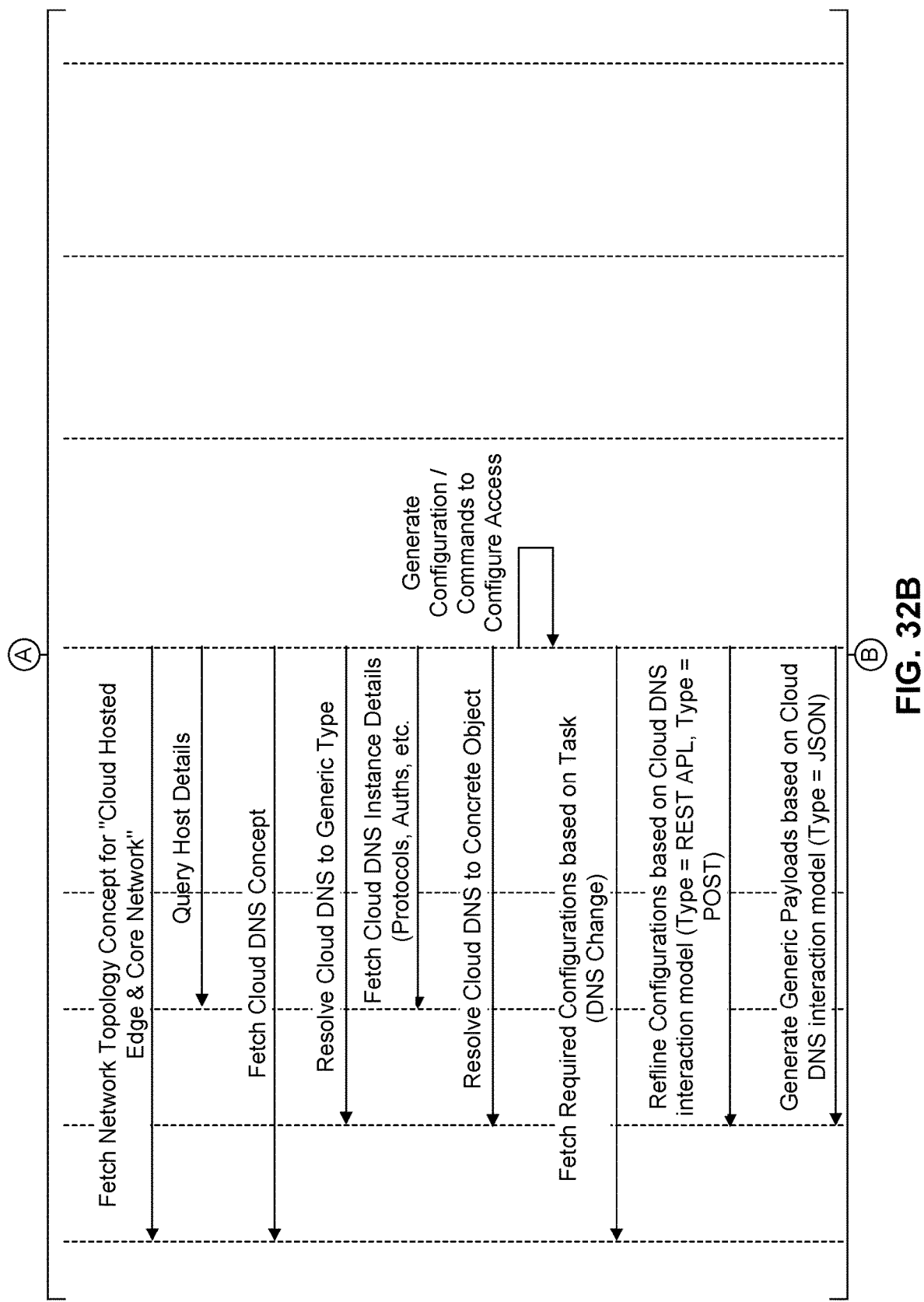
Figure 32C:
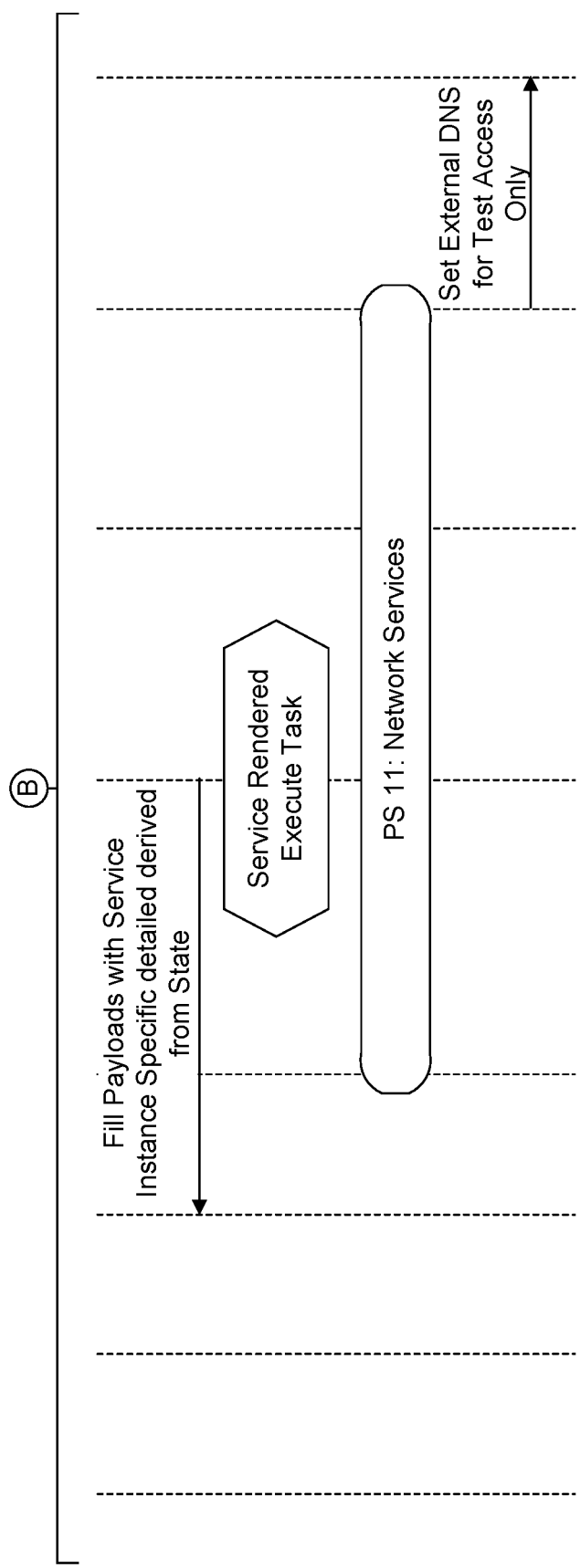
Figure 33A:
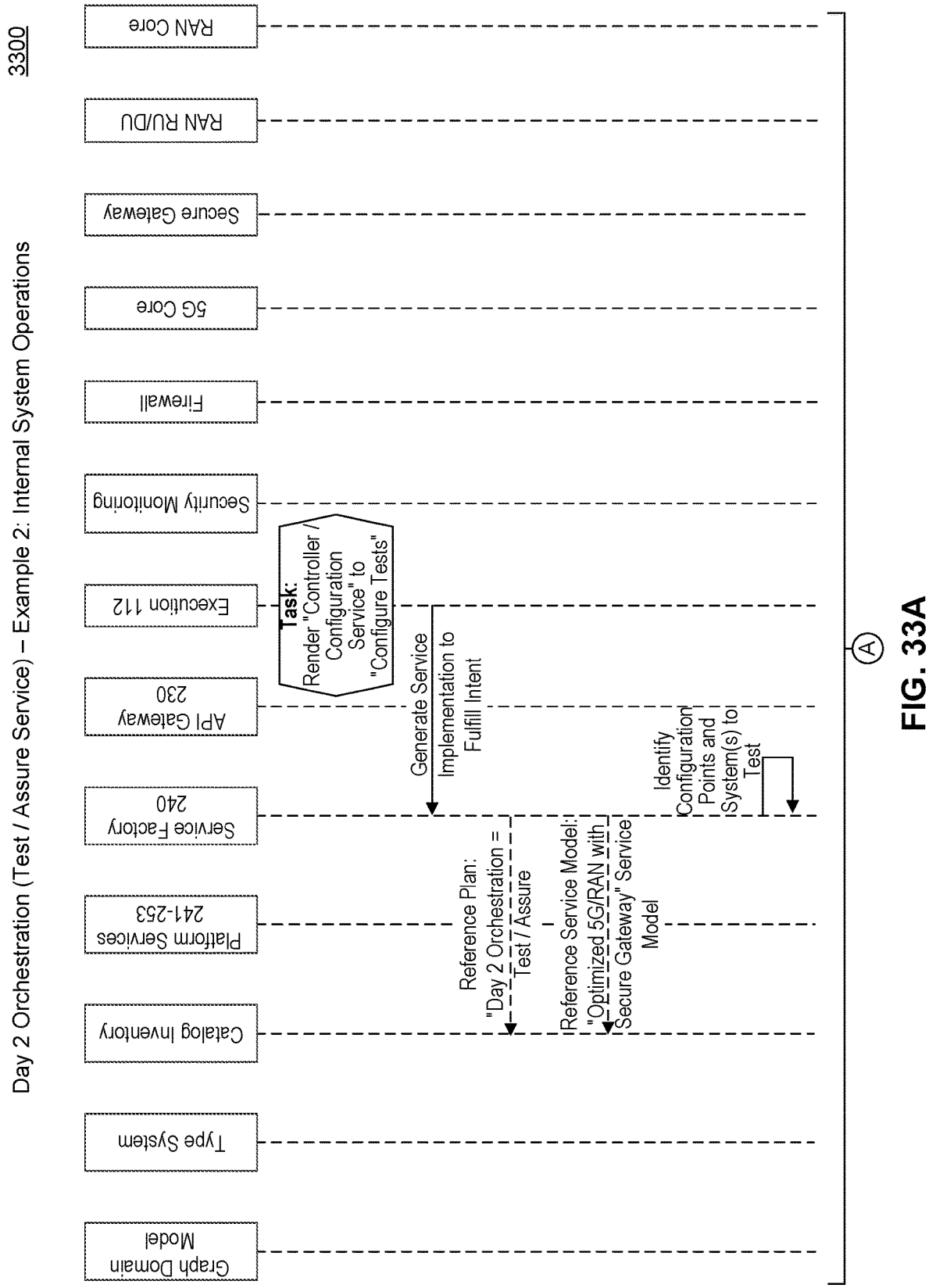
FIGS. 33A-33F are a sequence diagram illustrating a method of configuring tests performed in the use case for deploying and assuring an optimized, secure 5G radio access network.
Figure 33B:
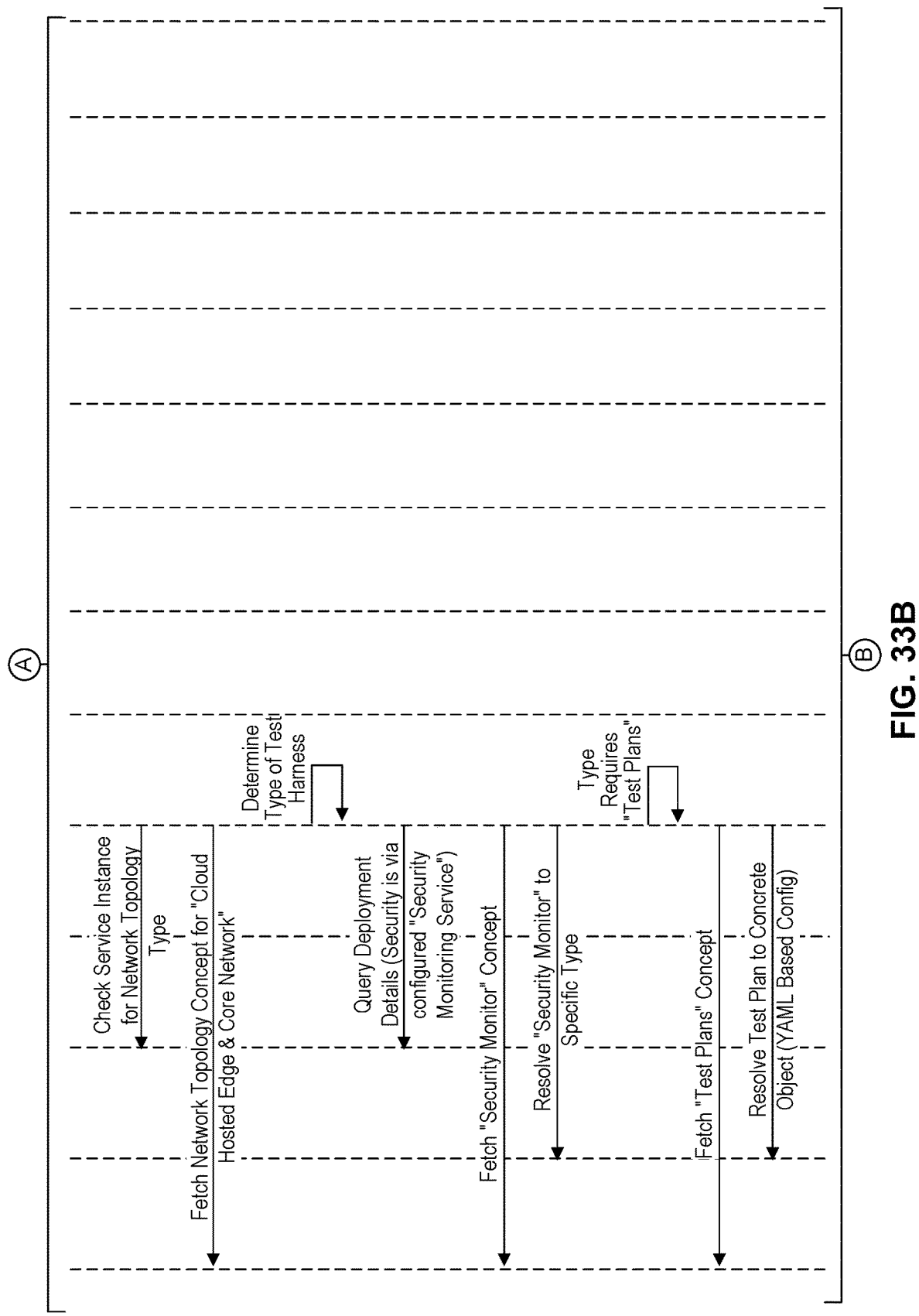
Figure 33C:
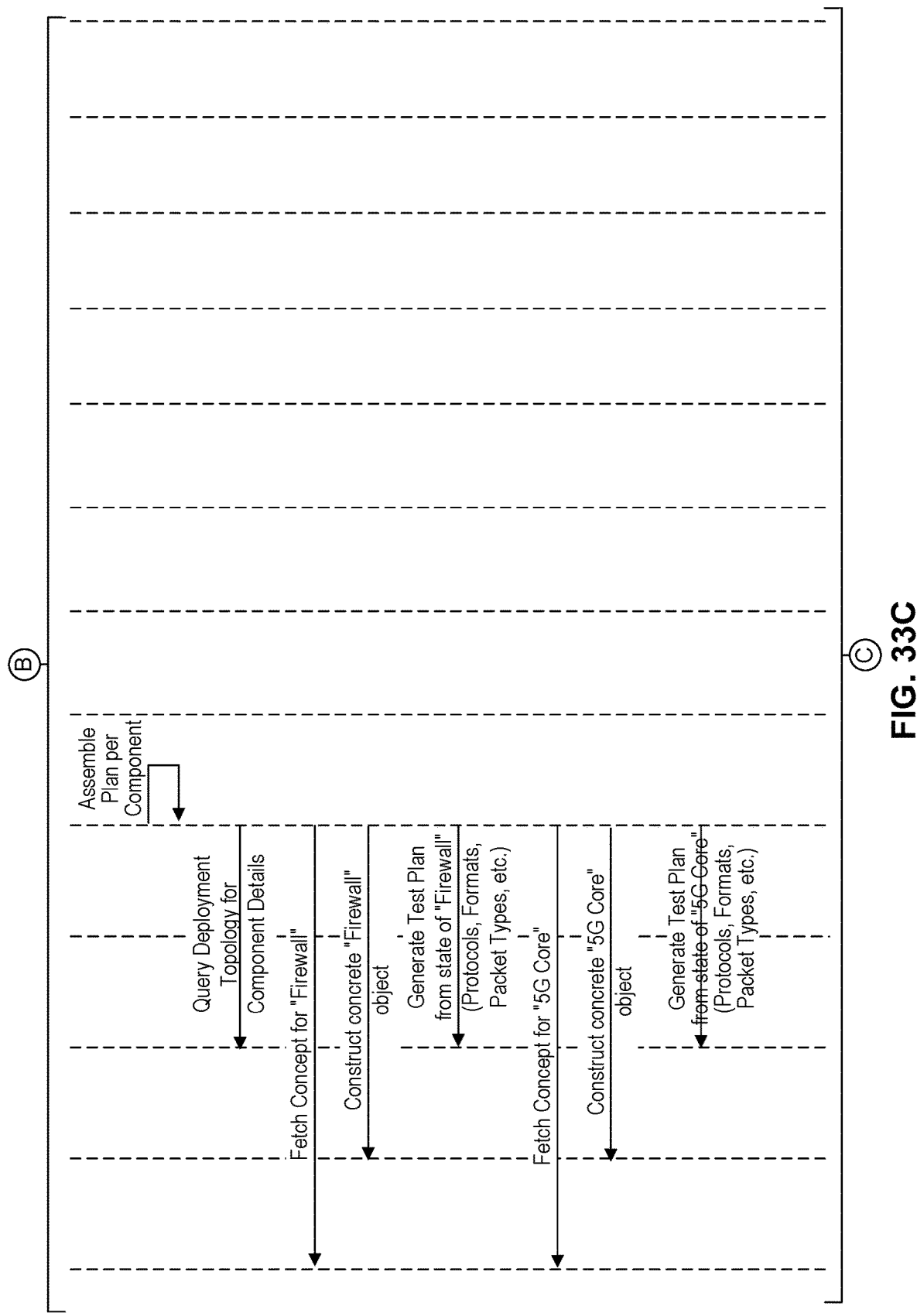
Figure 33D:
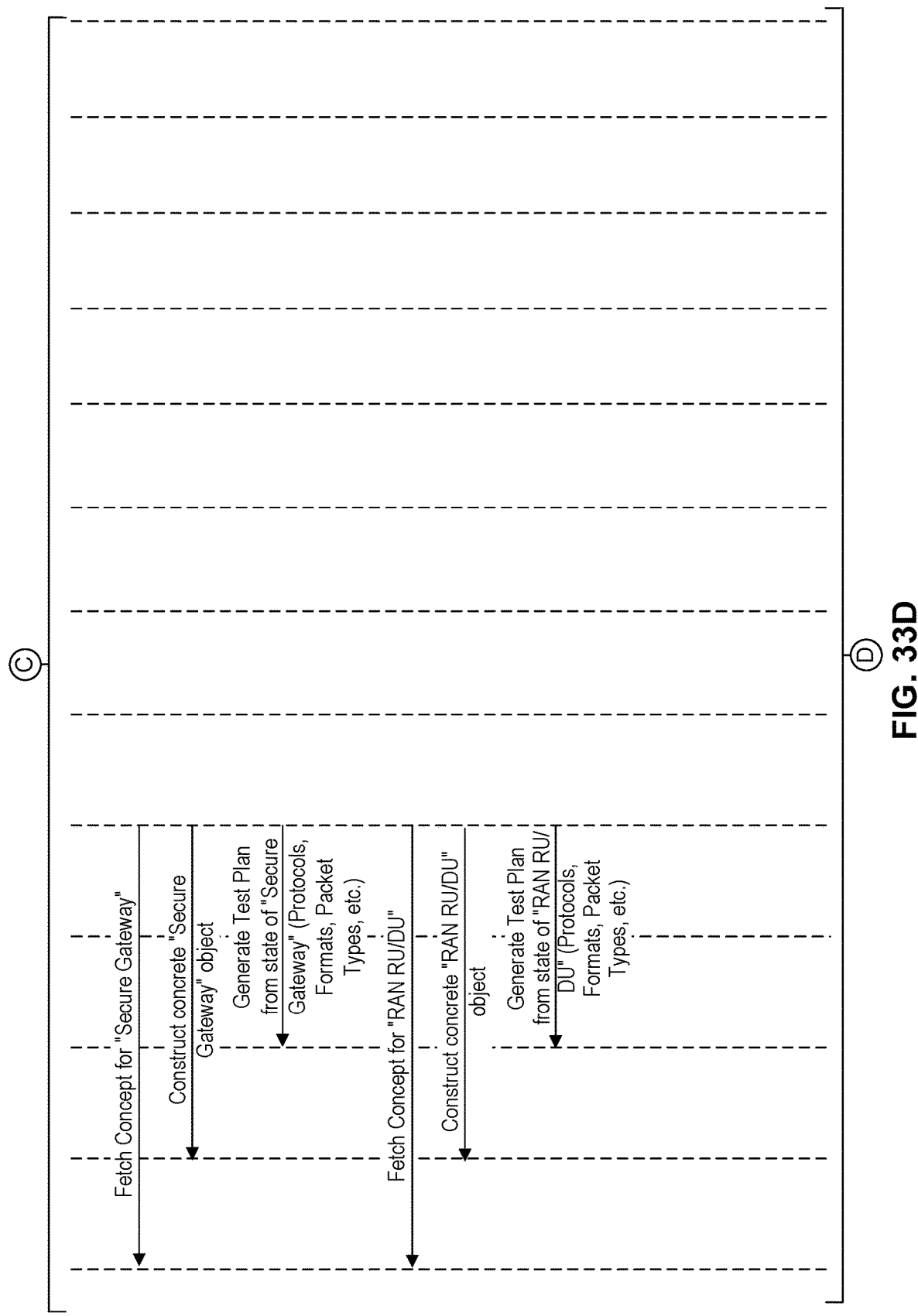
Figure 33E:
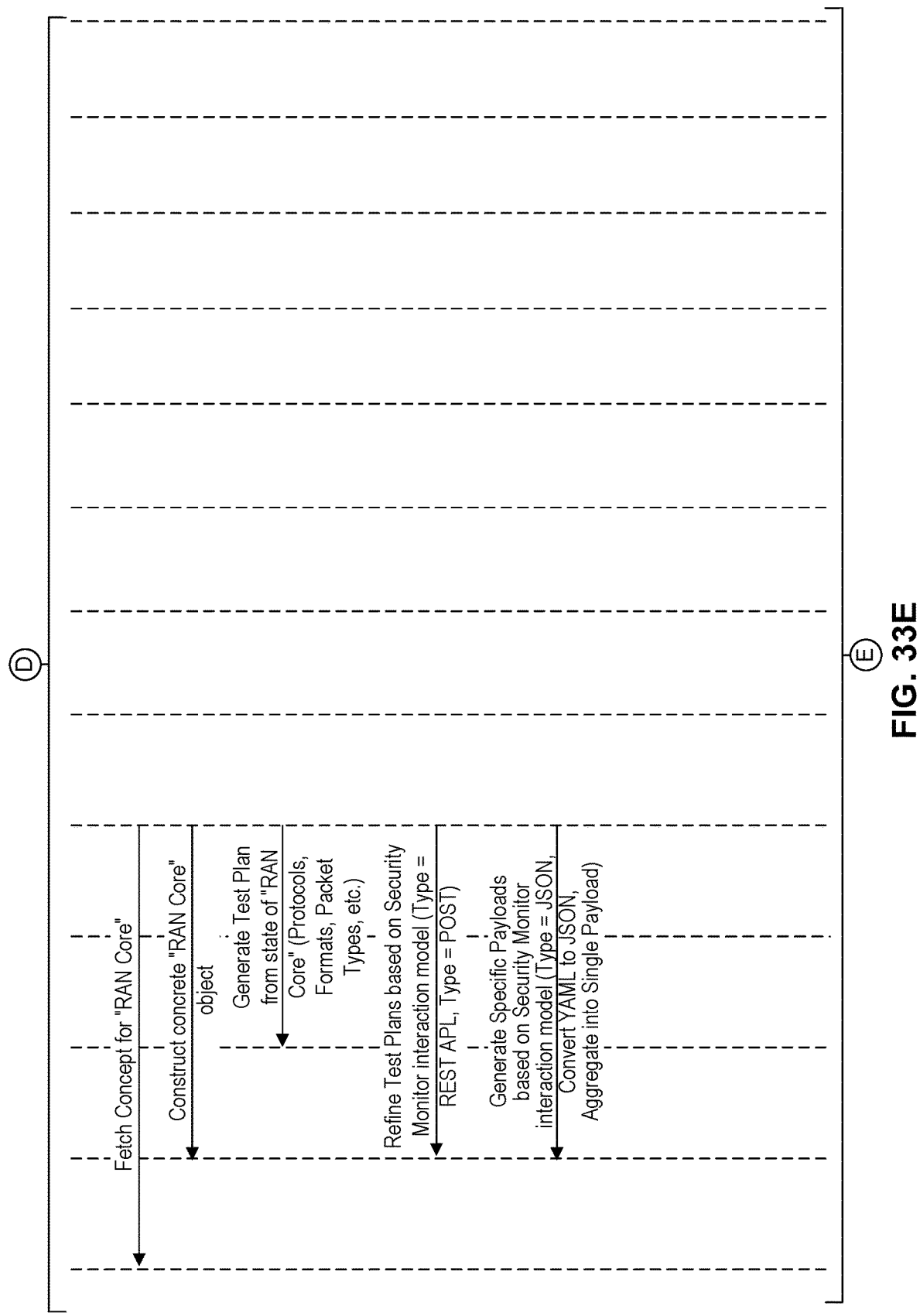
Figure 33F:
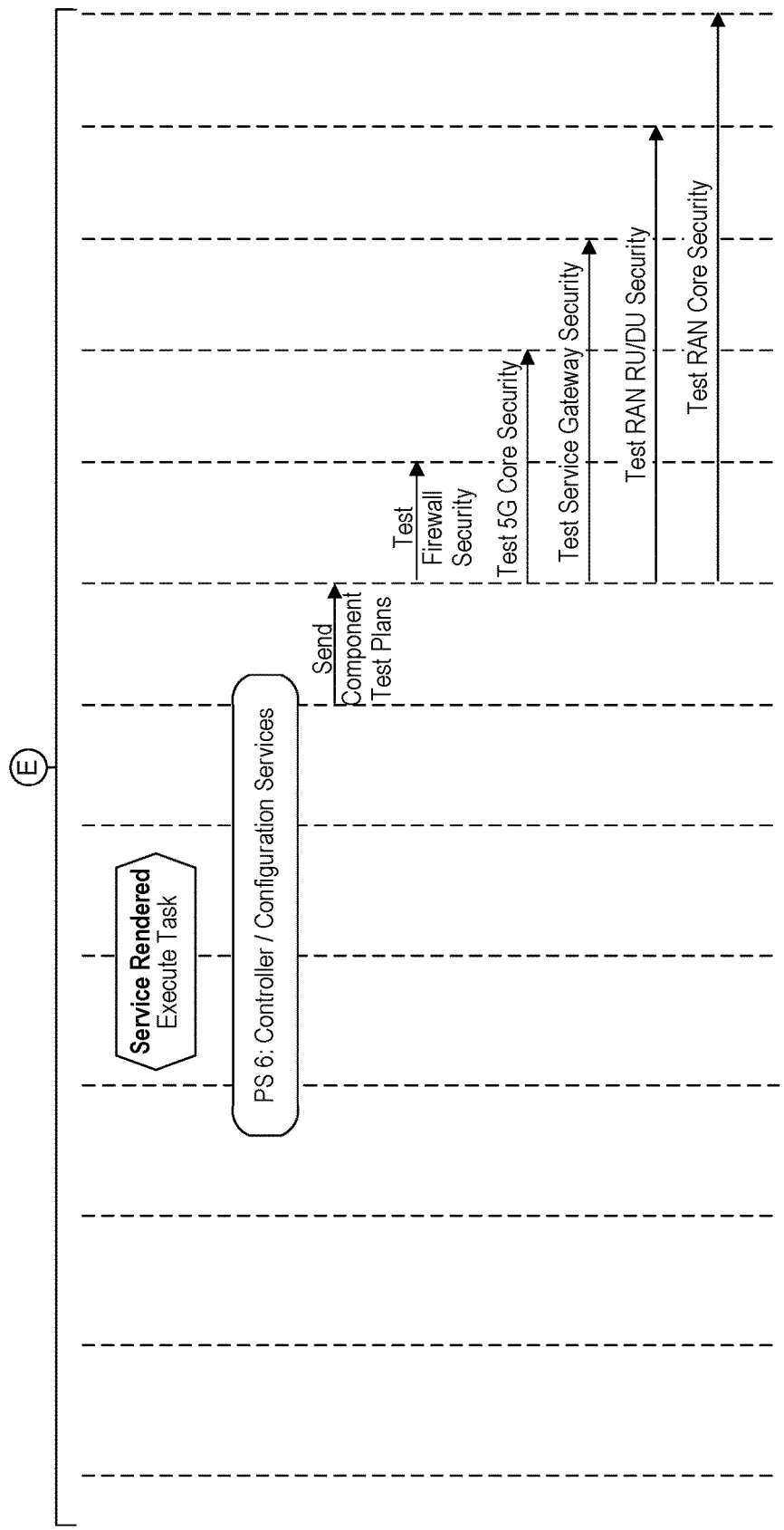

FIG. 32A-32C are a sequence diagram illustrating a method 3200 of configuring the network for test access only performed in the use case for deploying and assuring an optimized, secure 5G radio access network, according to some embodiments. Method 3200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 32A-32C, as will be understood by a person of ordinary skill in the art(s).

For testing, system 110 needs to remove external access to the service, so renders platform service 251 (PS 11: Network Services) which resolves Hostname, port, and other requirements for the services and configures the Cloud-based DNS directly for this purpose.

The generic Task required by the system is to "Configure Network for Test Access Only", for which it proceeds to construct platform service 251 (PS 11: Network Services) by calling service factory 240.

Service factory 240 gathers needed context to start assembling the specific service implementation by fetching the overall plan in which the task is executing and the service model the tasks will apply to from the catalog/inventory.

To carry out the task, system 110 first needs to identify the configuration points used to change the network setup. A configuration point may be used to configure needed functionality and the specific interface into that system. In an embodiment, a configuration point may be an endpoint—an API to a centrally managed component. For example, when configuring a network to turn off access, the configuration point may be the DNS. System 110 may determine the configuration points by progressively querying the state of the service from catalog/Inventory, the related models and types associated with it, and chases the problem as shown until determining that configuration should happen through cloud DNS 2534. As this evaluation progresses the results are "memoized" (stored in memory for later use) so that later components in rendering the service can simply pickup partial models and advance them further as required.

Once the configuration points are identified, system 110 may generate the required commands or configurations. In the same way that system 110 resolves the sub-problem of determining configuration points, system 110 may determine that interaction with "Cloud DNS/Registry" is via a RESTful POST with JSON data and assembles a template for that Javascript Object Notation ("JSON") data payload.

System 110 then fills that template with the instance specific state queried from the Catalog/Inventory. At that point all details of the service are known/calculated, and the system renders the Platform Service, exposing it via API gateway 230, and the system proceeded to execute the Task by sending the generated payload to cloud DNS 2534.

Then the system proceeds to the next Task(s) which are evaluated and executed in a similar way.

FIGS. 33A-33F are a sequence diagram illustrating a method 3300 of configuring tests performed in the use case for deploying and assuring an optimized, secure 5G radio access network, according to some embodiments. Method 3300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 33A-33F, as will be understood by a person of ordinary skill in the art(s).

For testing, system 110 needs to verify the success of unit (per application/component) security test plans, so renders platform service 246 (PS 6: Controller/Configuration Services) to compile these plans based on the characteristics of components and the service, and executes them via the Security Monitoring Component.

The generic Task required by the system is to "Configure Tests," for which it proceeds to construct platform service 246 (PS 6: Controller/Configuration Services) by calling service factory 240.

Service factory 240 gathers needed context to start assembling the specific service implementation by fetching the overall plan in which the task is executing, and the Service Model the tasks will apply to, from the Catalog/Inventory.

To carry out the task, system 110 first needs to identify the configuration points (where/how to configure testing) and details to be sent in that configuration (IPs and other specifics of the system(s) to be tested). Service factory 240 does this by fetching associated state directly from the Catalog/Inventory. As this evaluation progresses the results are "memoized" (stored in memory for later use), so that later components in rendering the service can simply pickup partial models and advance them further as required.

Next, system 110 determines the Test Harness type by progressively querying the state of the service (from Catalog Inventory), the related models and types associated with it, and chases the problem as shown until it has determined that this type of testing component requires "Test Plans."

System 110 then proceeds to assemble the test plans as YAML, per service component based on their characteristics, and using the earlier memoized models of the Security Test Component, it is able to automatically convert from YAML to a single aggregated JSON body (the required target format) and construct a RESTful POST to carry out the plans.

At that point all details of the service are known/calculated, and the system renders the Platform Service, exposing it via the API Gateway, and the system proceeded to execute the Task by sending the generated Test Plans to the "Security Monitoring" Component.

Then the system proceeds to the next Task(s) which are evaluated and executed in a similar way.

Figure 34A:
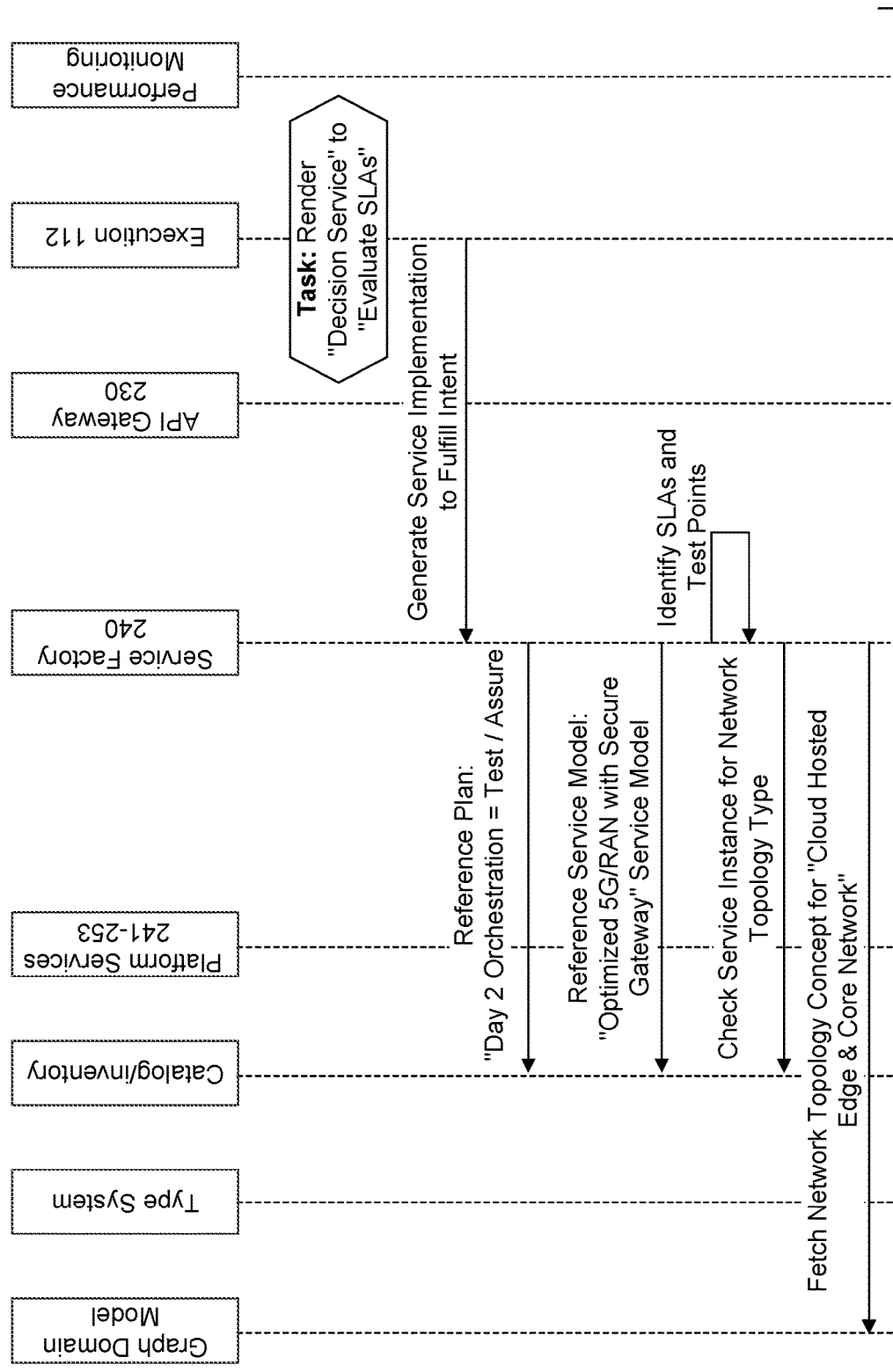
FIGS. 34A-34C are a sequence diagram illustrating a method of evaluating service level agreements performed in the use case for deploying and assuring an optimized, secure 5G radio access network.
Figure 34B:
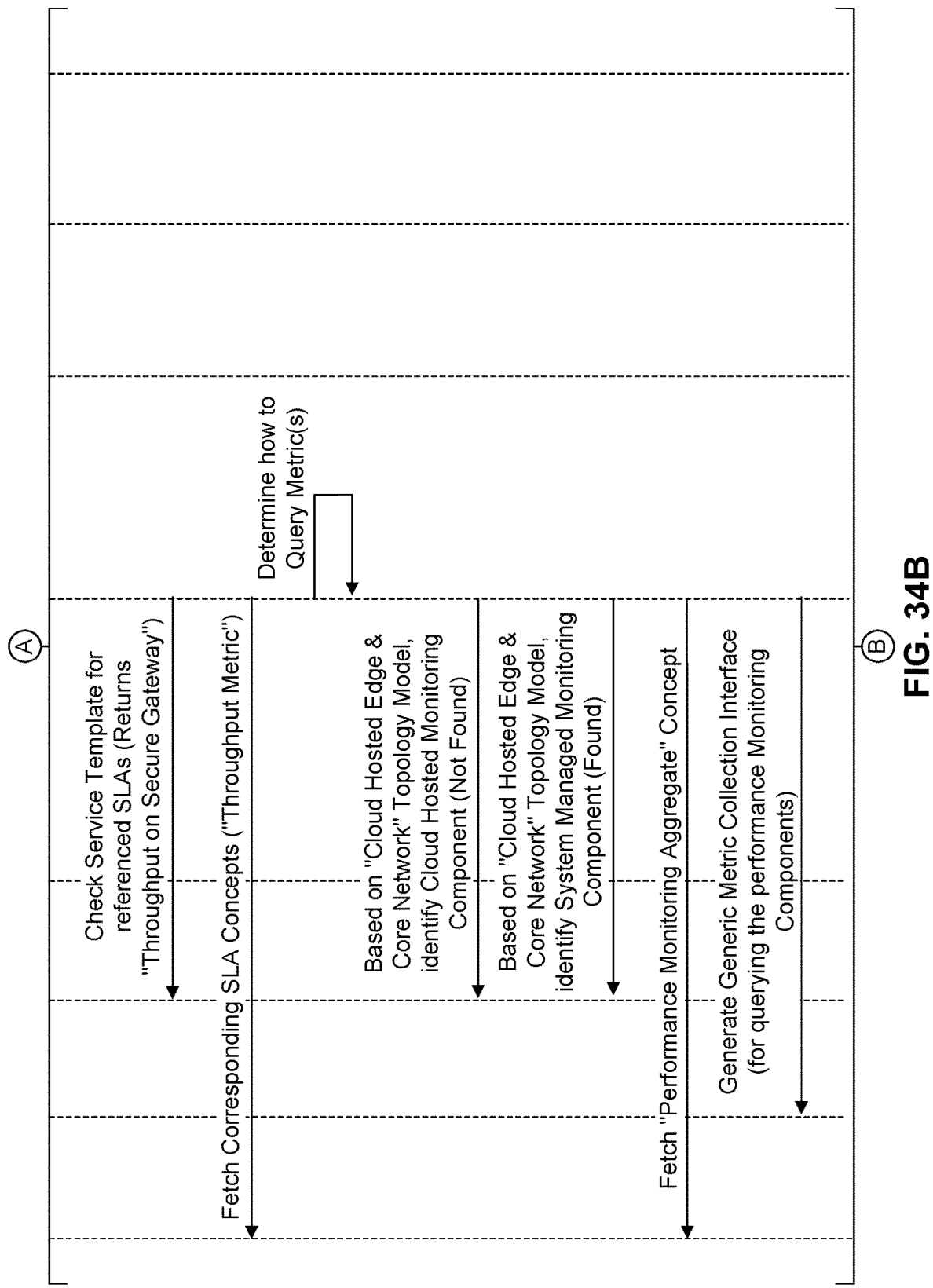
Figure 34C:
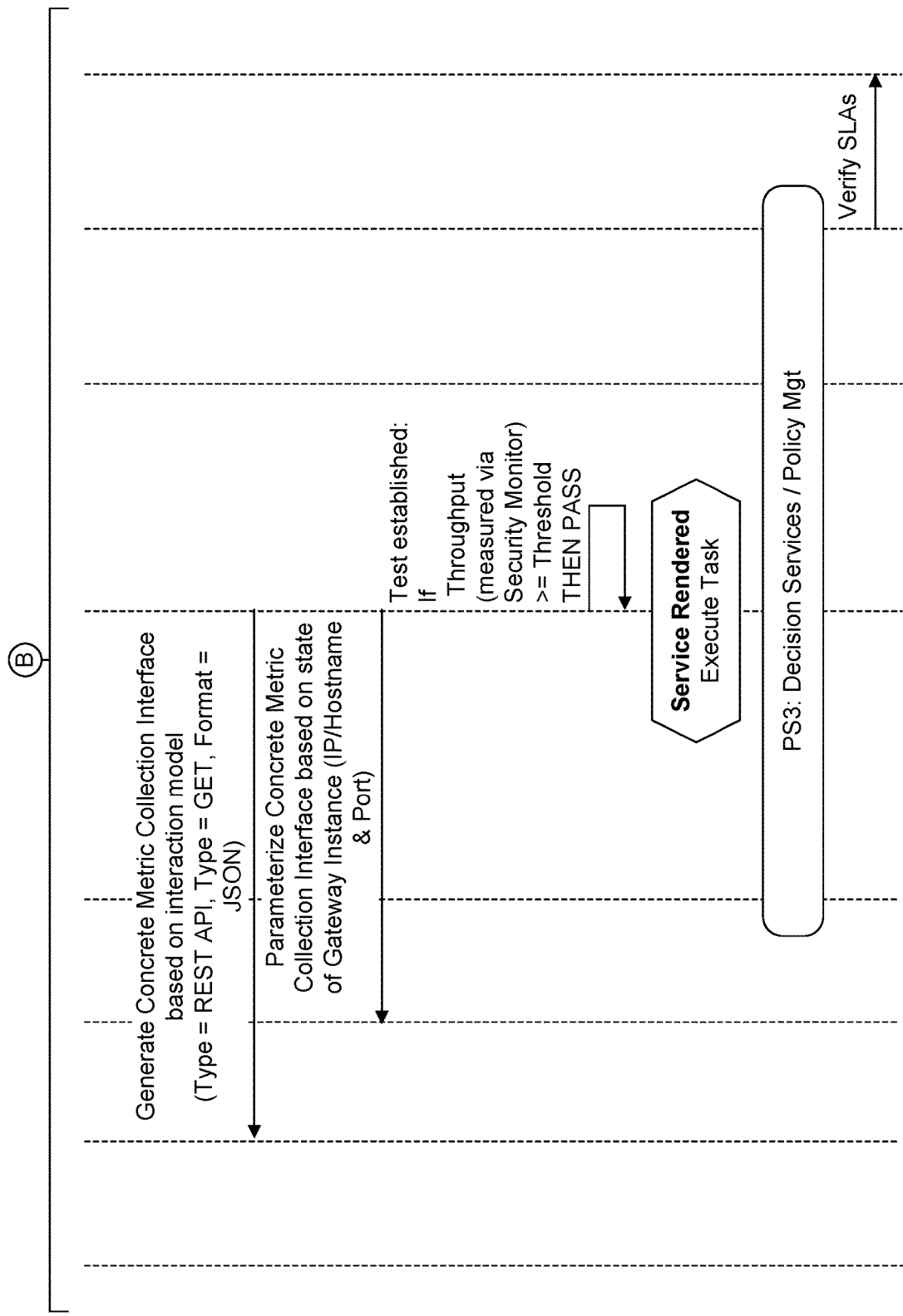

FIGS. 34A-34C are a sequence diagram illustrating a method 3400 of evaluating service level agreements performed in the use case for deploying and assuring an optimized, secure 5G radio access network, according to some embodiments. Method 3400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 34A-34C, as will be understood by a person of ordinary skill in the art(s).

For testing, the system needs to verify that SLAs are met by the service under-load, so renders platform service 243 (PS 3: Decision Services/Policy Management) to carry out this evaluation via the Performance Monitoring component.

The generic Task required by the system is to "Evaluate SLAs", for which it proceeds to construct platform service 243 (PS 3: Decision Services/Policy Management) by calling service factory 240.

Service factory 240 gathers needed context to start assembling the specific service implementation by fetching the overall plan in which the task is executing, and the Service Model the tasks will apply to, from the Catalog/Inventory.

To carry out the task, system 110 first needs to determine what SLAs apply and identify the Test Points used to evaluate them, and does this by progressively querying the state of the service (from Catalog Inventory), the related models and type associated with it, and chases the problem as shown until it has determined the only SLA attached to the service measures "Throughput on the Secure Gateway." As this evaluation progresses the results are "memoized" (stored in memory for later use), so that later components in rendering the service can simply pickup partial models and advance it further as required.

Once the required metric/measure is determined, the system proceeds to determine how that is to be accomplished. Here it determines that the "Resource Monitor" Component, which has already been configured to the probes co-located with the Secure Gateway, can be used for this purpose. It then determines how to query the Resource Monitor, which is via a RESTful GET query with parameters referencing the Secure Gateway, and determines how to convert the result into a format which can be used for evaluation. Finally, the system determines that the SLA is in compliance if that value obtained is above a specified threshold.

At that point all details of the service are known/calculated, and the system renders the Platform Service, exposing it via the API Gateway, and the system proceeded to execute the Task by evaluating the SLA via the "Performance Monitoring" Component.

Then the system proceeds to the next Task(s) which are evaluated and executed in a similar way.

Figure 35:
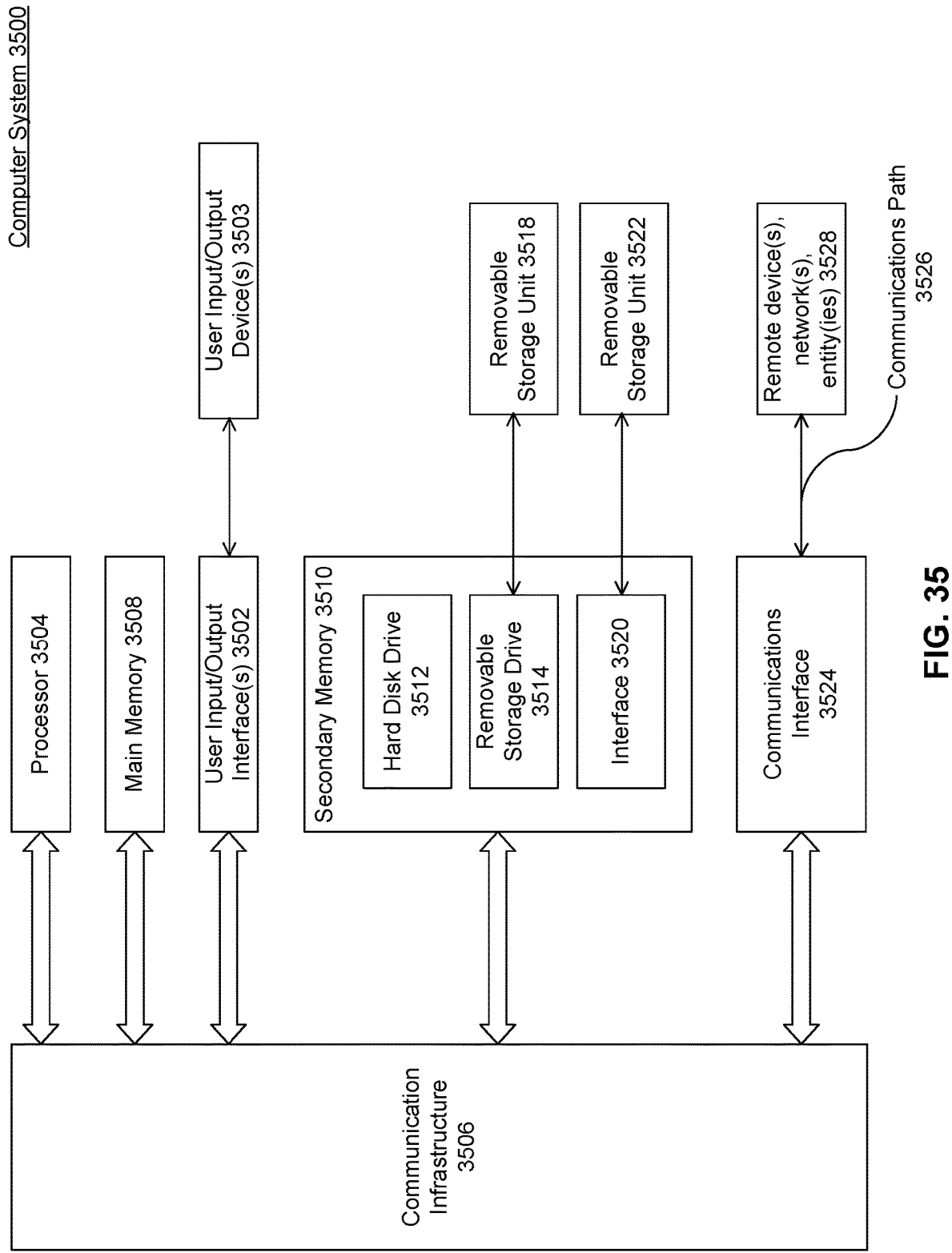
FIG. 35 is an example computer system useful for implementing various embodiments.

Various embodiments may be implemented, for example, using one or more well-known computer systems, such as computer system 3500 shown in FIG. 35. One or more computer systems 3500 may be used, for example, to implement any of the embodiments discussed herein, as well as combinations and sub-combinations thereof.

Computer system 3500 may include one or more processors (also called central processing units, or CPUs), such as a processor 3504. Processor 3504 may be connected to a communication infrastructure or bus 3506.

Computer system 3500 may also include user input/output device(s) 3508, such as monitors, keyboards, pointing devices, etc., which may communicate with communication infrastructure 3506 through user input/output interface(s) 3502.

One or more of processors 3504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 3500 may also include a main or primary memory 3508, such as random access memory (RAM). Main memory 3508 may include one or more levels of cache. Main memory 3508 may have stored therein control logic (e.g., computer software) and/or data.

Computer system 3500 may also include one or more secondary storage devices or memory 3510. Secondary memory 3510 may include, for example, a hard disk drive 3512 and/or a removable storage device or drive 3514. Removable storage drive 3514 may be a floppy disk drive, a magnetic tape drive, a compact disk drive, an optical storage device, tape backup device, and/or any other storage device/drive.

Removable storage drive 3514 may interact with a removable storage unit 3518. Removable storage unit 3518 may include a computer usable or readable storage device having stored thereon computer software (control logic) and/or data. Removable storage unit 3518 may be a floppy disk, magnetic tape, compact disk, digital video disc ("DVD"), optical storage disk, and/any other computer data storage device. Removable storage drive 3514 may read from and/or write to removable storage unit 3518.

Secondary memory 3510 may include other means, devices, components, instrumentalities or other approaches for allowing computer programs and/or other instructions and/or data to be accessed by computer system 3500. Such means, devices, components, instrumentalities or other approaches may include, for example, a removable storage unit 3522 and an interface 3520. Examples of the removable storage unit 3522 and the interface 3520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3500 may further include a communication or network interface 3524. Communication interface 3524 may enable computer system 3500 to communicate and interact with any combination of external devices, external networks, external entities, etc. (individually and collectively referenced by reference number 3528). For example, communication interface 3524 may allow computer system 3500 to communicate with external or remote devices 3528 over communications path 3526, which may be wired and/or wireless (or a combination thereof), and which may include any combination of local area networks ("LANs"), wide area networks ("WANs"), the Internet, etc. Control logic and/or data may be transmitted to and from computer system 3500 via communication path 3526.

Computer system 3500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 3500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 3500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 3500, main memory 3508, secondary memory 3510, and removable storage units 3518 and 3522, as well as tangible articles of manufacture embodying any combination of the foregoing. Such control logic, when executed by one or more data processing devices (such as computer system 3500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 35. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for deploying a network service, comprising:
providing a design environment that allows a user to declaratively compose a service definition;
constructing a plurality of platform services each corresponding to a category of message-oriented middleware based on the service definition, an intent, and a deployment context;
generating a machine-readable deployment plan based on the service definition that invokes the plurality of platform services;
using the machine-readable deployment plan to deploy the network service by:
instantiating a plurality of applications and a plurality of network, storage, and computing resources in a network service architecture that supports the network service by performing a set of tasks in a single transaction to pull security credentials from a security repository, create one or more service accounts, create a network topology, setup storage for the plurality of applications and a plurality of supporting services, transfer application packages from a remote repository to a local image repository, and attach the plurality of network, storage, and computing resources to one or more compute nodes;
integrating the plurality of applications, the plurality of supporting services, and the plurality of network, storage, and computing resources to function as a composite service;
configuring, the plurality of applications, the plurality of supporting services, and the plurality of network, storage, and computing resources; and
orchestrating a set of testing components to measure aspects of the network service architecture against simulated traffic.

2. The method of claim 1, wherein the network service architecture comprises an enterprise application layer, a network service layer, a cloud layer, a network layer.

3. The method of claim 2, wherein the cloud layer comprises an infrastructure controller, the one or more compute nodes, and storage, and wherein the network layer comprises a virtual private cloud controller and a domain name server.

4. The method of claim 1, wherein the design environment allows the user to model a network service graph and upload connected artifacts.

5. The method of claim 1, the integrating further comprising:
in a single transaction, performing a set of tasks to:
update domain name service (DNS) entries for the plurality of network, storage, and computing resources; and
link the plurality of network, storage, and computing resources.

6. The method of claim 1, the configuring further comprising:
in a single transaction, performing a set of tasks to:
determine configuration requirements for each of the plurality of applications; and
apply the configuration requirements to each of the plurality of applications.

7. The method of claim 1, the orchestrating further comprising:
in a single transaction, performing a set of tasks to:
configure a firewall and an external DNS for test access only;
orchestrate the set of testing components to measure the aspects of the network service architecture against the simulated traffic; and
upon a successful result, set the firewall and the external DNS for public access.

8. The method of claim 2, wherein the network service is an optimized secure 5G radio access network.

9. The method of claim 8, wherein the enterprise application layer comprises a secure gateway, and wherein the network service layer comprises a radio access network (RAN) core, a RAN radio unit/distributed unit (RU/DU), a 5G core, and a virtual probe.

10. The method of claim 8, wherein the plurality of supporting services comprises a performance monitoring service, a security monitoring service, a traffic generation service, a cloud-services service, a domain name service (DNS) registry, and one or more remote repositories.

11. The method of claim 8, the instantiating further comprising:
in a single transaction, performing a set of tasks to:
provision one or more virtual machines for a firewall on an edge node;
create a 5G core on the edge node;
create a secure gateway on the edge node;
create a RAN RU/DU on the edge node;
create a RAN core on a core node; and
create a virtual probe on the edge node.

12. The method of claim 11, the integrating further comprising:
in a single transaction, performing a set of tasks to:
link the firewall and the RAN RU/DU;
link the RAN RU/DU and the RAN core;
link the RAN RU/DU and the 5G core;
link the secure gateway and the 5G core; and
connect the virtual probe to the firewall.

13. The method of claim 12, the configuring further comprising:
in a single transaction, performing a set of tasks to:
configure the firewall, the 5G core, the RAN RU/DU, the RAN core, the virtual probe, a service level agreement (SLA) monitoring service, a security monitoring service, and a cloud domain name service; and
register the virtual probe with a performance monitoring service.

14. The method of claim 13, the orchestrating further comprising:
in a single transaction, performing a set of tasks to:
set the firewall and a cloud DNS registry for test access only;
generate test traffic; and
verify an SLA using the test traffic; and
set the firewall and the cloud DNS registry for public access.

15. The method of claim 2, wherein the network service is a secure multi-cloud 5G network.

16. The method of claim 15, wherein the enterprise application layer comprises an Internet-of-Things application, and wherein the network service layer comprises a radio access network (RAN) core, a RAN radio unit/distributed unit (RU/DU), a 5G core, and a firewall.

17. The method of claim 15, wherein the plurality of supporting services comprises a remote storage, a cloud domain name service (DNS) registry, and remote repositories.

18. The method of claim 15, the instantiating further comprising:

in a single transaction, performing a set of tasks to:
create a firewall on an edge node;
create a 5G core on the edge node;
create a RAN RU/DU on the edge node; and
create a RAN core on a core node.

19. The method of claim 18, the integrating further comprising:
in a single transaction, performing a set of tasks to:
link the firewall and the RAN RU/DU;
link the RAN RU/DU and the RAN core; and
link the RAN RU/DU and the 5G core.

20. The method of claim 19, the configuring further comprising:
in a single transaction, performing a set of tasks to:
configure the firewall, the 5G core, the RAN RU/DU, the RAN core, a service level agreement (SLA) monitoring service, and a cloud domain name service.

21. The method of claim 20, the orchestrating further comprising:
in a single transaction, performing a set of tasks to:
set the firewall and a cloud DNS registry for test access only;
verify a service level agreement; and
set the firewall and the cloud DNS registry for public access.

22. The method of claim 2, wherein the network service is a secure 5G radio access network for voice.

23. The method of claim 22, wherein the network service layer comprises a firewall, an evolved packet core, and an IP multimedia subsystem, and wherein the network layer further comprises a service mesh.

24. The method of claim 22, wherein the plurality of supporting services comprises a cloud analytics tool.

25. The method of claim 22, the instantiating further comprising:
in a single transaction, performing a set of tasks to:
provision one or more virtual machines for a firewall on an edge node;
load an image for the firewall;
create an IP multimedia subsystem (IMS) on the edge node; and
create an evolved packet core (EPC) on the edge node.

26. The method of claim 25, the integrating further comprising:
in a single transaction, performing a set of tasks to:
link the firewall and the EPC; and
link the EPC and the IMS.

27. The method of claim 26, the configuring further comprising:
in a single transaction, performing a set of tasks to:
configure the firewall, the IMS, the EPC, a virtual probe, and a resource monitor; and
register the virtual probe and the resource monitor with a performance monitoring service.

28. The method of claim 27, the orchestrating further comprising:
in a single transaction, performing a set of tasks to:
set the firewall and a cloud domain name service (DNS) registry for test access only;
verify a service level agreement; and
set the firewall and the cloud DNS registry for public access.

29. The method of claim 2, wherein the network service is a secure multi-cloud network for voice.

30. The method of claim 29, wherein the network service layer comprises a firewall, an evolved packet core, an IP multimedia subsystem, a probe, and a resource monitor.

31. The method of claim 29, wherein the plurality of supporting services comprises a customer management system/business support system (CMS/BSS).

32. The method of claim 31, the instantiating further comprising:
in a single transaction, performing a set of tasks to:
provision one or more virtual machines for a firewall on an edge node;
load an image for the firewall;
create an IP multimedia subsystem (IMS) on a core node;
create an evolved packet core (EPC) on the edge node;
create resource monitors on the core node and the edge node; and
create virtual probes on the core node and the edge node.

33. The method of claim 32, the integrating further comprising:
in a single transaction, performing a set of tasks to:
link the firewall and the EPC;
link the EPC and the IMS;
connect the virtual probes to the firewall; and
connect the resource monitors to the firewall.

34. The method of claim 33, the configuring further comprising:
in a single transaction, performing a set of tasks to:
configure the firewall, the IMS, the EPC, the virtual probes, and the resource monitors; and
register the virtual probes and the resource monitors with a performance monitoring service.

35. The method of claim 34, the orchestrating further comprising:
in a single transaction, performing a set of tasks to:
set the firewall and a cloud domain name service (DNS) registry for test access only;
verify a service level agreement; and
set the firewall and the cloud DNS registry for public access.

36. A system, comprising:
a memory; and
at least one processor coupled to the memory and configured to:
provide a design environment that allows a user to declaratively compose a service definition;
construct a plurality of platform services each corresponding to a category of message-oriented middleware based on the service definition, an intent, and a deployment context;
generate a machine-readable deployment plan based on the service definition that invokes the plurality of platform services;
use the machine-readable deployment plan to deploy a network service by:
instantiating a plurality of applications and a plurality of network, storage, and computing resources in a network service architecture that supports the network service by performing a set of tasks in a single transaction to pull security credentials from a security repository, create one or more service accounts, create a network topology, setup storage for the plurality of applications and a plurality of supporting services, transfer application packages from a remote repository to a local image repository, and attach the plurality of network, storage, and computing resources to one or more compute nodes;

integrating the plurality of applications, the plurality of supporting services, and the plurality of network, storage, and computing resources to function as a composite service;

configuring the plurality of applications, the plurality of supporting services, and the plurality of network, storage, and computing resources; and orchestrating a set of testing components to measure aspects of the network service architecture against simulated traffic.

37. A non-transitory computer-readable device having instructions stored thereon that, when executed by at least one computing device, cause the at least one computing device to perform operations comprising:

providing a design environment that allows a user to declaratively compose a service definition;

constructing a plurality of platform services each corresponding to a category of message-oriented middleware based on the service definition, an intent, and a deployment context;

generating a machine-readable deployment plan based on the service definition that invokes the plurality of platform services;

using the machine-readable deployment plan to deploy a network service by:

instantiating a plurality of applications and a plurality of network, storage, and computing resources in a network service architecture that supports the network service by performing a set of tasks in a single transaction to pull security credentials from a security repository, create one or more service accounts, create a network topology, setup storage for the plurality of applications and a plurality of supporting services, transfer application packages from a remote repository to a local image repository, and attach the plurality of network, storage, and computing resources to one or more compute nodes;

integrating the plurality of applications, the plurality of supporting services, and the plurality of network, storage, and computing resources to function as a composite service;

configuring, the plurality of applications, the plurality of supporting services, and the plurality of network, storage, and computing resources; and orchestrating a set of testing components to measure aspects of the network service architecture against simulated traffic.

* * * * *